United States Patent
Hazzard et al.

(10) Patent No.: US 10,667,602 B2
(45) Date of Patent: *Jun. 2, 2020

(54) DISPLAY POSITIONING APPARATUS AND METHOD

(71) Applicant: Ergotron, Inc., St. Paul, MN (US)

(72) Inventors: Joel Hazzard, Osceola, WI (US); Robert William Fluhrer, Prior Lake, MN (US); Peter Segar, Burnsville, MN (US); John William Theis, St. Paul, MN (US); Mustafa A. Ergun, Eden Prairie, MN (US); Scott Trish, Lakeville, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,533

(22) Filed: Nov. 21, 2018

(65) Prior Publication Data
US 2019/0090630 A1    Mar. 28, 2019

Related U.S. Application Data

(63) Continuation of application No. 15/720,855, filed on Sep. 29, 2017, now Pat. No. 10,172,450, which is a (Continued)

(51) Int. Cl.
*A47B 21/04*    (2006.01)
*F16M 11/04*    (2006.01)
(Continued)

(52) U.S. Cl.
CPC ............... *A47B 21/04* (2013.01); *A47B 9/10* (2013.01); *A47B 9/18* (2013.01); *A47B 17/033* (2013.01);
(Continued)

(58) Field of Classification Search
CPC ..... A47B 21/00; A47B 21/0314; A47B 21/04; A47B 21/007; A47B 21/02;
(Continued)

(56) References Cited

U.S. PATENT DOCUMENTS

| 39,602 A | 8/1863 | Whipple |
|---|---|---|
| 151,083 A | 5/1874 | Buck |

(Continued)

FOREIGN PATENT DOCUMENTS

| AU | 2011282862 B2 | 10/2014 |
|---|---|---|
| AU | 2015227496 B2 | 6/2017 |

(Continued)

OTHER PUBLICATIONS

"U.S. Appl. No. 13/191,170, Examiner Interview Summary dated Jun. 10, 2013", 3 pgs.

(Continued)

*Primary Examiner* — Jose V Chen
(74) *Attorney, Agent, or Firm* — Schwegman Lundberg & Woessner, P.A.

(57) ABSTRACT

An apparatus for positioning an electronic display is described. The apparatus can be combined with an existing work surface to provide a multi-position workstation. In some cases, the apparatus includes a mounting portion configured to support an electronic display and a keyboard. The mounting portion may be movable with respect to the work surface between multiple positions, including for example, a sitting position and a standing position. Methods for positioning an electronic display and a keyboard are also included.

20 Claims, 30 Drawing Sheets

Related U.S. Application Data continuation of application No. 15/400,034, filed on Jan. 6, 2017, now Pat. No. 9,820,566, which is a continuation of application No. 15/135,156, filed on Apr. 21, 2016, now Pat. No. 9,717,329, which is a continuation of application No. 14/795,627, filed on Jul. 9, 2015, now Pat. No. 9,470,357, which is a continuation of application No. 14/340,074, filed on Jul. 24, 2014, now Pat. No. 9,080,721, which is a continuation of application No. 13/964,870, filed on Aug. 12, 2013, now Pat. No. 8,839,723, which is a continuation of application No. 13/191,170, filed on Jul. 26, 2011, now Pat. No. 8,826,831.

(60) Provisional application No. 61/369,430, filed on Jul. 30, 2010, provisional application No. 61/369,392, filed on Jul. 30, 2010, provisional application No. 61/412,456, filed on Nov. 11, 2010.

(51) Int. Cl.
| | |
|---|---|
| *A47B 23/04* | (2006.01) |
| *A47B 9/10* | (2006.01) |
| *A47B 21/007* | (2006.01) |
| *A47B 9/18* | (2006.01) |
| *A47B 17/03* | (2006.01) |
| *A47B 21/03* | (2006.01) |
| *A47B 97/06* | (2006.01) |
| *F16M 11/10* | (2006.01) |
| *F16M 11/24* | (2006.01) |
| *F16M 13/02* | (2006.01) |
| *A47B 21/02* | (2006.01) |
| *F16M 11/18* | (2006.01) |
| *F16M 11/28* | (2006.01) |
| *A47B 9/12* | (2006.01) |
| *F16B 12/20* | (2006.01) |

(52) U.S. Cl.
CPC .......... *A47B 21/0073* (2013.01); *A47B 21/02* (2013.01); *A47B 21/0314* (2013.01); *A47B 23/04* (2013.01); *A47B 97/06* (2013.01); *F16M 11/04* (2013.01); *F16M 11/046* (2013.01); *F16M 11/10* (2013.01); *F16M 11/105* (2013.01); *F16M 11/18* (2013.01); *F16M 11/24* (2013.01); *F16M 11/28* (2013.01); *F16M 13/02* (2013.01); *F16M 13/022* (2013.01); *A47B 9/12* (2013.01); *A47B 2009/185* (2013.01); *A47B 2021/0321* (2013.01); *A47B 2023/049* (2013.01); *A47B 2200/0076* (2013.01); *F16B 12/2009* (2013.01); *F16M 2200/041* (2013.01); *F16M 2200/047* (2013.01); *F16M 2200/048* (2013.01); *F16M 2200/065* (2013.01); *F16M 2200/068* (2013.01); *Y10T 29/49826* (2015.01)

(58) Field of Classification Search
CPC ........ A47B 21/0374; A47B 2021/0321; A47B 2021/0335; A47B 2021/0357
USPC ........... 108/50.01, 50.02, 90, 137, 152, 147, 108/147.11; 248/917, 918, 920
See application file for complete search history.

(56) References Cited

U.S. PATENT DOCUMENTS

| | | |
|---|---|---|
| 2,168,209 A | 8/1939 | Haupt et al. |
| 2,713,530 A | 7/1955 | Chisholm |
| 2,876,362 A | 3/1959 | Foderaro |
| 3,140,559 A | 7/1964 | Grow et al. |
| 3,517,625 A | 6/1970 | Swett et al. |
| 3,575,368 A | 4/1971 | Thomas et al. |
| 3,741,131 A | 6/1973 | Leadbetter |
| 3,896,744 A | 7/1975 | Goebl |
| 4,496,200 A | 1/1985 | Hagstrom et al. |
| 4,533,096 A | 8/1985 | Baker et al. |
| 4,612,863 A | 9/1986 | Vonhausen et al. |
| 4,844,387 A | 7/1989 | Sorgi et al. |
| 4,852,500 A | 8/1989 | Ryburg et al. |
| 5,114,109 A | 5/1992 | Fitz et al. |
| 5,174,223 A | 12/1992 | Nagy et al. |
| 5,271,320 A | 12/1993 | Reneau |
| 5,277,392 A | 1/1994 | Rossman et al. |
| 5,381,738 A | 1/1995 | Meyer et al. |
| 5,400,721 A | 3/1995 | Greene |
| 5,484,124 A | 1/1996 | Billings et al. |
| 5,537,289 A | 7/1996 | Dahl et al. |
| 5,568,773 A | 10/1996 | Hung |
| 5,630,566 A | 5/1997 | Case |
| 5,735,222 A | 4/1998 | Webb et al. |
| 5,765,797 A | 6/1998 | Greene et al. |
| 5,779,209 A | 7/1998 | Rello |
| 5,799,917 A | 9/1998 | Li et al. |
| 5,911,178 A | 6/1999 | Alexander |
| 5,918,841 A | 7/1999 | Sweere et al. |
| 5,967,631 A | 10/1999 | Ko |
| 5,975,469 A | 11/1999 | Chen |
| 6,042,064 A | 3/2000 | Hong |
| 6,042,075 A | 3/2000 | Burch, Jr. |
| 6,076,785 A | 6/2000 | Oddsen, Jr. et al. |
| 6,085,665 A | 7/2000 | Smith et al. |
| 6,189,849 B1 | 2/2001 | Sweere et al. |
| 6,196,354 B1 | 3/2001 | Anthony et al. |
| 6,208,505 B1 | 3/2001 | Kuchta et al. |
| 6,286,794 B1 | 9/2001 | Harbin |
| 6,332,407 B1 | 12/2001 | Vardaro |
| 6,374,752 B1 | 4/2002 | Walser |
| 6,409,127 B1 | 6/2002 | VanderHeide et al. |
| 6,434,851 B1 | 8/2002 | Nishina |
| 6,517,040 B1 | 2/2003 | Wen et al. |
| 6,527,235 B1 | 3/2003 | Cotterill |
| 6,536,728 B1 | 3/2003 | Hagglund et al. |
| 6,637,350 B2 | 10/2003 | Mcksymick |
| 6,712,008 B1 | 3/2004 | Habenicht et al. |
| 6,783,105 B2 | 8/2004 | Oddsen, Jr. |
| 6,913,332 B1 | 7/2005 | Besterfield et al. |
| 6,994,306 B1 | 2/2006 | Sweere et al. |
| 6,997,422 B2 | 2/2006 | Sweere et al. |
| 7,032,523 B2 | 4/2006 | Forslund, III et al. |
| 7,178,469 B2 | 2/2007 | Goza |
| 7,252,277 B2 | 8/2007 | Sweere et al. |
| 7,392,969 B2 | 7/2008 | Chiu et al. |
| 7,448,800 B2 | 11/2008 | Steger |
| 7,506,853 B2 | 3/2009 | Sweere et al. |
| 7,546,811 B2 | 6/2009 | Owen et al. |
| 7,597,299 B2 | 10/2009 | Papendieck et al. |
| 7,621,500 B2 | 11/2009 | Ishizaki et al. |
| 7,646,425 B2 | 1/2010 | Bohaker et al. |
| 7,677,518 B2 | 3/2010 | Chouinard et al. |
| 7,694,920 B2 | 4/2010 | Lien et al. |
| 7,748,666 B2 | 7/2010 | Oddsen, Jr. |
| 7,780,125 B2 | 8/2010 | Yen et al. |
| D624,083 S | 9/2010 | Scheper et al. |
| 7,823,973 B2 | 11/2010 | Dragusin et al. |
| 7,854,417 B2 | 12/2010 | Gan et al. |
| 7,922,132 B2 | 4/2011 | Saez et al. |
| 7,997,211 B2 | 8/2011 | Peterson |
| 8,051,782 B2 | 11/2011 | Nethken et al. |
| 8,191,487 B2 | 6/2012 | Theesfeld et al. |
| 8,201,782 B2 | 6/2012 | Fan |
| 8,359,982 B2 | 1/2013 | Lebel et al. |
| 8,462,103 B1 | 6/2013 | Moscovitch et al. |
| 8,695,510 B2 | 4/2014 | Johnson et al. |
| 8,826,831 B2 | 9/2014 | Hazzard et al. |
| 8,839,723 B2 | 9/2014 | Hazzard et al. |
| 8,967,560 B2 | 3/2015 | Ergun et al. |
| 8,985,032 B1 | 3/2015 | Johnson |
| 9,046,213 B2 | 6/2015 | Huang |

(56) References Cited

U.S. PATENT DOCUMENTS

| | | |
|---|---|---|
| 9,080,721 B2 | 7/2015 | Hazzard |
| 9,188,275 B2 | 11/2015 | Ergun et al. |
| 9,266,243 B2 | 2/2016 | Swartz et al. |
| 9,470,357 B2 | 10/2016 | Hazzard et al. |
| 9,581,285 B2 | 2/2017 | Ergun et al. |
| 9,717,329 B2 | 8/2017 | Hazzard et al. |
| 9,743,757 B2 | 8/2017 | Ergun et al. |
| 9,820,566 B2 | 11/2017 | Hazzard et al. |
| 10,104,957 B2 | 10/2018 | Ergun et al. |
| 10,172,450 B2 | 1/2019 | Hazzard et al. |
| 2004/0188573 A1 | 9/2004 | Weatherly et al. |
| 2004/0194669 A1 | 10/2004 | Forslund, III et al. |
| 2004/0250635 A1 | 12/2004 | Sweere et al. |
| 2005/0022699 A1 | 2/2005 | Goza |
| 2005/0045788 A1 | 3/2005 | Mongeau |
| 2005/0184215 A1 | 8/2005 | Lin |
| 2005/0217540 A1 | 10/2005 | Novak |
| 2006/0096505 A1 | 5/2006 | Sykes |
| 2006/0130714 A1 | 6/2006 | Jones et al. |
| 2006/0145036 A1 | 7/2006 | Jones et al. |
| 2006/0185563 A1 | 8/2006 | Sweere et al. |
| 2006/0278770 A1 | 12/2006 | Macleod |
| 2007/0001076 A1 | 1/2007 | Asamarai et al. |
| 2007/0102600 A1 | 5/2007 | Ishizaki et al. |
| 2007/0139870 A1 | 6/2007 | Lin |
| 2007/0145020 A1 | 6/2007 | Takada et al. |
| 2007/0145203 A1 | 6/2007 | Takada |
| 2007/0228253 A1 | 10/2007 | Yun |
| 2007/0259554 A1 | 11/2007 | Lindblad et al. |
| 2007/0295679 A1 | 12/2007 | Lu |
| 2008/0026892 A1 | 1/2008 | Asamarai et al. |
| 2008/0173774 A1 | 7/2008 | Saez et al. |
| 2008/0232059 A1 | 9/2008 | Allen |
| 2009/0173847 A1 | 7/2009 | Dittmer et al. |
| 2009/0179121 A1 | 7/2009 | Lindblad et al. |
| 2010/0132122 A1 | 6/2010 | Hollingshead |
| 2010/0148647 A1 | 6/2010 | Burgess et al. |
| 2010/0327129 A1 | 12/2010 | Chen |
| 2012/0119040 A1 | 5/2012 | Ergun et al. |
| 2012/0187056 A1 | 7/2012 | Hazzard et al. |
| 2012/0187256 A1 | 7/2012 | Ergun et al. |
| 2013/0341476 A1 | 12/2013 | Hazzard et al. |
| 2014/0137773 A1 | 5/2014 | Mandel et al. |
| 2014/0332653 A1 | 11/2014 | Hazzard et al. |
| 2015/0198280 A1 | 7/2015 | Ergun et al. |
| 2015/0208799 A1 | 7/2015 | Ergun et al. |
| 2015/0320202 A1 | 11/2015 | Hazzard et al. |
| 2016/0309890 A1 | 10/2016 | Hazzard et al. |
| 2017/0013957 A1 | 1/2017 | Mcrorie, III |
| 2017/0112276 A1 | 4/2017 | Hazzard et al. |
| 2017/0196352 A1 | 7/2017 | King et al. |
| 2017/0332778 A1 | 11/2017 | Ergun et al. |
| 2018/0020825 A1 | 1/2018 | Hung |
| 2018/0020827 A1 | 1/2018 | Hazzard et al. |

FOREIGN PATENT DOCUMENTS

| | | |
|---|---|---|
| CA | 2805385 C | 6/2017 |
| CA | 2805389 | 2/2019 |
| CA | 2904750 | 2/2019 |
| CH | 663881 A5 | 1/1988 |
| CN | 1713839 A | 12/2005 |
| CN | 101433403 A | 5/2009 |
| CN | 201308251 Y | 9/2009 |
| CN | 101721054 A | 6/2010 |
| CN | 103068279 A | 4/2013 |
| CN | 103080626 A | 5/2013 |
| DE | 1091279 B | 10/1960 |
| DE | 1611809 A1 | 1/1971 |
| DE | 3414616 A1 | 10/1985 |
| DE | 3610612 A1 | 10/1987 |
| DE | 19539275 A1 | 4/1997 |
| DE | 19635236 C1 | 3/1998 |
| DE | 10228341 A1 | 1/2003 |
| DE | 10252931 B3 | 7/2004 |
| DE | 202009015569 U1 | 3/2010 |
| EP | 0280096 B1 | 11/1990 |
| EP | 0481159 A1 | 4/1992 |
| EP | 1364596 A4 | 8/2005 |
| EP | 2597993 A1 | 6/2013 |
| EP | 2598790 A1 | 6/2013 |
| EP | 2598790 B1 | 6/2019 |
| EP | 2597993 B1 | 7/2019 |
| JP | 59118776 A | 7/1984 |
| JP | 6133127 U | 2/1986 |
| JP | 62115265 U | 7/1987 |
| JP | 62195820 U | 12/1987 |
| JP | 05-265620 A | 10/1993 |
| JP | 0614466 A | 1/1994 |
| JP | 06181896 A | 7/1994 |
| JP | 2000-047599 A | 2/2000 |
| JP | 2000-105539 A | 4/2000 |
| JP | 2000-267579 A | 9/2000 |
| JP | 2000338891 A | 12/2000 |
| JP | 2002045241 A | 2/2002 |
| JP | 2002258984 A | 9/2002 |
| JP | 2003515193 A | 4/2003 |
| JP | 2004271595 A | 9/2004 |
| JP | 2006223364 A | 8/2006 |
| JP | 2007042063 A | 2/2007 |
| JP | 2007272605 A | 10/2007 |
| JP | 2010019893 A | 1/2010 |
| JP | 2013534341 A | 9/2013 |
| JP | 2013535287 A | 9/2013 |
| JP | 2004033415 A | 2/2014 |
| JP | 2016064134 A | 4/2016 |
| WO | WO-0137070 A2 | 5/2001 |
| WO | WO-03000091 A2 | 1/2003 |
| WO | WO-2007130611 A2 | 11/2007 |
| WO | WO-2010004674 A1 | 1/2010 |
| WO | WO-2012015821 A1 | 2/2012 |
| WO | WO-2016094731 A1 | 6/2016 |

OTHER PUBLICATIONS

"U.S. Appl. No. 13/191,170, Examiner Interview Summary dated Oct. 24, 2013", 2 pgs.

"U.S. Appl. No. 13/191,170, Non Final Office Action dated Feb. 1, 2013", 9 pgs.

"U.S. Appl. No. 13/191,170, Non Final Office Action dated May 1, 2014", 6 pgs.

"U.S. Appl. No. 13/191,170, Non Final Office Action dated May 29, 2014", 5 pgs.

"U.S. Appl. No. 13/191,170, Non Final Office Action dated Sep. 17, 2013", 7 pgs.

"U.S. Appl. No. 13/191,170, Notice of Allowance dated Jan. 30, 2014", 7 pgs.

"U.S. Appl. No. 13/191,170, Notice of Allowance dated Jul. 17, 2013", 8 pgs.

"U.S. Appl. No. 13/191,170, Notice of Allowance dated Aug. 1, 2014", 5 pgs.

"U.S. Appl. No. 13/191,170, Response filed Jan. 9, 2013 to Restriction Requirement dated Dec. 14, 2012", 2 pgs.

"U.S. Appl. No. 13/191,170, Response filed May 19, 2014 to Non Final Office Action dated May 1, 2014", 10 pgs.

"U.S. Appl. No. 13/191,170, Response filed Jun. 27, 2013 to Non Final Office Action dated Feb. 1, 2013", 20 pgs.

"U.S. Appl. No. 13/191,170, Response filed Jul. 17, 2014 to Non Final Office Action dated May 29, 2014", 9 pgs.

"U.S. Appl. No. 13/191,170, Response filed Dec. 18, 2013 to Non Final Office Action dated Sep. 17, 2013", 16 pgs.

"U.S. Appl. No. 13/191,170, Restriction Requirement dated Dec. 14, 2012", 7 pgs.

"U.S. Appl. No. 13/191,182, Advisory Action dated Jul. 16, 2014", 3 pgs.

"U.S. Appl. No. 13/191,182, Final Office Action dated Apr. 9, 2014", 23 pgs.

"U.S. Appl. No. 13/191,182, Non Final Office Action dated Jun. 21, 2013", 24 pgs.

(56) References Cited

OTHER PUBLICATIONS

"U.S. Appl. No. 13/191,182, Notice of Allowance dated Nov. 13, 2014", 10 pgs.
"U.S. Appl. No. 13/191,182, PTO Response to 312 Amendment dated Jan. 20, 2015", 2 pgs.
"U.S. Appl. No. 13/191,182, Response filed Jun. 9, 2014 to Final Office Action dated Apr. 9, 2014", 16 pgs.
"U.S. Appl. No. 13/191,182, Response filed Sep. 3, 2014 to Advisory Action dated Jul. 16, 2014", 17 pgs.
"U.S. Appl. No. 13/191,182, Response filed Dec. 19, 2013 to Non Final Office Action dated Jun. 21, 2013", 14 pgs.
"U.S. Appl. No. 13/294,399, Advisory Action dated Aug. 8, 2014", 3 pgs.
"U.S. Appl. No. 13/294,399, Examiner Interview Summary dated Jun. 4, 2015", 3 pgs.
"U.S. Appl. No. 13/294,399, Final Office Action dated Apr. 9, 2015", 21 pgs.
"U.S. Appl. No. 13/294,399, Final Office Action dated Jun. 6, 2014", 19 pgs.
"U.S. Appl. No. 13/294,399, Non Final Office Action dated Nov. 6, 2014", 28 pgs.
"U.S. Appl. No. 13/294,399, Non Final Office Action dated Nov. 7, 2013", 18 pgs.
"U.S. Appl. No. 13/294,399, Notice of Allowance dated Jul. 10, 2015", 12 pgs.
"U.S. Appl. No. 13/294,399, Notice of Allowance dated Aug. 18, 2015", 8 pgs.
"U.S. Appl. No. 13/294,399, Preliminary Amendment filed Jan. 27, 2012", 2 pgs.
"U.S. Appl. No. 13/294,399, Response filed Jan. 29, 2015 to Non Final Office Action dated Nov. 6, 2014", 20 pgs.
"U.S. Appl. No. 13/294,399, Response filed Feb. 7, 2014 to Non Final Office Action dated Nov. 7, 2013", 18 pgs.
"U.S. Appl. No. 13/294,399, Response filed Jul. 14, 2014 to Final Office Action dated Jun. 6, 2014", 19 pgs.
"U.S. Appl. No. 13/294,399, Response filed Sep. 20, 2013 to Restriction Requirement dated Aug. 9, 2013", 4 pgs.
"U.S. Appl. No. 13/294,399, Response filed May 22, 2015 to Final Office Action dated Apr. 9, 2015", 16 pgs.
"U.S. Appl. No. 13/294,399, Restriction Requirement dated Aug. 9, 2013", 9 pgs.
"U.S. Appl. No. 13/294,399, Supplemental Notice of Allowability dated Sep. 21, 2015", 4 pgs.
"U.S. Appl. No. 13/964,870, Final Office Action dated Feb. 25, 2014", 6 pgs.
"U.S. Appl. No. 13/964,870, Non Final Office Action dated Oct. 1, 2013", 9 pgs.
"U.S. Appl. No. 13/964,870, Notice of Allowance dated May 14, 2014", 6 pgs.
"U.S. Appl. No. 13/964,870, Preliminary Amendment filed Aug. 12, 2013", 6 pgs.
"U.S. Appl. No. 13/964,870, PTO Response to Rule 312 Communication dated Aug. 18, 2014", 2 pgs.
"U.S. Appl. No. 13/964,870, Response filed Feb. 3, 2014 to Non Final Office Action dated Oct. 1, 2013", 11 pgs.
"U.S. Appl. No. 13/964,870, Response filed Apr. 11, 2014 to Final Office Action dated Feb. 25, 2014", 6 pgs.
"U.S. Appl. No. 14/340,074, Final Office Action dated Mar. 3, 2015", 7 pgs.
"U.S. Appl. No. 14/340,074, Non Final Office Action dated Nov. 28, 2014", 7 pgs.
"U.S. Appl. No. 14/340,074, Notice of Allowance dated May 15, 2015", 5 pgs.
"U.S. Appl. No. 14/340,074, Response filed Apr. 22, 2015 to Final Office Action dated Mar. 3, 2015", 10 pgs.
"U.S. Appl. No. 14/340,074, Response filed Feb. 16, 2015 to Non Final Office Action dated Nov. 28, 2014", 9 pgs.
"U.S. Appl. No. 14/635,353, Examiner Interview Summary dated Nov. 4, 2016", 3 pgs.
"U.S. Appl. No. 14/635,353, Non Final Office Action dated Jun. 17, 2016", 16 pgs.
"U.S. Appl. No. 14/635,353, Notice of Allowance dated Oct. 4, 2016", 9 pgs.
"U.S. Appl. No. 14/635,353, Preliminary Amendment filed Mar. 2, 2015", 3 pgs.
"U.S. Appl. No. 14/635,353, PTO Response to Rule 312 Communication dated Jan. 10, 2017", 2 pgs.
"U.S. Appl. No. 14/635,353, Response filed May 31, 2016 to Restriction Requirement dated May 3, 2016", 8 pgs.
"U.S. Appl. No. 14/635,353, Response filed Sep. 2, 2016 to Non Final Office Action dated Jun. 17, 2016", 10 pgs.
"U.S. Appl. No. 14/635,353, Restriction Requirement dated May 3, 2016", 6 pgs.
"U.S. Appl. No. 14/635,353, Supplemental Preliminary Amendment filed Mar. 30, 2015", 7 pgs.
"U.S. Appl. No. 14/685,201, Advisory Action dated May 2, 2017", 6 pgs.
"U.S. Appl. No. 14/685,201, Final Office Action dated Feb. 2, 2017", 13 pgs.
"U.S. Appl. No. 14/685,201, Non Final Office Action dated Aug. 17, 2016", 12 pgs.
"U.S. Appl. No. 14/685,201, Notice of Allowance dated Jul. 3, 2017", 9 pgs.
"U.S. Appl. No. 14/685,201, Response filed Mar. 31, 2017 to Final Office Action dated Feb. 2, 2017", 11 pgs.
"U.S. Appl. No. 14/685,201, Response filed Jun. 20, 2017 to Final Office Action dated Feb. 2, 2017", 13 pgs.
"U.S. Appl. No. 14/685,201, Response filed Jul. 18, 2016 to Restriction Requirement dated May 17, 2016", 8 pgs.
"U.S. Appl. No. 14/685,201, Response Filed Nov. 10, 2016 to Non Final Office Action dated Aug. 17, 2016", 9 pgs.
"U.S. Appl. No. 14/685,201, Restriction Requirement dated May 17, 2016", 8 pgs.
"U.S. Appl. No. 14/795,627, Final Office Action dated Dec. 31, 2015", 6 pgs.
"U.S. Appl. No. 14/795,627, Non Final Office Action dated Sep. 9, 2015", 9 pgs.
"U.S. Appl. No. 14/795,627, Notice of Allowability dated Aug. 4, 2016", 2 pgs.
"U.S. Appl. No. 14/795,627, Notice of Allowance dated Mar. 9, 2016", 5 pgs.
"U.S. Appl. No. 14/795,627, Notice of Allowance dated Jul. 20, 2016", 5 pgs.
"U.S. Appl. No. 14/795,627, Preliminary Amendment filed Jul. 9, 2015", 3 pgs.
"U.S. Appl. No. 14/795,627, Response filed Feb. 18, 2016 to Final Office Action dated Dec. 31, 2015", 7 pgs.
"U.S. Appl. No. 14/795,627, Response filed Dec. 9, 2015 to Non Final Office Action dated Sep. 9, 2015", 9 pgs.
"U.S. Appl. No. 14/795,627, Supplemental Preliminary Amendment filed Jul. 28, 2015", 5 pgs.
"U.S. Appl. No. 15/135,156, Final Office Action dated Mar. 2, 2017", 6 pgs.
"U.S. Appl. No. 15/135,156, Non Final Office Action dated Sep. 21, 2016", 8 pgs.
"U.S. Appl. No. 15/135,156, Notice of Allowability dated Jun. 2, 2017", 2 pgs.
"U.S. Appl. No. 15/135,156, Notice of Allowance dated May 8, 2017", 5 pgs.
"U.S. Appl. No. 15/135,156, PTO Response to Rule 312 Communication dated Jul. 7, 2017", 2 pgs.
"U.S. Appl. No. 15/135,156, Response filed Jan. 19, 2017 to Non Final Office Action dated Sep. 21, 2016", 9 pgs.
"U.S. Appl. No. 15/135,156, Response filed Apr. 25, 2017 to Final Office Action dated Mar. 2, 2017", 8 pgs.
"U.S. Appl. No. 15/400,034, Final Office Action dated Apr. 24, 2017", 7 pgs.
"U.S. Appl. No. 15/400,034, Non Final Office Action dated Mar. 9, 2017", 10 pgs.
"U.S. Appl. No. 15/400,034, Notice of Allowability dated Aug. 22, 2017", 2 pgs.

(56) References Cited

OTHER PUBLICATIONS

"U.S. Appl. No. 15/400,034, Notice of Allowability dated Oct. 3, 2017", 2 pgs.
"U.S. Appl. No. 15/400,034, Notice of Allowance dated Aug. 1, 2017", 5 pgs.
"U.S. Appl. No. 15/400,034, Preliminary Amendment filed Jan. 10, 2017", 7 pgs.
"U.S. Appl. No. 15/400,034, Response filed Apr. 5, 2017 to Non-Final Office Action dated Mar. 9, 2017", 12 pgs.
"U.S. Appl. No. 15/400,034, Response filed Jul. 24, 2017 to Final Office Action dated Apr. 24, 2017", 10 pgs.
"U.S. Appl. No. 15/663,088, Non Final Office Action dated Nov. 30, 2017", 10 pgs.
"U.S. Appl. No. 15/663,088, Notice of Allowance dated May 7, 2018", 10 pgs.
"U.S. Appl. No. 15/663,088, Response filed Jan. 10, 2018 to Non Final Office Action dated Nov. 30, 2017", 11 pgs.
"U.S. Appl. No. 15/720,855, Final Office Action dated Mar. 7, 2018", 7 pgs.
"U.S. Appl. No. 15/720,855, Non Final Office Action dated Jul. 5, 2018", 7 pgs.
"U.S. Appl. No. 15/720,855, Non Final Office Action dated Nov. 29, 2017", 11 pgs.
"U.S. Appl. No. 15/720,855, Notice of Allowability dated Apr. 30, 2018", 2 pgs.
"U.S. Appl. No. 15/720,855, Notice of Allowability dated May 8, 2018", 2 pgs.
"U.S. Appl. No. 15/720,855, Notice of Allowance dated Apr. 17, 2018", 5 pgs.
"U.S. Appl. No. 15/720,855, Notice of Allowance dated Sep. 4, 2018", 5 pgs.
"U.S. Appl. No. 15/720,855, Preliminary Amendment filed Oct. 2, 2017", 6 pgs.
"U.S. Appl. No. 15/720,855, Respnse filed Feb. 22, 2018 to Non Final Office Action dated Nov. 29, 2017", 12 pgs.
"U.S. Appl. No. 15/720,855, Response filed Jul. 20, 2018 to Non Final Office Action dated May 5, 2018", 7 pgs.
"U.S. Appl. No. 15/720,855, Response filed Mar. 15, 2018 to Final Office Action dated Mar. 7, 2018", 7 pgs.
"Australian Application Serial No. 2011282862, Amendment filed Jul. 23, 2013", 101 pgs.
"Australian Application Serial No. 2011282862, Examiners Report dated Apr. 22, 2014", 3 pgs.
"Australian Application Serial No. 2011282862, Response filed Aug. 8, 2014 to Examiners Report dated Apr. 22, 2014", 197 pgs.
"Australian Application Serial No. 2011282862, Subsequent Examiners Report dated Aug. 11, 2014", 3 pgs.
"Australian Application Serial No. 2011282863 Response filed Jun. 30, 2015 to Office Action dated Feb. 24, 2015", 16 pgs.
"Australian Application Serial No. 2011282863, First Examiner Report dated Oct. 16, 2014", 3 pgs.
"Australian Application Serial No. 2011282863, Response filed Jan. 29, 2015 to First Examiner Report dated Oct. 16, 2014", 102 pgs.
"Australian Application Serial No. 2011282863, Subsequent Examiners Report dated Feb. 24, 2015", 3 pgs.
"Australian Application Serial No. 2015227496, First Examiner Report dated Aug. 3, 2016", 4 pgs.
"Australian Application Serial No. 2015227496, Response filed Jan. 24, 2017 to Subsequent Examiners Report dated Jan. 4, 2017", 1 pg.
"Australian Application Serial No. 2015227496, Response filed Nov. 4, 2016 to First Examiner Report dated Aug. 3, 2016", 126 pgs.
"Australian Application Serial No. 2015227496, Subsequent Examiners Report dated Jan. 4, 2017", 3 pgs.
"Canadian Application Serial No. 2,805,385, Office Action dated Aug. 15, 2016", 4 pgs.
"Canadian Application Serial No. 2,805,385, Response filed Feb. 1, 2017 to Office Action dated Aug. 15, 2016", 10 pgs.
"Canadian Application Serial No. 2,805,389, Office Action dated Feb. 6, 2018", 4 pgs.
"Canadian Application Serial No. 2,805,389, Office Action dated May 3, 2017", 5 pgs.
"Canadian Application Serial No. 2,805,389, Response filed Jul. 19, 2018 to Office Action dated Feb. 6, 2018", 16 pgs.
"Canadian Application Serial No. 2,805,389, Response filed Nov. 1, 2017 to Office Action dated May 3, 2017", 101 pgs.
"Canadian Application Serial No. 2,805,389, Voluntary Amendment filed Nov. 14, 2018", 17 pgs.
"Canadian Application Serial No. 2,904,750, Office Action dated Mar. 19, 2018", 4 pgs.
"Canadian Application Serial No. 2,904,750, Office Action dated Aug. 9, 2017", 5 pgs.
"Canadian Application Serial No. 2,904,750, Office Action dated Nov. 29, 2016", 5 pgs.
"Canadian Application Serial No. 2,904,750, Response filed Jan. 15, 2018 to Office Action dated Aug. 9, 2017", 5 pgs.
"Canadian Application Serial No. 2,904,750, Response filed May 11, 2017 to Office Action dated Nov. 29, 2016", 19 pgs.
"Canadian Application Serial No. 2,904,750, Response filed Jul. 19, 2018 to Office Action dated Mar. 19, 2018", 5 pgs.
"Canadian Application Serial No. 2,904,750, Voluntary Amendment filed Nov. 14, 2018", 5 pgs.
"Chinese Application Serial No. 201180037429.2 Response filed Jul. 7, 2015 to Office Action dated May 6, 2015", (w/ English Translation of Claims), 9 pgs.
"Chinese Application Serial No. 201180037429.2, Office Action dated May 6, 2015", 3 pgs.
"Chinese Application Serial No. 201180037429.2, Office Action dated Aug. 21, 2014", 17 pgs.
"Chinese Application Serial No. 201180037429.2, Response filed Jan. 4, 2015 to Office Action dated Aug. 21, 2014", (w/ English Translation of Amended Claims), 18 pgs.
"Chinese Application Serial No. 201180037431.X Response filed May 19, 2015 to Office Action dated Mar. 4, 2015", (w/ English Translation of Claims), 30 pgs.
"Chinese Application Serial No. 201180037431.X, Office Action dated Mar. 3, 2016".
"Chinese Application Serial No. 201180037431.X, Office Action dated Mar. 4, 2015", 16 pgs.
"Chinese Application Serial No. 201180037431.X, Office Action dated Jun. 27, 2014", 18 pgs.
"Chinese Application Serial No. 201180037431.X, Office Action dated Sep. 9, 2015", (w/ English Translation), 39 pgs.
"Chinese Application No. 201180037431.X, Response filed Mar. 7, 2016 to Telephone Objections", (w/ English Translation), 6 pgs.
"Chinese Application Serial No. 201180037431.X, Response filed Nov. 12, 2014 to Office Action dated Jun. 27, 2014", (w/ English Translation of Claims), 19 pgs.
"Chinese Application Serial No. 201180037431.X, Response filed Nov. 24, 2015 to Office Action dated Sep. 9, 2015", (w/ English Translation of Amended Claims), 20 pgs.
"Chinese Application Serial No. 201510870758.5, Office Action dated May 3, 2018", w/ English Translation, 55 pgs.
"Chinese Application Serial No. 201510870758.5, Office Action dated Jul. 3, 2017", (w/ English Translation), 8 pgs.
"Chinese Application Serial No. 201510870758.5, Office Action dated Dec. 17, 2018", w/ English Translation, 5 pgs.
"Chinese Application Serial No. 201510870758.5, Response filed Jul. 18, 2018 to Office Action dated May 3, 2018", w/ English claims, 22 pgs.
"Chinese Application Serial No. 201510870758.5, Response filed Nov. 20, 2017 to Office Action dated Jul. 3, 2017", w/ claims in English, 21 pgs.
"Chinese Application Serial No. 201510870758.5, Voluntary Amendment filed Jun. 17, 2016", (w/ English Translation of Claims), 19 pgs.
"CreaTech Adjustable, space-saving 200 Combo Arm for flat panel monitors and keyboards", (2001), 2 pgs.
"Ergo Desktop Frequently Asked Questions", [online]. [retrieved on Jul. 29, 2010]. Retrieved from the Internet: <http://www.ergodesktop.com/contenl/ frequently-asked-questions>, (Jul. 29, 2010), 3 pgs.

(56) References Cited

OTHER PUBLICATIONS

"Ergo Desktop Product Comparison", [online]. [retrieved on Jul. 29, 2010]. Retrieved from the Internet: <http://www.ergodesktop.com/content/product-comparison>, (Jul. 29, 2010), 3 pgs.

"Ergo Desktop, The Kangaroo", [online]. [retrieved on Jul. 29, 2010]. Retrieved from the Internet: <hllp:l/www.ergodesktop.com/contenl/kangaroo-O#>, (Jul. 29, 2010), 3 pgs.

"Ergo Desktop, The Kangaroo Elite", [online]. [retrieved on Jul. 29, 2010]. Retrieved from the Internet: <http://www.ergodesktop.com/contenl/kangaroo-elite>, (Jul. 29, 2010), 3 pgs.

"Ergo Desktop, The Kangaroo Pro", [online]. [retrieved on Jul. 29, 2010]. Retrieved from the Internet: <http://www.ergodesktop.com/contenl/kangaroo- pro>, (Jul. 29, 2010), 3 pgs.

"Ergo Desktop, The Wallaby", [online] [retrieved on Jul. 29, 2010]. Retrieved from Internet: <http://www.ergodesktop.com/contenl/wallaby>, (Jul. 29, 2010), 3 pgs.

"Ergotron 200 Series, Combination flat panel/keyboard arm", [online]. [archived on Jul. 14, 2006]. Retrieved from the Internet: <URL: https://web.archive.org/web/20060714055438/http://www.ergotron.com/Portals/0/literature/productSheets/english/05-044.pdf>, (2005), 2 pgs.

"Ergotron 45-216-216 styleView HD Combo System", [online]. [retrieved on Jul. 8, 2010]. Retrieved from the Internet: <http://www.ergotron.com/Products/tabid/65/PRDID/270/language/en-US/Default.aspx>, (Jul. 8, 2010), 3 pgs.

"Ergotron HD Series Arms, Height Adjustable Systems", [online]. [archived on Jun. 18, 2006}. Retrieved from the Internet: <URL: https://web.archive.org/web/20060618051855/http://ergotron.com/Portals/0/literature/productSheets/english/05-046.pdf>, (2005), 2 pgs.

"Ergotron HD Series Arms, Height Adjustable Systems, Product Sheet", (Sep. 2007), 2 pgs.

"Ergotron LX, LX Wall Mount System, Dimensional Illustrations", (Dec. 2006), 3 pgs.

"Ergotron Neo-Fiex LCD Arm Product Sheet", (Dec. 7, 2006), 2 pgs.

"Ergotron Neo-Flex Combo Lift Stand: 33-331-057", [online]. Retrieved from the Internet: <URL: https://web.archive.org/web/20081119142557/http://www.ergotron.com/Portals/0/literature/dimensionIllustrations/DIM-074-A.pdf>, (2008), 1 pg.

"Ergotron Neo-Flex Lift Stands", [online]. [archived on Oct. 8, 2008]. Retrieved from the Internet: <URL: https://web.archive.org/web/20081008180046/http://www.ergotron.com/Portals/0/literatire/productsheets/english/05-074-EA.pdf>, (2008), 2 pgs.

"Ergotron Notebook Arm Mount Tray", first available at Amazon.com on Jul. 7, 2004, [online]. Retrieved from the Internet: <http://www. amazon.com/Ergotron-Nolebook-Arm-Mount-Tray/dp/BOOOECUMTS>, (Aug. 23, 2013), 6 pgs.

"Ergotron Style View HD Combo, Product Sheet", (Oct. 2009), 2 pgs.

"Ergotron WorkFit C-Mod", Product Sheet, (Nov. 2009), 2 pgs.

"Ergotron WorkFit C-Mod, Single LCD Mount, LD", Dimensional and Range of Motion Illustrations, (Aug. 2009), 4 pgs.

"Ergotron WorkFit LD Assembly Instructions", (May 2009), 15 pgs.

"European Application Serial No. 11813049.1, Communication Pursuant to Article 94(3) EPC dated Apr. 10, 2017", 3 pgs.

"European Application Serial No. 11813049.1, Extended European Search Report dated Jul. 21, 2014", 7 pgs.

"European Application Serial No. 11813049.1, Office Action dated May 10, 2013", 2 pgs.

"European Application Serial No. 11813049.1, Office Action dated Aug. 7, 2014", 1 pg.

"European Application Serial No. 11813049.1, Response filed Feb. 10, 2015 to Office Action dated Aug. 7, 2014", 11 pgs.

"European Application Serial No. 11813049.1, Response filed Aug. 9, 2017 to Communication Pursuant to Article 94(3) EPC dated Apr. 10, 2017", 13 pgs.

"European Application Serial No. 11813049.1, Response filed Nov. 19, 2013 to Office Action dated May 10, 2013", 13 pgs.

"European Application Serial No. 11813050.9, Communication Pursuant to Article 94(3) EPC dated May 2, 2017", 4 pgs.

"European Application Serial No. 11813050.9, Office Action dated Mar. 8, 2013", 2 pgs.

"European Application Serial No. 11813050.9, Response filed Feb. 13, 2015 to Office Action dated Jul. 22, 2014", 17 pgs.

"European Application No. 11813050.9, Response filed Sep. 11, 2013 to Office Action dated Mar. 8, 2013", 14 pgs.

"European Application Serial No. 11813050.9, Response filed Sep. 12, 2017 to Communication Pursuant to Article 94(3) EPC dated May 2, 2017", 28 pgs.

"European Application Serial No. 11813050.9, Supplementary European Search Report dated Jul. 22, 2014", 7 pgs.

"European Application Serial No. 17157991.5, Extended European Search Report dated Jul. 19, 2017", 7 pgs.

"European Application Serial No. 17157991.5, Response filed Feb. 15, 2018 to Extended European Search Report dated Jul. 19, 2017", 15 pgs.

"Furniture element for an office screen", EP481159A1 (Apr. 22, 1992). English-language machine translation. retrieved from Lexis-Nexis Total Patent, [online]. Retrieved from the Internet: <URL: https://www.lexisnexis.com/totalpatent>, (Oct. 8, 2013), 7 pgs.

"Geek Reviews, Ergodesktop's Kangaroo, An Adjustable Stand Up Desk", GeekCulture.com, [online]. [retrieved on Aug. 28, 2010]. Retrieved from the Internet: <URL: http://www.geekculture.com/blurbs/reviews/kangaroo.html>, (2010), 4 pgs.

"Health Postures TaskMate 6100 with adjustable keyboard mechanism 6120", sales order dale Sep. 26, 2008, [online]. Retrieved from the Internet: <https://healthpostures.com/products/executive-computer-taskmate-61 00/ and http://www.ergocanada.com/delailed_specification_pages/health_postures_taskmate_executive.html>, (Aug. 23, 2013), 12 pgs.

"International Application Serial No. PCT/US2011/045369, International Preliminary Report on Patentability dated Feb. 14, 2013", 13 pgs.

"International Application Serial No. PCT/US2011/045369, International Search Report dated Jan. 4, 2012", 2 pgs.

"International Application Serial No. PCT/US2011/045369, Written Opinion dated Jan. 4, 2012", 11 pgs.

"International Application Serial No. PCT/US2011/045370, International Preliminary Report on Patentability dated Feb. 14, 2013", 9 pgs.

"International Application Serial No. PCT/US2011/045370, International Search Report dated Dec. 23, 2011", 2 pgs.

"International Application Serial No. PCT/US2011/045370, Written Opinion dated Dec. 23, 2011", 7 pgs.

"IOP Flat Panel Monitor Arm Model No. 9140", Innovative Office Products, Inc., [online]. [archived on Aug. 3, 2004]. Retrieved from the Internet: <URL: https://web.archive.org/web/20040803232955/http://www.lcdarms.com/pdf/9140.pdf>, (2003), 2 pgs.

"Japanese Application Serial No. 2013-523197, Argument and Amendment filed Feb. 20, 2015 in response to Office Action dated Oct. 7, 2014", (w/ English Translation of Amendment), 20 pgs.

"Japanese Application Serial No. 2013-523197, Office Action dated Oct. 7, 2014", (w/ English Translation), 10 pgs.

"Japanese Application Serial No. 2013-523198 Response filed May 11, 2015 to Office Action dated Nov. 11, 2014", (w/ English Translation of Claims), 17 pgs.

"Japanese Application Serial No. 2013-523198, Response filed Oct. 15, 2014 to Office Action dated Jul. 15, 2014", (w/ English Translation of Claims), 18 pgs.

"Japanese Application Serial No. 2013-523198, Office Action dated Jul. 15, 2014", (w/ English Translation), 13 pgs.

"Japanese Application Serial No. 2013-523198, Office Action dated Nov. 11, 2014", (w/ English Translation), 13 pgs.

"Japanese Application Serial No. 2015-217722, Amendment filed Dec. 4, 2015", (w/ English Translation of Claims), 8 pgs.

"Japanese Application Serial No. 2015-217722, Office Action dated May 9, 2017", W/ English Translation, 21 pgs.

"Japanese Application Serial No. 2015-217722, Office Action dated Nov. 29, 2016", (w/ English Translation), 16 pgs.

"Japanese Application Serial No. 2015-217722, Response filed Apr. 3, 2017 to Office Action dated Nov. 29, 2016", (w/ English Translation of Amended Claims), 13 pgs.

"Neo-Fiex LCD Arm", Ergotron, Inc., (2006), 2 pgs.

(56) References Cited

OTHER PUBLICATIONS

"Chinese Application Serial No. 201510870758.5, Office Action dated May 5, 2019", w/ English Translation, 9 pgs.

"Chinese Application Serial No. 201510870758.5, Response filed Mar. 1, 2019 to Office Action dated Dec. 17, 2018", w/ English Claims, 20 pgs.

"Chinese Application Serial No. 201510870758.5, Response filed Jul. 22, 2019 to Office Action dated May 5, 2019", w/ English Claims, 20 pgs.

"European Application Serial No. 17157991.5, Communication Pursuant to Article 94(3) EPC dated Jan. 16, 2020", 4 pgs.

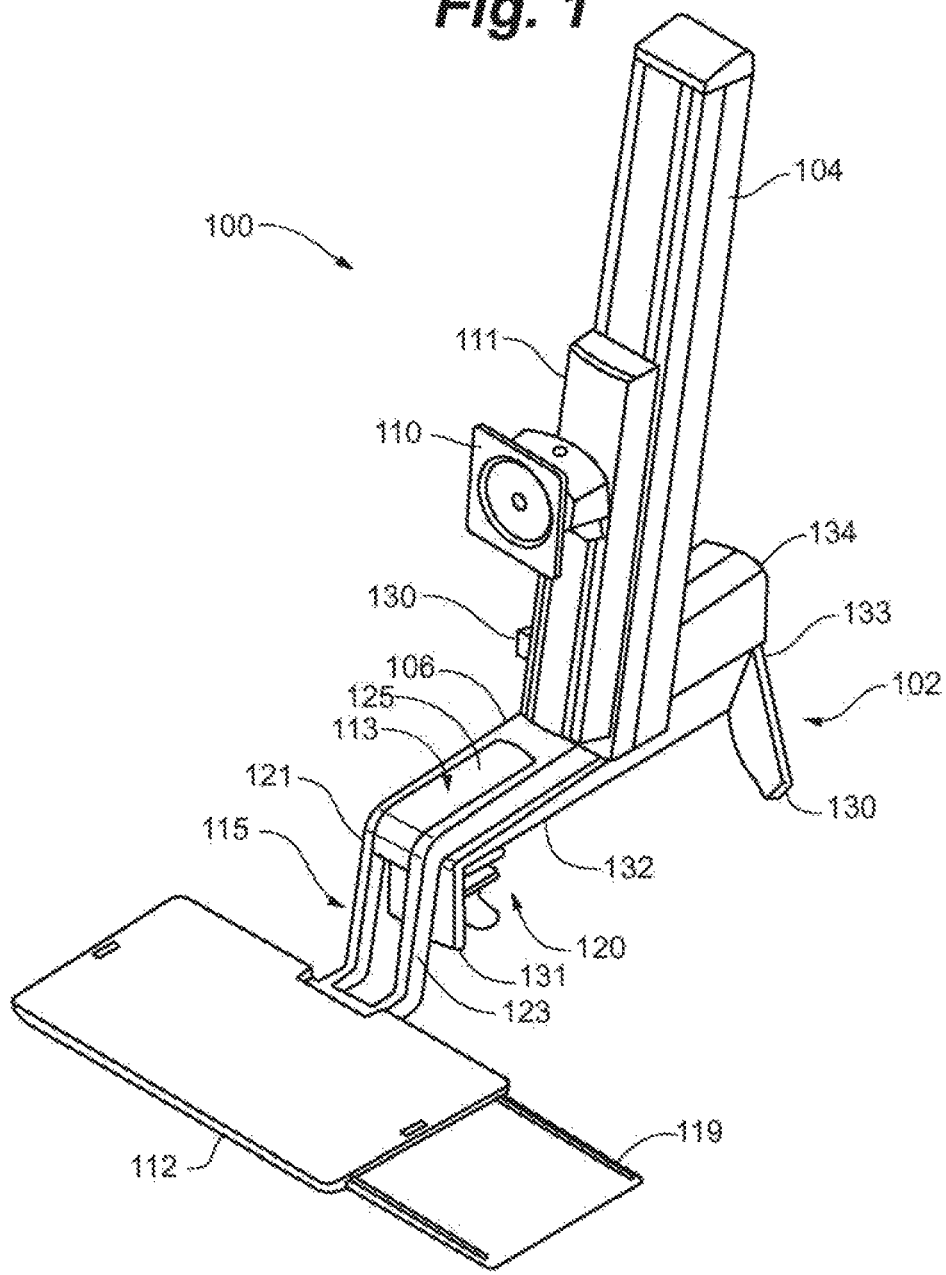

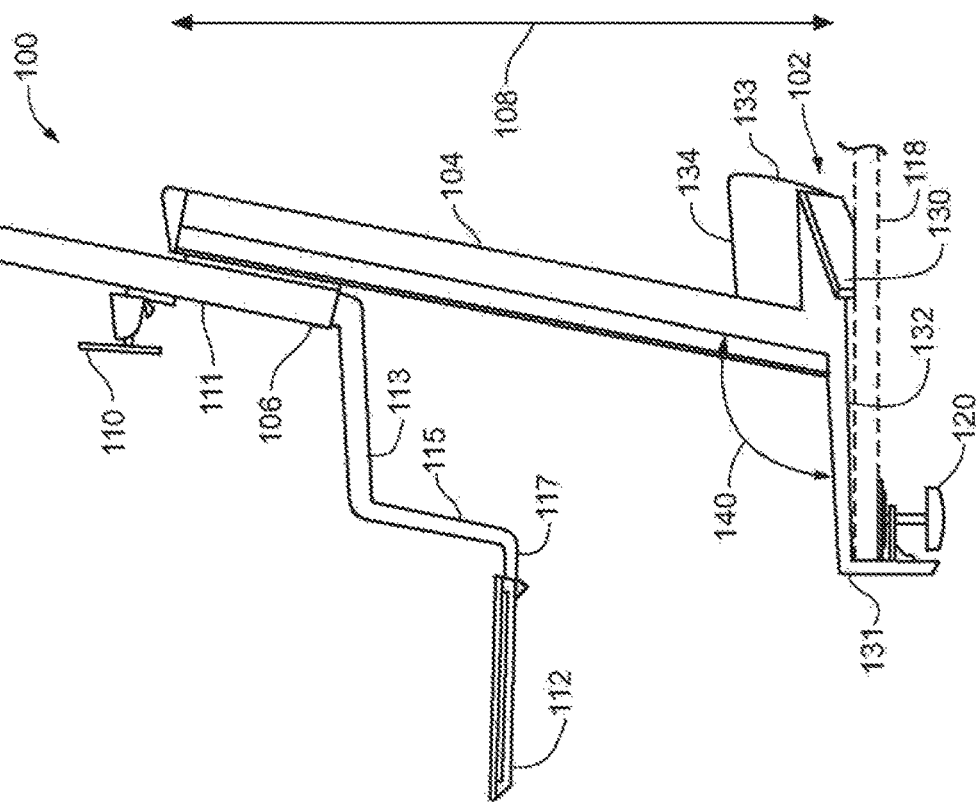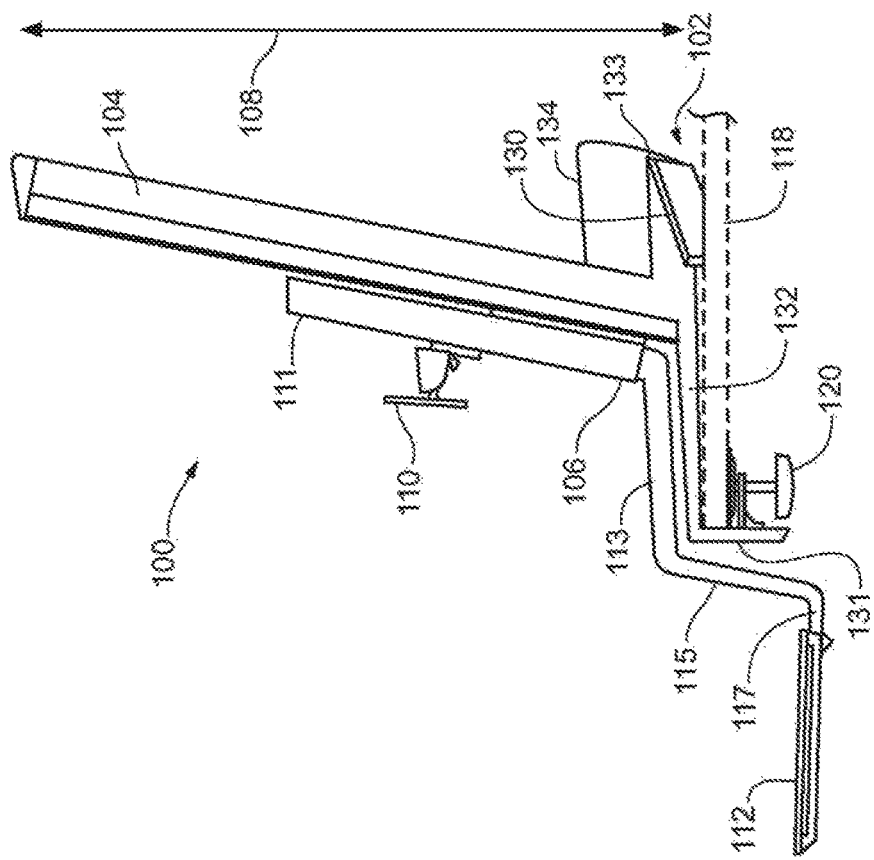

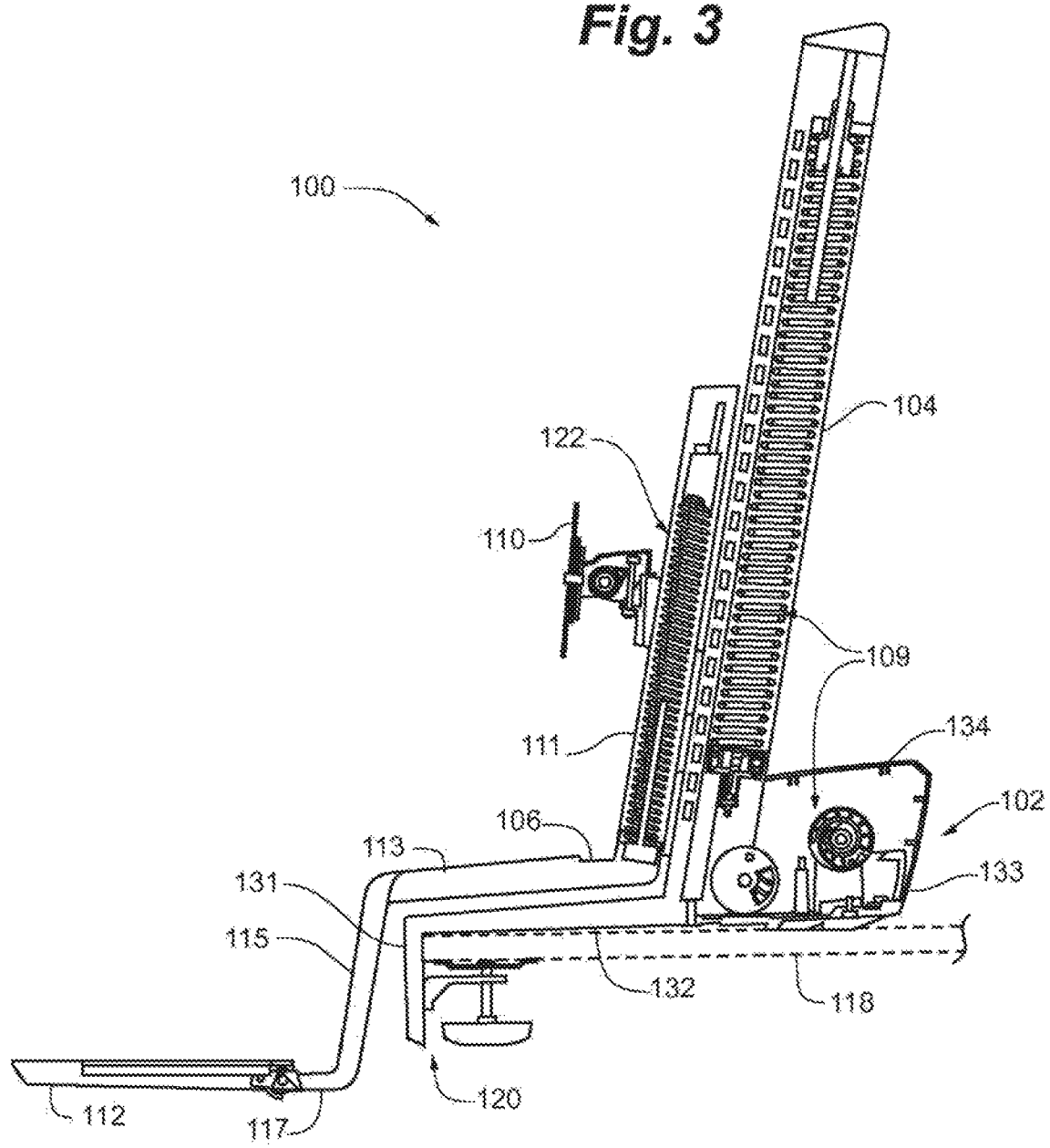

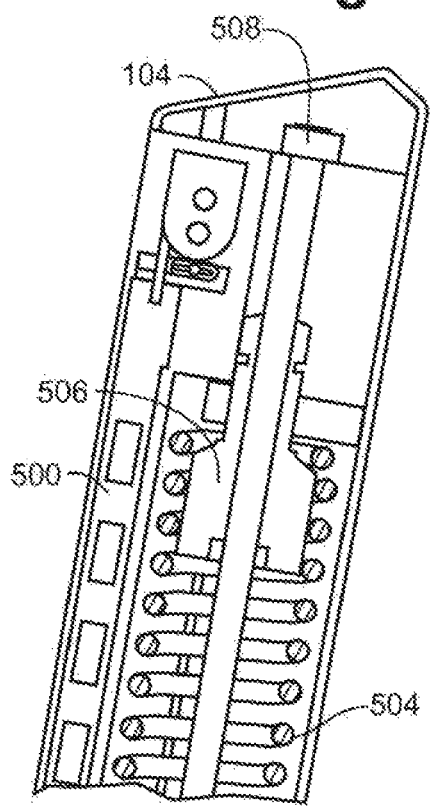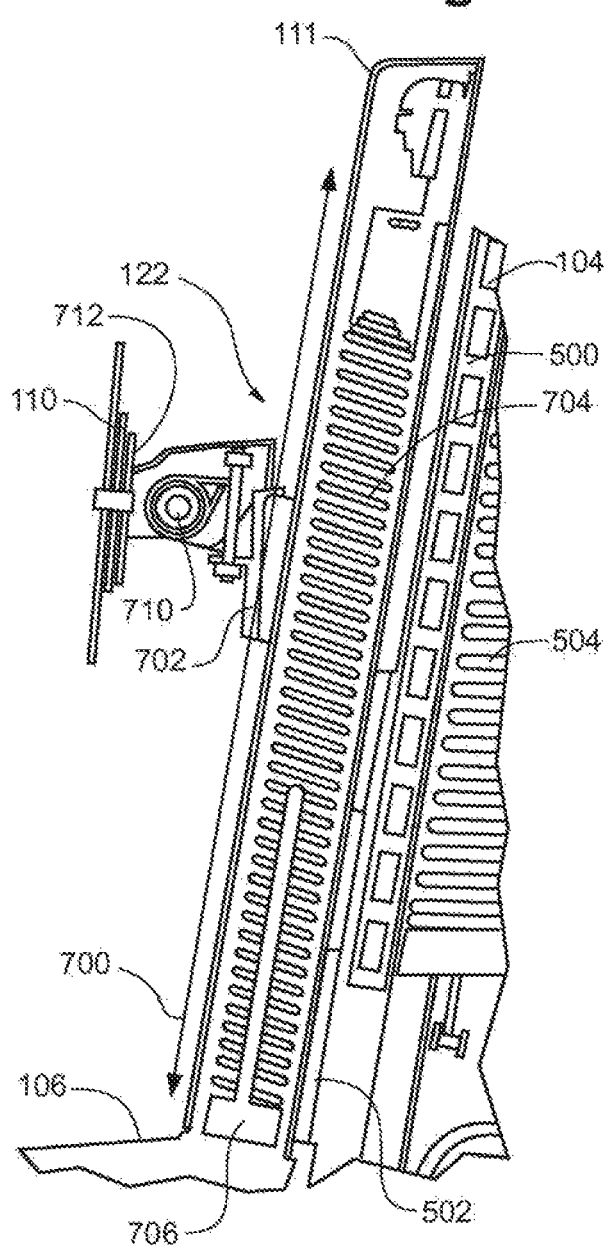

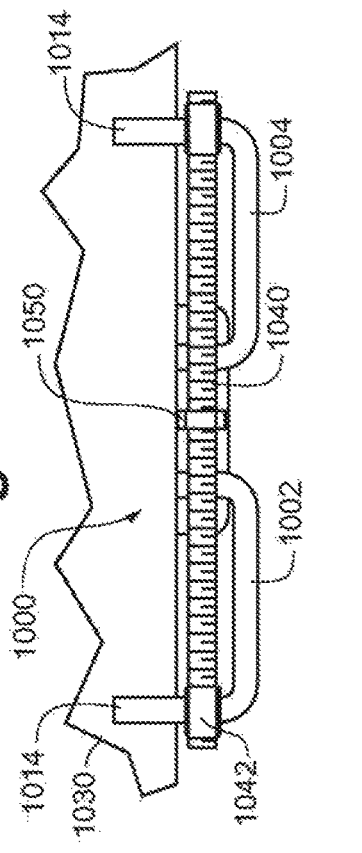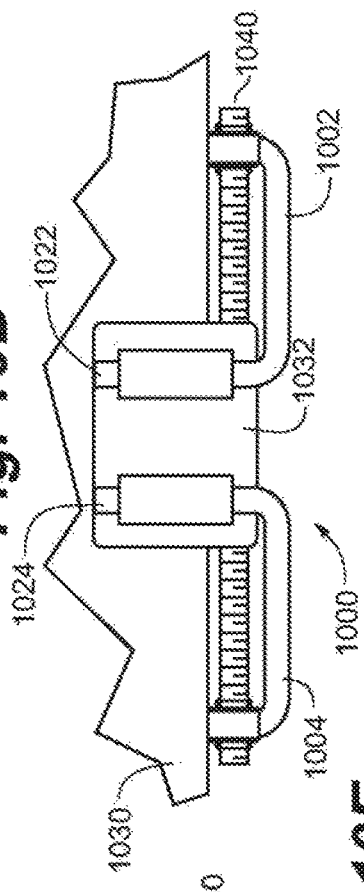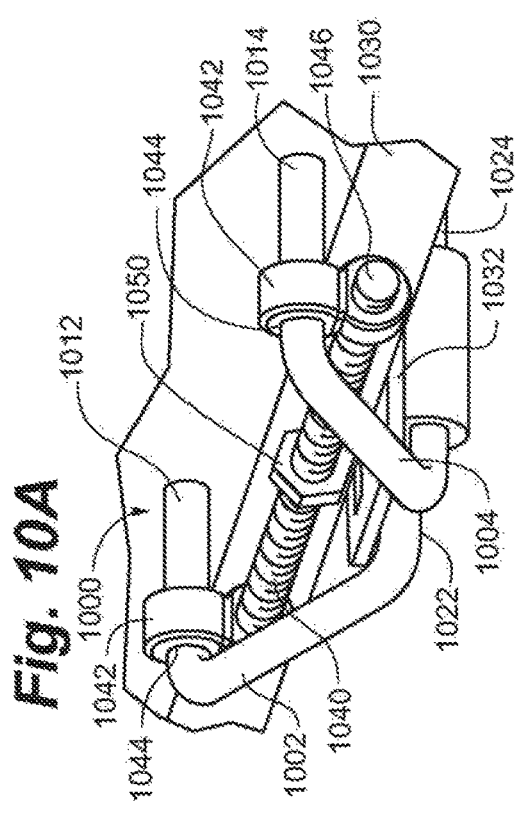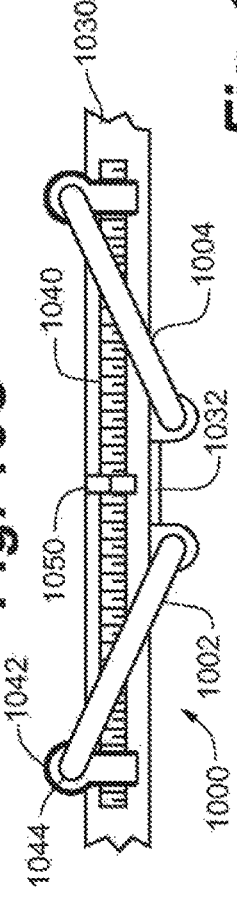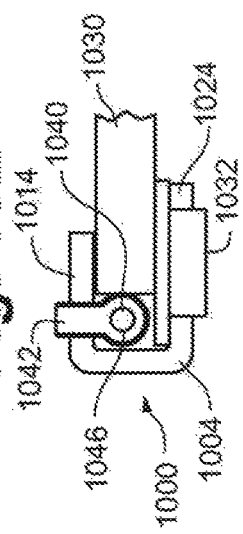

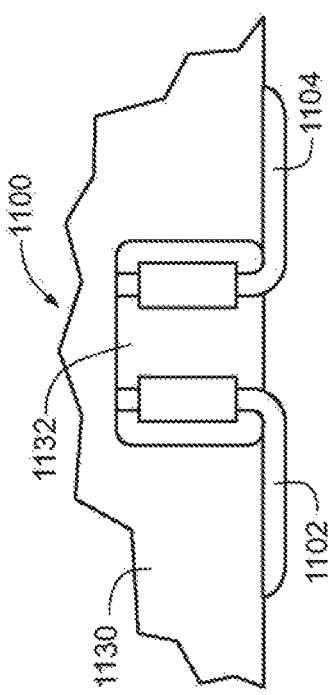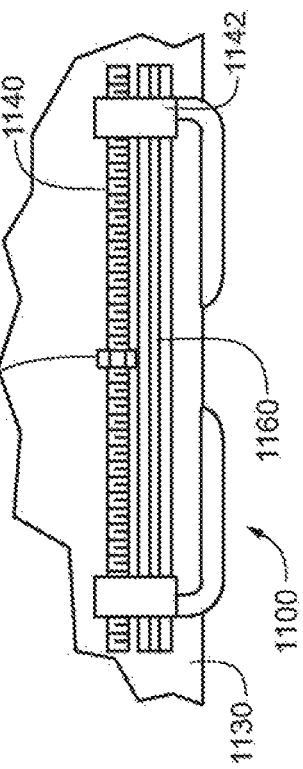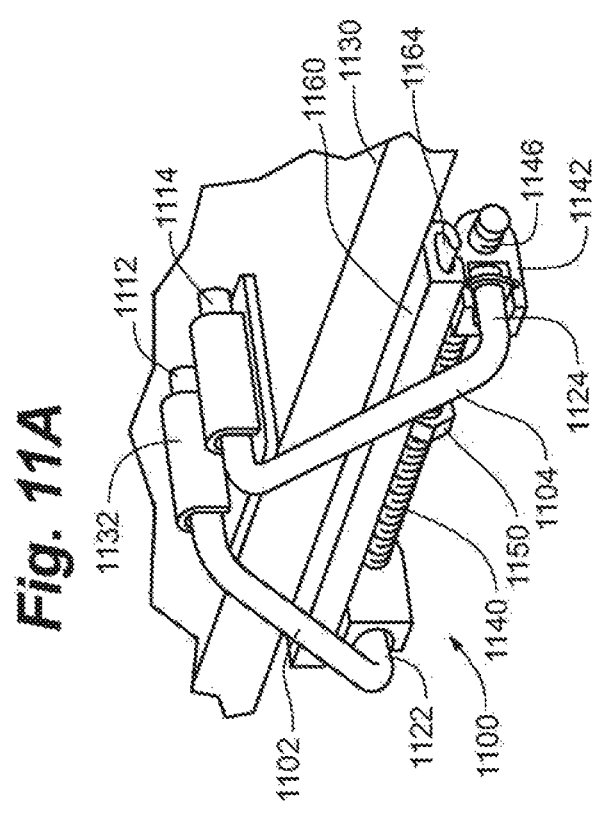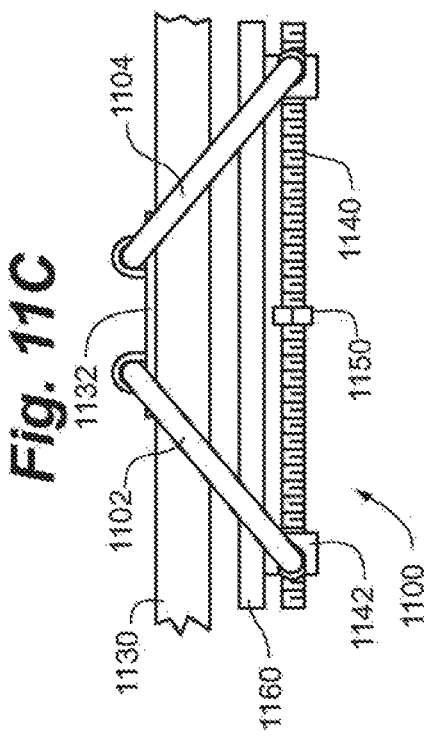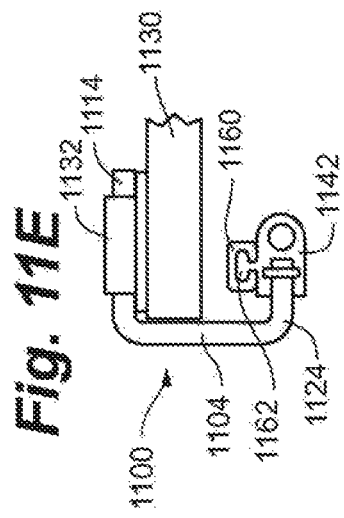

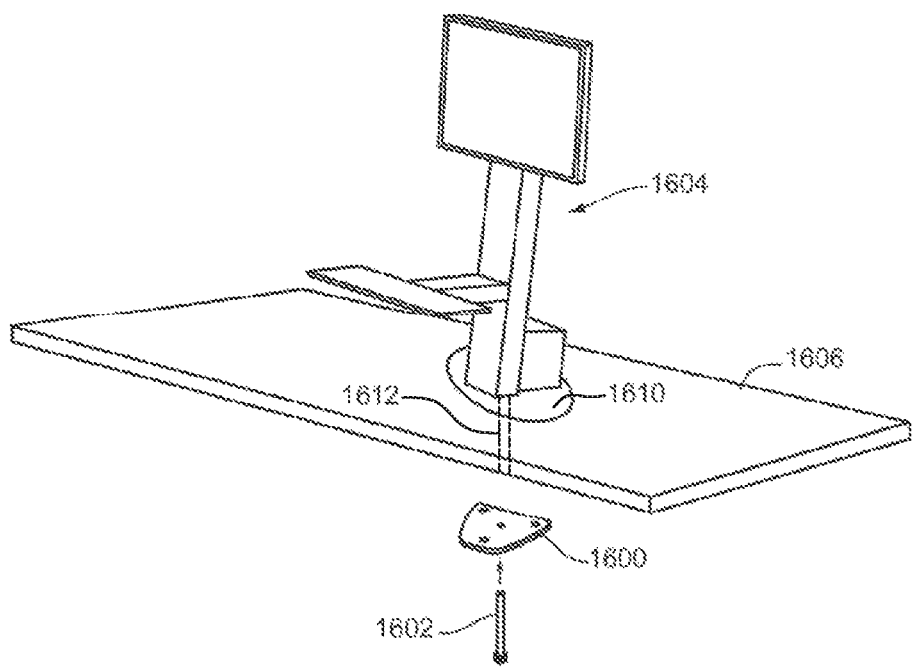

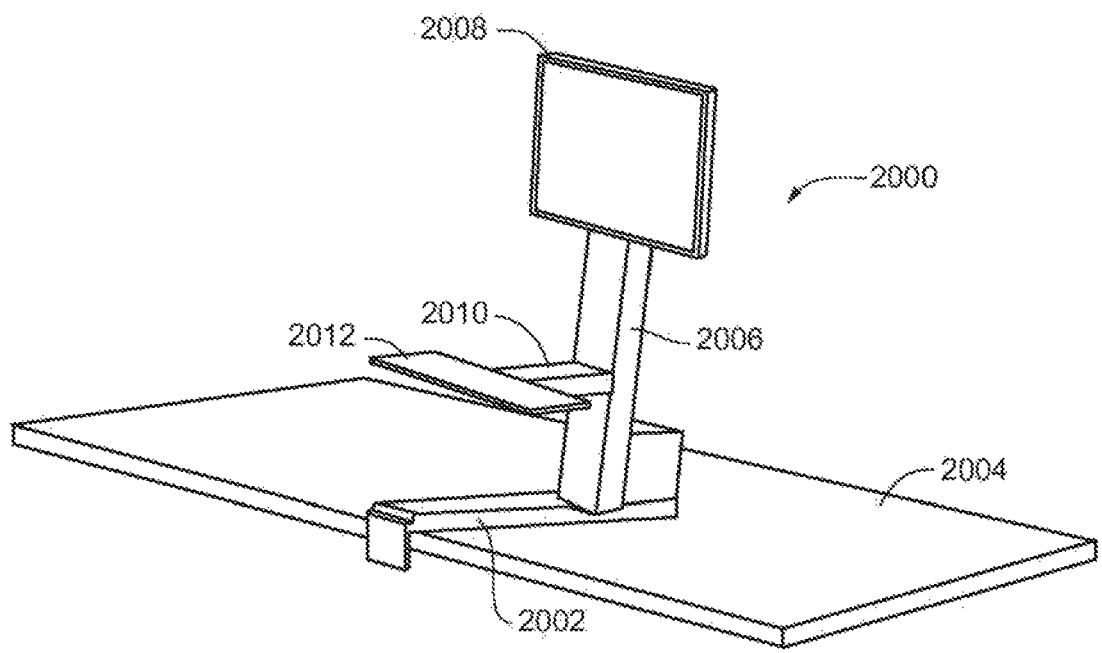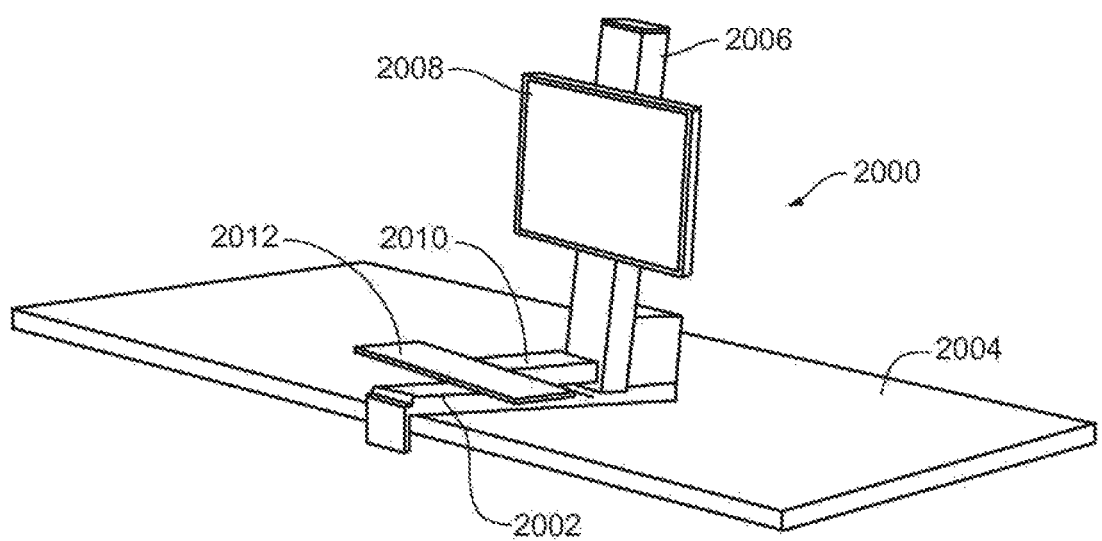

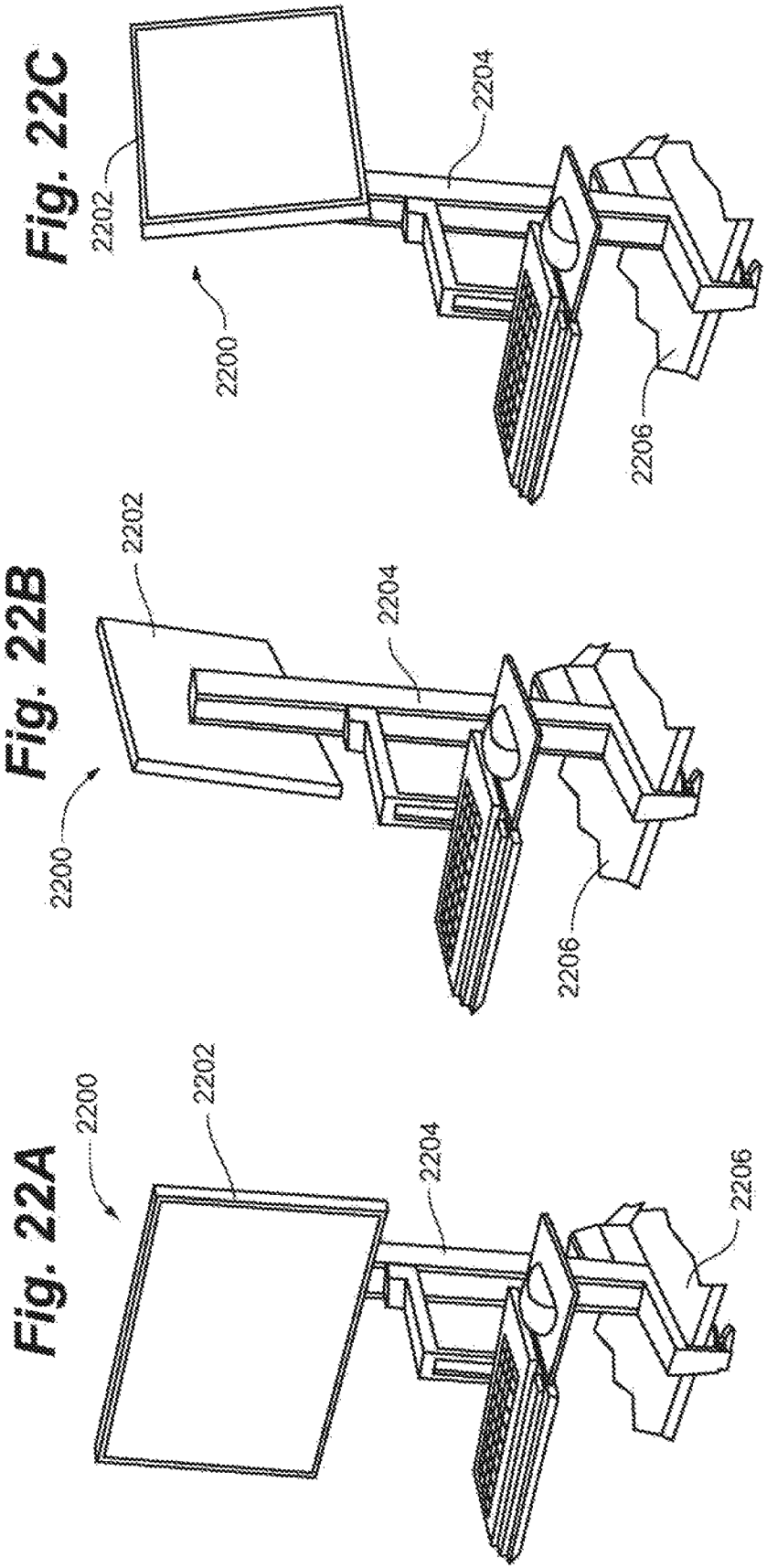

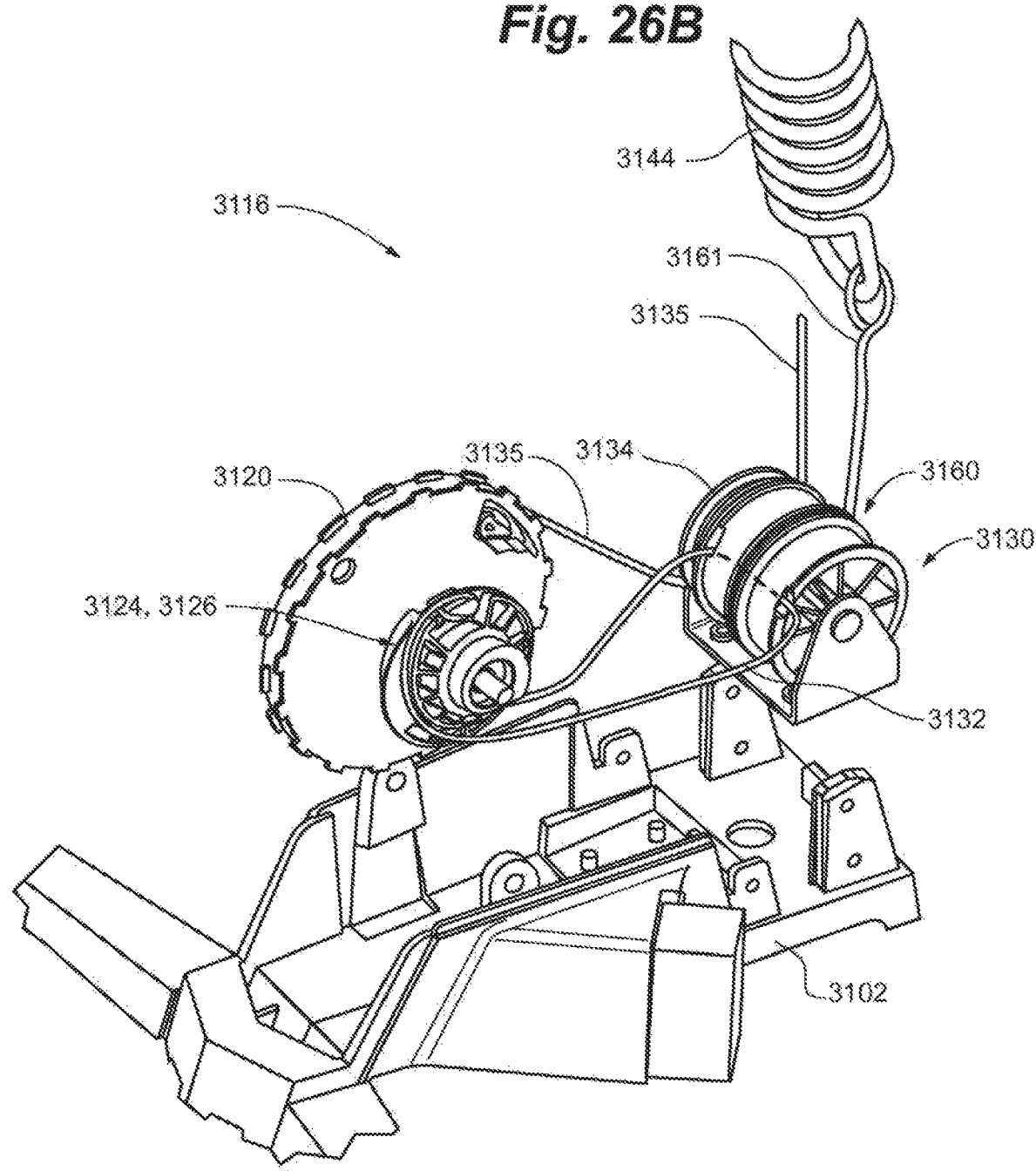

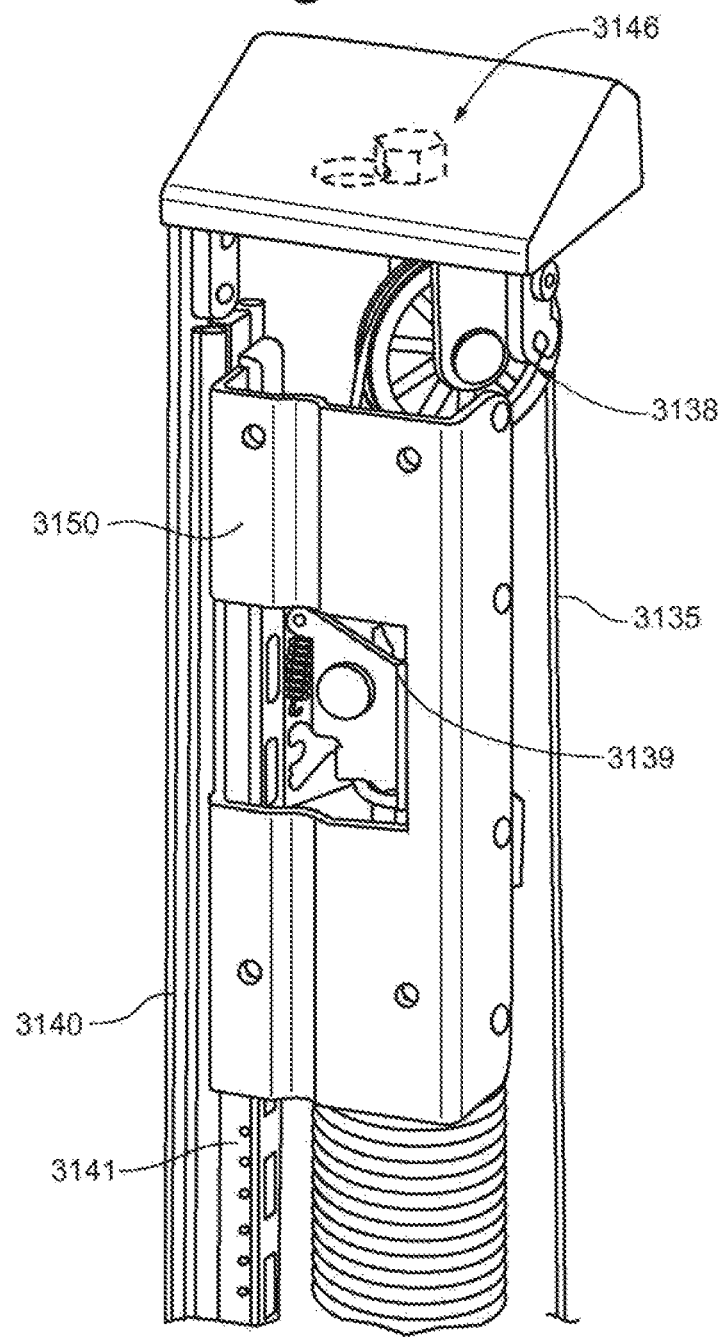

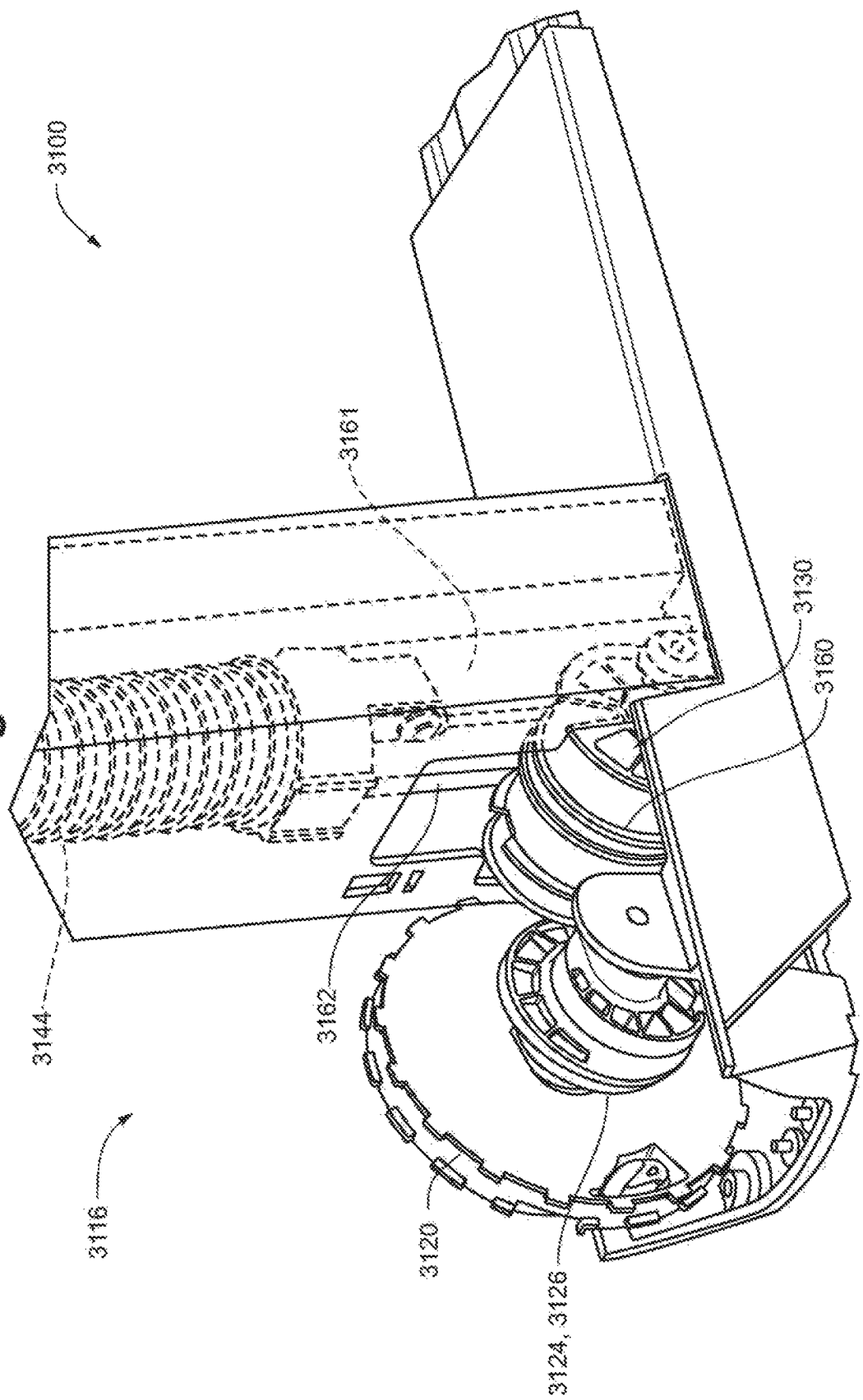

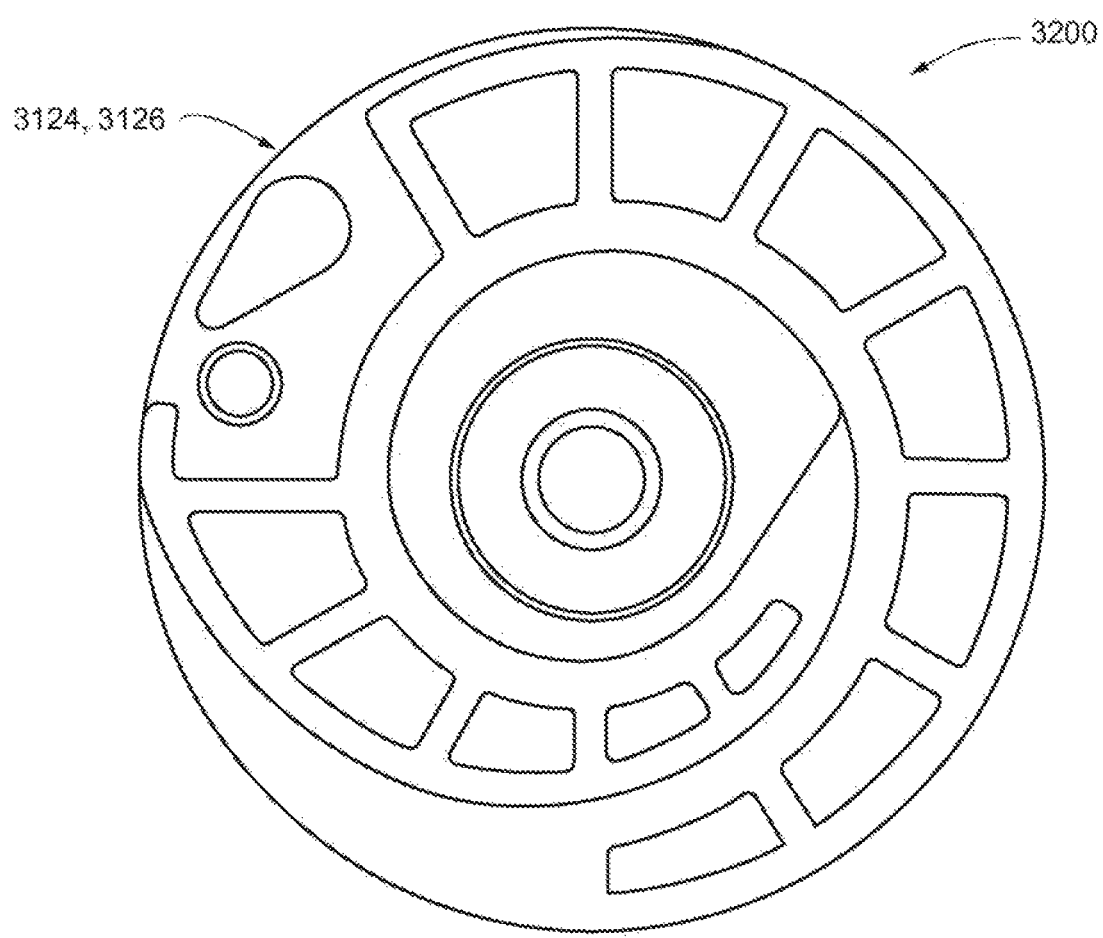

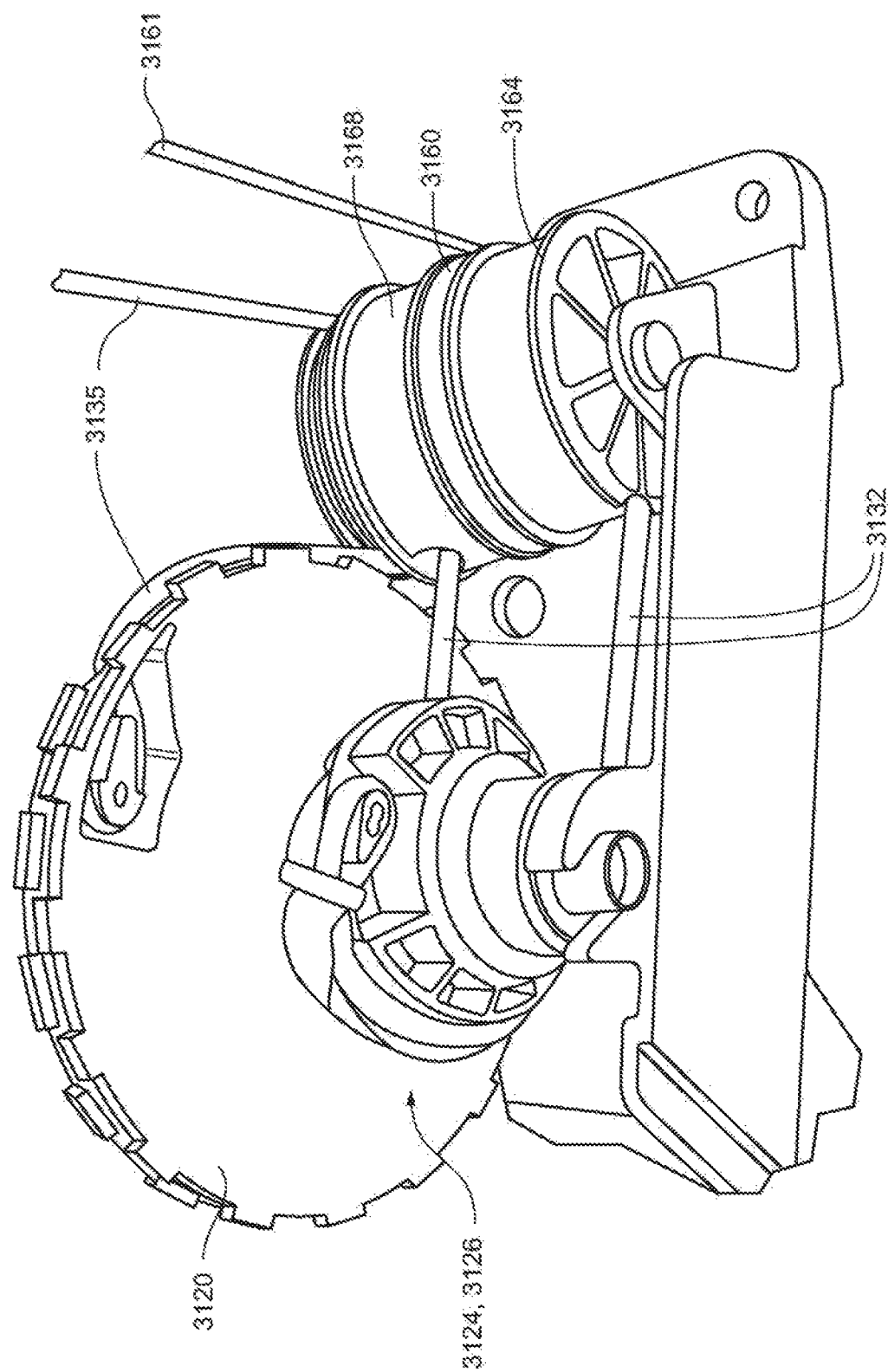

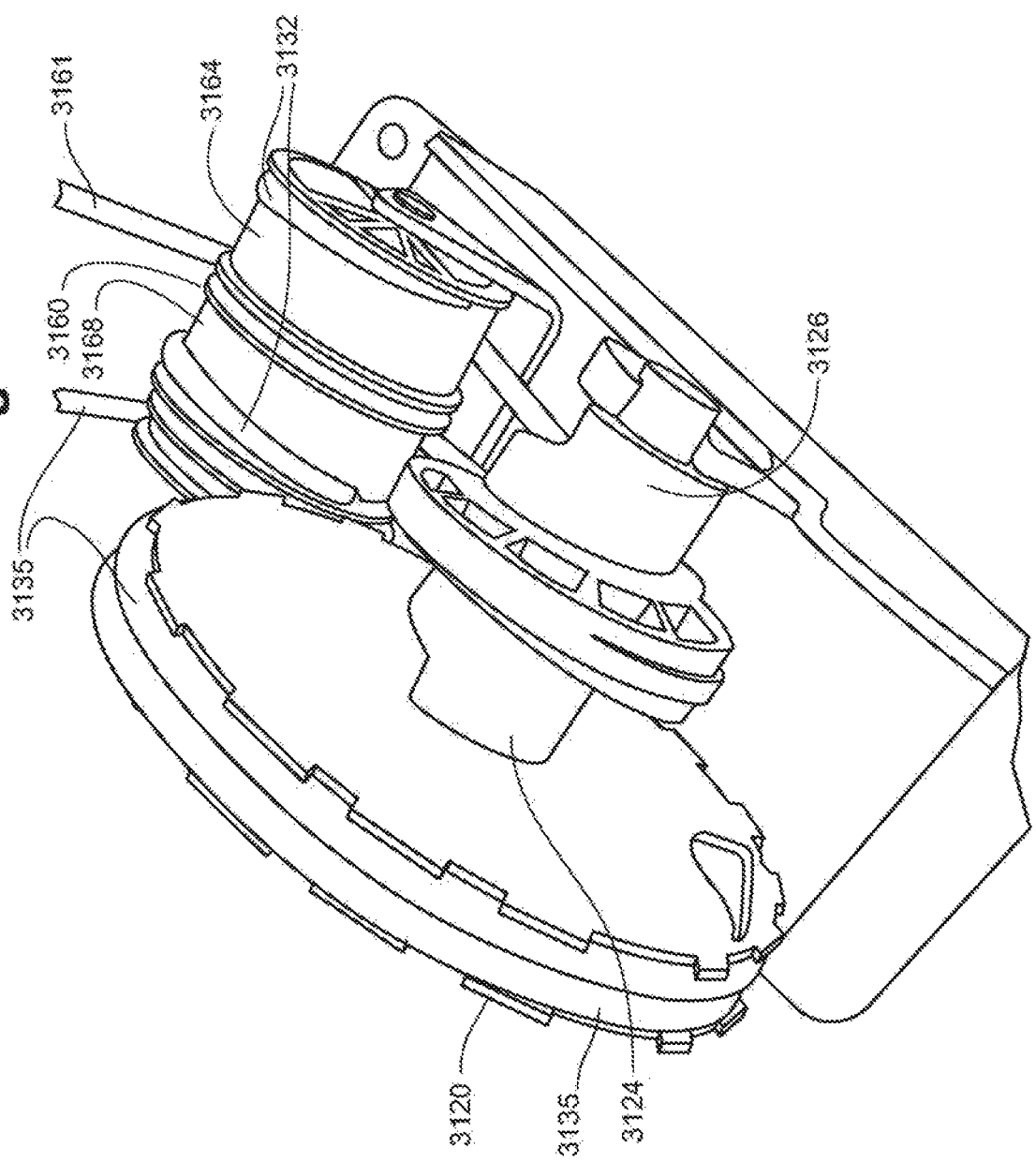

DISPLAY POSITIONING APPARATUS AND METHOD

CROSS-REFERENCES

This application is a Continuation Application of U.S. patent application Ser. No. 15/720,855, filed Sep. 29, 2017, which is a Continuation Application of U.S. patent application Ser. No. 15/400,034, filed Jan. 6, 2017, which is a Continuation Application of U.S. patent application Ser. No. 15/135,156, filed Apr. 21, 2016, which is a Continuation Application of U.S. patent application Ser. No. 14/795,627, filed Jul. 9, 2015, which is a Continuation of U.S. patent application Ser. No. 14/340,074 filed Jul. 24, 2014, which is a Continuation of U.S. patent application Ser. No. 13/964,870, filed Aug. 12, 2013, which is a Continuation of Ser. No. 13/191,170, filed Jul. 26, 2011, which claims the benefit of U.S. Provisional Application No. 61/369,430, filed Jul. 30, 2010, U.S. Provisional Application No. 61/369,392, filed Jul. 30, 2010, and U.S. Provisional Application No. 61/412,456, filed Nov. 11, 2010, the content each of which is hereby incorporated by reference in its entirety.

FIELD

Embodiments of the present invention generally relate to devices that can move equipment such as electronic displays, keyboards, and other items between multiple positions relative to an operator.

BACKGROUND

Many jobs involve working with personal computers and/or display monitors. In such jobs, the personal computers and/or display monitors may be used by multiple operators at different times during a day. In some settings, one computer and/or monitor may be used by multiple people of different sizes and having different preferences in a single day. Given the differences in people's size and differences in their preferences, a monitor or display adjusted at one setting for one individual may be inappropriate for another individual. For instance, a child would have different physical space needs than an adult using the same computer and monitor. Further, a single user may wish to use a computer and/or display from multiple positions. For example, a single user may wish to periodically both sit and stand while using the computer/monitor. In some situations, users desire to perform operations in various postures. For example, one may desire to perform some operations in a seated position and others in a standing position. In such situations, it may be required that both the seated operations and the standing operations be done at the same workstation, which may include a computer monitor, a keyboard, and/or a mouse. Such a user will desire the monitor and other equipment to be at different heights while sitting and standing.

As adjustable height mechanisms for displays have become more widespread and users have experienced their advantages, users are more frequently adjusting the height of their monitors and other equipment. Further, such adjustments are now more frequently desired over a wide range of travel.

SUMMARY

According to one aspect of the invention, an apparatus for positioning an electronic display and a keyboard is provided. The apparatus includes a base configured to attach to a work surface, a support column extending upward from the base, and a mounting portion movably coupled to the support column through a vertical range of travel relative to the work surface. The mounting portion is configured to simultaneously move the electronic display and the keyboard within the vertical range of travel.

According to another aspect of the invention, an apparatus for positioning an electronic display and a keyboard is provided. The apparatus includes a base configured to attach to a generally horizontal work surface and a support column extending upward from the base. The apparatus also includes a mounting portion that has an electronic display mount and a keyboard tray. A first lift mechanism movably couples the mounting portion to the support column through a vertical range of travel. The keyboard tray is positioned below the work surface in a lowest position in the vertical range of travel. The keyboard tray is positioned above the work surface in a highest position in the vertical range of travel.

Another aspect of the invention includes a method for positioning an electronic display and a keyboard. The method includes attaching a positioning apparatus to a work surface. The positioning apparatus has a base configured to attach to the work surface, a support column extending upward from the base, and a mounting portion movably coupled to the support column through a vertical range of travel relative to the work surface. The method also includes supporting the electronic display and the keyboard with the mounting portion. The method also includes moving the mounting portion through a vertical range of travel to simultaneously move the electronic display and the keyboard relative to the support column and work surface.

Embodiments of the present invention can provide one or more of the following features and/or advantages. In some cases the base of the positioning apparatus is configured to rigidly attach to the work surface. The rigid attachment can be through a hole in the work surface, and in some cases may use a fastener such as a bolt and an optional attachment plate that can receive and secure one end of the fastener on one side of the work surface opposite the base. In certain embodiments the base is configured to removably attach to the work surface. For example, in some cases the base comprises a clamp that enables removably attaching the base about an edge of the work surface. In some cases the clamp includes a first clamping element, a second clamping element, and an adjustable screw threadedly coupled to the first and the second clamping elements such that turning the screw a first direction moves the clamping elements together to loosen the clamp and such that turning the screw a second direction moves the first and the second clamping elements apart to tighten the clamp. In some cases the clamp comprises a c-clamp, which may optionally include an upper bracket and an adjustable lower bracket coupled to the upper bracket. In some cases the lower bracket includes a first leg and a second leg having different lengths. The first leg and the second leg are configured to couple to the upper bracket in alternate first and second configurations. In some cases the clamp comprises a wedge. The clamp may have a lower leg with an inclined surface and the wedge can be configured to move along the inclined surface to tighten and loosen the clamp.

In some embodiments of the invention, a positioning apparatus includes a keyboard tray configured to support the keyboard. In certain cases the keyboard tray is positioned below the work surface in a lowest position in the vertical range of travel and/or the keyboard tray is positioned above the work surface in a highest position in the vertical range of travel. In some cases the mounting portion has a keyboard tilt mechanism for adjusting an angle of the keyboard tray with respect to the work surface. In some cases the vertical range of travel is at least about 14 inches, while in some cases the vertical range of travel is between about 14 inches and about 24 inches. In certain cases the vertical range of travel extends between a sitting position and a standing position. Further, in some cases the mounting portion includes an electronic display mount, a keyboard tray, and an elongated portion between the electronic display mount and the keyboard tray. A work surface can be attached to the elongated portion of the mounting portion.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1 is a perspective view of a positioning apparatus in accordance with an embodiment of the invention.

FIG. 2A is a side view of the positioning apparatus of FIG. 1 with a mounting portion in a first position.

FIG. 2B is a side view of the positioning apparatus of FIG. 1 with a mounting portion in a second position.

FIG. 3 is a side cross-section of the positioning apparatus of FIG. 1.

FIG. 6 is an enlarged view of a portion of a lift mechanism shown in FIG. 3.

FIG. 7 is an enlarged view of a second lift mechanism shown in FIG. 3.

FIG. 10A is a perspective view of a screw clamp in accordance with an embodiment of the invention.

FIG. 10B is a top view of the screw clamp of FIG. 10A.

FIG. 10C is a front view of the screw clamp of FIG. 10A.

FIG. 10D is a bottom view of the screw clamp of FIG. 10A.

FIG. 10E is a side view of the screw clamp of FIG. 10A.

FIG. 11A is a perspective view of a screw clamp in accordance with an embodiment of the invention.

FIG. 11B is a top view of the screw clamp of FIG. 11A.

FIG. 11C is a front view of the screw clamp of FIG. 11A.

FIG. 11D is a bottom view of the screw clamp of FIG. 11A.

FIG. 11E is a side view of the screw clamp of FIG. 11A.

FIG. 16 is a perspective view of a positioning apparatus with an attachment plate configured to attach to a support surface in accordance with an embodiment of the invention.

FIGS. 20A-20B are front perspective views of a positioning apparatus in a raised position and a lowered position, respectively, in accordance with an embodiment of the invention.

FIGS. 22A-22C are front perspective views of a positioning apparatus with swivel functionality in accordance with an embodiment of the invention.

FIGS. 26A and 26B are partial, exploded views of a bottom portion of the apparatus of FIG. 24 in accordance with an embodiment of the invention.

FIG. 27 is a partial elevation view of a top portion of an apparatus in accordance with an embodiment of the invention.

FIG. 28 is a perspective view of a bottom portion of an apparatus in accordance with an embodiment of the invention.

FIG. 30 is a side plan view of the cam member of FIG. 29A.

FIG. 35 is a perspective view of a portion of a balance mechanism in a state corresponding to a first position of a mounting portion.

FIG. 36 is a perspective view of a portion of a balance mechanism in a state corresponding to a second position of a mounting portion.

DETAILED DESCRIPTION OF THE PREFERRED EMBODIMENTS

Figure 4:
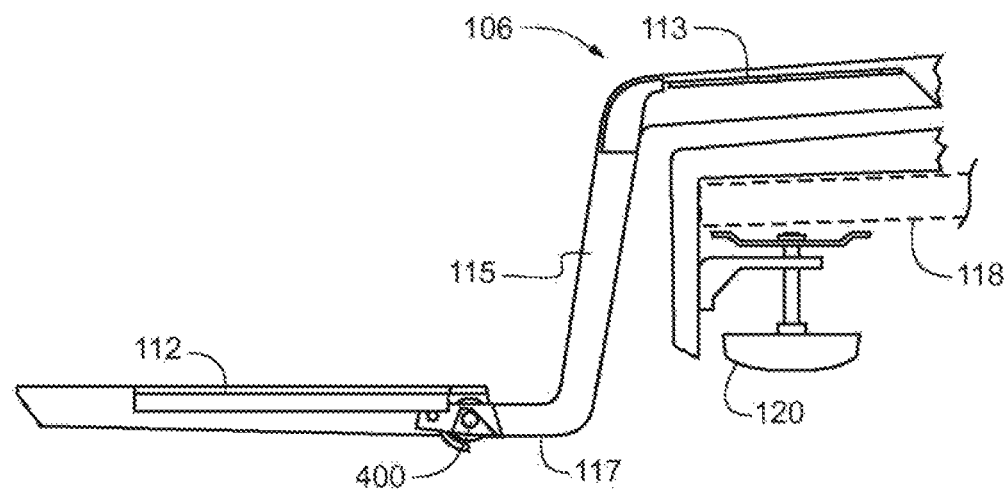
FIG. 4 is an enlarged view of a keyboard tray shown in FIG. 3.

The following detailed description is exemplary in nature and is not intended to limit the scope, applicability, or configuration of the invention in any way. Rather, the following description provides some practical illustrations for implementing exemplary embodiments of the present invention, Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Some embodiments of the invention generally provide apparatuses capable of positioning various equipment relative to a human operator. For example, in some cases a positioning apparatus can support items such as electronic displays, a laptop computer (i.e., notebook), a keyboard, and/or other computing equipment, such as a mouse. As used herein, the term electronic display is used to refer to televisions, computer monitors, tablet computers, and other types of displays capable of displaying images from electronic signals. The embodiments discussed herein provide several examples of positioning apparatuses capable of positioning such types of computing equipment, however, it is contemplated that embodiments of the invention can be used for positioning a wide variety of items and the scope of the invention is not limited in this regard.

FIGS. 1, 2A, 2B, and 3 illustrate an example of a positioning apparatus 100 according to an embodiment of the invention. FIG. 1 is a perspective view of the positioning apparatus 100 and FIG. 3 is a side cross-sectional view of the positioning apparatus 100. FIG. 2A provides a side view of the positioning apparatus 100 with a mounting portion in a first position, while FIG. 2B shows the mounting portion in a second position. In this example, the positioning apparatus 100 is configured to support and move a single electronic display (not shown), a keyboard (not shown), and a mouse (not shown) relative to a work surface that supports the positioning apparatus 100. It should be appreciated that the positioning apparatus 100 illustrates just one of many possible equipment configurations. Other combinations of displays, keyboards, pointing devices, and other equipment and accessories are contemplated, some of which will be discussed further herein.

The positioning apparatus 100 includes a base 102 and a support column 104 extending upward from the base 102. A mounting portion 106 is movably coupled to the support column 104 through a generally vertical range of travel 108, allowing the mounting portion 106 to move up and down relative to the base 102 and the support column 104. For example, in some cases a lift mechanism 109 (FIG. 3) is provided that movably couples the mounting portion 106 and the support column 104. The mounting portion 106 is configured to support an electronic display and a keyboard and move them together (e.g., simultaneously) within the vertical range of travel 108. In the example shown in FIGS. 1, 2A-2B, and 3, the mounting portion 106 includes an electronic display mount 110 configured to couple to and support an electronic display. In addition, the mounting portion 106 includes a keyboard tray 112 for supporting a keyboard and a mouse tray 119 for supporting a mouse or other pointing device.

Referring to FIGS. 2A and 2B, the positioning apparatus 100 is configured to be supported by a work surface 118 (shown in dotted line). For example, the base 102 of the apparatus can include one or more bottom surfaces that sit upon the work surface 118. According to some embodiments of the invention, the positioning apparatus 100 is advantageously configured to sit on a wide variety of existing work surfaces such as the top surfaces of desks, tables, trays, counters, and the like. As used herein, the term "work surface" is used to refer to both the outermost top surface of such articles, as well as the top planar member (e.g., table top or desk top) having a thickness and one or more edges. In some cases the work surface is horizontal and substantially parallel to a floor. In certain embodiments, however, the positioning apparatus 100 may be configured to be attached to an inclined or slightly inclined work surface. The positioning apparatus 100 provides one or more ranges of travel (e.g., the vertical range of travel 108) for moving various items, including computer monitors and keyboards, relative to the work surface 118. Accordingly, the positioning apparatus 100 can allow an operator to adjust the position of equipment relative to the work surface 118. Mounting the positioning apparatus 100 to such a work surface can thus convert or transform a normally single-position (e.g., stationary or fixed-height) work surface into a multi-position workstation.

One example of a contemplated use includes transforming a traditional, stationary computer workstation into a multi-position (e.g., multi-height) computer workstation. In many traditional settings, computer workstations generally include a monitor and keyboard simply resting on an existing work surface such as a desk or table. While the positions of the monitor and the keyboard in such settings may sometimes be adjusted by small amounts relative to the work surface, computer operators are generally limited to a single working position by the height of the existing work surface. For example, a traditional desk may only accommodate sitting positions. According to some embodiments of the invention, the positioning apparatus 100 can transform such a traditional, fixed height computer workstation into a multi-position (e.g., multi-height) computer workstation, allowing an operator to adjust the height of the workstation to accommodate multiple working positions, including a sitting position and a standing position.

Returning to FIGS. 1, 2A-2B, and 3, according to some embodiments, the base 102 of the positioning apparatus 100 is configured to sit on a horizontal or generally horizontal work surface. In some cases the base 102 may also be configured to sit on a somewhat angled or inclined work surface. In some cases the base and positioning apparatus may be configured to simply sit/rest upon the work surface without being attached to the work surface. In certain embodiments, though, the base 102 and positioning apparatus 100 are configured to attach to a work surface. As shown in FIGS. 2A and 2B, in some embodiments the base 102 includes a clamp 120 for removably attaching the positioning apparatus 100 about an edge of the work surface 118. In some embodiments the base 102 may also or instead be fixedly attached to the work surface 118 with a more permanent type of fastener such as an adhesive and/or a screw/bolt and mounting hole.

Attaching the positioning apparatus 100 to a work surface can increase the functionality of the positioning apparatus and may optionally provide a positioning apparatus with one or more advantages over an apparatus that merely rests upon a work surface without being attached. For example, an attached positioning apparatus may have increased stability and be less prone to tipping than an unattached positioning apparatus. The increased stability may in some cases enable certain base configurations and/or ranges of motion for a positioning apparatus that would otherwise lead to undesirable instability, up to the point of not being able to include certain desirable features and/or configurations in an unattached positioning apparatus. For example, in some cases increased stability from attachment can enable use of a base with a reduced or limited footprint, which saves material and cost, frees more of a work surface for other uses, and can provide a more aesthetically pleasing configuration than large base configurations. In some cases attachment to a work surface enables a positioning apparatus to be moved through a greater vertical range of travel than an unattached positioning apparatus. The increased stability from attachment may also enable horizontal translating, panning, rotating, pivoting, and other kinds of movement for a positioning apparatus that might not be available for an unattached positioning apparatus.

The mounting portion 106 illustrated in FIGS. 1, 2A-2B, and 3 includes a frame to which the electronic display mount 110 and the keyboard tray 112 are attached. The frame may be formed in a variety of shapes. According to a preferred embodiment, the frame is configured to support the display mount 110 and the keyboard tray 112 in a spaced relationship, with the keyboard tray 112 set apart from the display mount 110 in order to allow an operator to comfortably use a keyboard on the tray while viewing a display attached to the mount 110. For example, the keyboard tray 112 may be attached to the frame at a generally lower and more forward position (closer to the operator) than the display mount 110. In the example shown in FIGS. 1, 2A-2B, and 3, the mounting portion 106 includes a generally vertically extending first portion 111 to which the display mount 110 is attached, a second portion 113 extending generally horizontally out from the bottom of the vertical portion 111, and a third portion 115 generally extending down from the end of the second portion 113 opposite the first portion 111. The keyboard tray 112 is coupled to the mounting portion 106 at the end of the third portion 115 opposite the second portion 113, in this case via a short generally horizontal fourth portion 117 of the mounting portion 106.

According to some embodiments, the display mount 110 may be attached to the mounting portion 106 in an adjustable manner. In some embodiments, the mounting portion 106 includes an optional secondary lift mechanism 122 as part of the first portion 111 to which the display mount 110 is attached. The secondary lift mechanism 122 provides a different, adjustable range of travel that allows the display mount 110 (and an attached electronic display) to be moved vertically relative to the keyboard tray 112, which can be useful for providing monitor/keyboard arrangements for differently sized operators. According to some embodiments, the display mount 110 attachment may include a tilt and/or rotation mechanism that allows an attached display to be tilted and/or rotated in a variety of directions.

In certain embodiments, the second, third, and fourth portions of the mounting portion 106 are configured with a relatively reduced profile, which can assist in limiting the visual impact of the positioning apparatus 100 and/or increasing the amount of unoccupied space about the positioning apparatus 100. For example, in some cases one or more of these portions of the mounting portion may have a thickness similar to a thickness of the base 102 (e.g., the thickness of the elongated portion 132 described below). In certain embodiments, the second portion 113, third portion 115, and fourth portion 117 have a thickness of about 1 inch or less. In addition, in some cases the width of the mounting portion 106 may be relatively narrow compared to the length of the second portion 113, the length of the base 102, and/or the length of the elongated portion 132 of the base. Referring to FIG. 1, in some embodiments the mounting portion 106 has a width that is about the same as the width of the support column 104 and the width of the elongated portion of the base 102. In some cases the width is about 5 inches or less. In some embodiments one or more of the portions 111, 113, 115, and 117 of the mounting portion 106 are generally parallel with the elongated portion 132 of the base and/or the support column 104.

Referring to FIG. 1, in some embodiments the second, third and fourth portions of the mounting portion are formed from two spaced, substantially parallel legs 121, 123 (comprising, e.g., a metal, metal alloy, plastic, etc.) that extend from the bottom end of the first portion 111 of the mounting portion 106 to the keyboard tray 112. Forming the mounting portion in this way can further reduce the visual impact of the positioning apparatus, allowing an operator to see the surrounding environment (e.g., the work surface 118, a floor, a wall, etc.) between the legs 121, 123. In some embodiments an optional cover portion 125 may be attached between the legs making up the second mounting portion 113. In certain cases the cover portion 125 hides the base 102 from an operator's view when the mounting portion 106 is in its lowest position, thus providing an aesthetically pleasing look.

The base 102 of the positioning apparatus 100 can encompass any structure that adequately supports the support column 104 and the mounting portion 106 upon a work surface. As shown in the figures, in some embodiments the base 102 includes a first end 131 and a second end 133 with a length extending between the first and the second ends. According to some embodiments, portions of the base are formed with a low profile, thus minimizing any obstruction caused by the base and maximizing the range of travel of the mounting portion 106. For example, in some embodiments a front elongated portion 132 of the base 102 extending between the first end 131 of the base and the support column 104 has a thickness of about 1 inch or less. In addition, the base 102 can also include a housing portion 134 that houses some or all of the apparatus' lift mechanism 109. According to some embodiments, the base 102 includes one or more stabilizing portions extending out from the housing portion 134 and/or the front elongated portion 132 to assist in making the base 102 stable upon the work surface 118. in the example shown in FIGS. 1, 2A-2B, and 3, the stabilizing portion includes legs 130 that extend out from the housing portion 134 at the second end 133 of the base. The legs 130 extend out at an angle toward the first end 131 of the base, though it is contemplated that in some cases the legs 130 could extend perpendicularly or at an angle away from the first end 131 of the base.

In some cases the elongated section 132 of the base is generally parallel to a plane defined by movement of the mounting portion 106 through the vertical range of travel (e.g., the plane of cross-section in FIG. 3). In some cases the base may be configured to be attached to the work surface at the first end 131 and/or second end 133 of the base in front of and/or behind the support column, respectively, from the perspective of an operator. Such a configuration can advantageously reduce the footprint of the base 102 upon the work surface, thus leaving more room for other activities as well as reducing the visual impact of the positioning apparatus from, e.g., the operator's perspective. Returning to FIGS. 2A-2B and 3, in some cases the base 102 includes a clamp 120 at the first end of the base that allows the base 102 to be attached about a front edge of the work surface 118. Although not shown, in some embodiments a clamp may be provided at the second (e.g., back) end of the base 102, allowing the base to be attached about a back edge of a work surface. In addition, it is contemplated that the base may in some cases be configured to attach to one or more sides of a work surface through, for example, clamps located at the side of the base. In addition, the elongated section 132 of the base may be oriented in a direction perpendicular or otherwise angled to the plane including vertical movement of the mounting portion.

Referring to FIGS. 1 and 2A-2B, in some cases the elongated section 132 of the base 102 is generally parallel to the second member 113 of the mounting portion 106. In addition, in some cases the elongated section 132 has a width approximately the same as a width of the second portion 113 of the mounting portion frame directly above the base. The width of the elongated portion 132 of the base may also be about the same as the width of the support column 104. Such a configuration can advantageously reduce the footprint of the base 102 upon the work surface, thus leaving more room for other activities as well as reducing the visual impact of the positioning apparatus. For example, in some embodiments the widths of the elongated section 132 of the base, the first portion 111, second portion 113, and/or third portion 115 of the mounting portion, and the support column 104 are equal to or less than about 5 inches. In some cases, the widths of the elongated section, the frame of the mounting portion, and the support column 104 are equal to or less than a width of an electronic display mount (e.g., a VESA mount) attached to the mounting portion.

According to some embodiments, the support column 104 comprises a separate component that is attached to the base 102 using, e.g., mounting brackets or other hardware. It is also contemplated that the support column 104 can be formed integrally with the base 102. In certain embodiments the support column and the base 102 are attached/formed together at an angle other than 90 degrees (although in some embodiments the angle is 90 degrees). In the example shown in FIG. 2B, the support column 104 extends upward from the base 102 at an obtuse angle 140 with respect to the base 102 (and the work surface 118 positioned below the base). The obtuse angle 140 is useful for positioning the center of gravity of the display and/or other equipment carried by the positioning apparatus at a desired position with respect to the base 102 to enhance stability. A range of angles may be used depending upon the design and intended use for a particular embodiment. In some embodiments the obtuse angle 140 is equal to or less than about 120 degrees. In some embodiments, the obtuse angle 140 is equal to or less than about 100 degrees. In some embodiments the support column 104 and the base are formed at an acute angle (e.g., less than 90 degrees), which can allow movement of the mounting portion, display, and keyboard upward and toward an operator at the same time.

The support column 104 can be dimensioned to provide the positioning apparatus with a vertical range of travel 108 of any desired length, thus allowing the mounting portion 106 to be moved through a wide range of heights. As will be appreciated, in cases where the support column 104 is positioned at an angle with respect to the base, the apparatus may also provide an amount of horizontal movement as the mounting portion moves through the vertical range of travel 108. In one embodiment, the vertical range of travel of a positioning apparatus attached to a work surface extends between a sitting height and a standing height, thus allowing an operator to use the workstation from both a sitting position and a standing position. For example, in certain embodiments the vertical range of travel is at least about 14 inches. In some embodiments the vertical range of travel is between about 14 inches and about 24 inches. The lift mechanism 109 in the positioning apparatus may also provide multiple positions at intermediate heights between the lowest and highest extents of the range of travel 108, thus accommodating other working positions and/or operators of different heights. In some cases a discrete number of intermediate positions are provided. In some cases the lift mechanism 109 provides an infinite number of intermediate positions within the vertical range of travel 108.

FIG. 4 is an enlarged view of the side cross-sectional view of FIG. 4, showing details of the keyboard tray 112 in accordance with an embodiment of the invention. According to some embodiments, the mounting portion 106 (in this example, the third portion 115 described above) extends downward to couple with the keyboard tray 112. As shown in FIGS. 2A, 3, and 4, within a range of lower positions of the mounting portion 106 (e.g., including the lowest position in the vertical range of travel 108), the third portion 115 of the mounting portion 106 extends down in front of the first end 131 of the base 102 and the work surface 118. The mounting portion 106 thus extends from above the work surface 118 to below the work surface 118 when the tray is in one of these downward positions. Such embodiments can also obscure the base from view. The positioning apparatus 100 thus enables positioning of the keyboard tray 112 below the level of the work surface 118 when the mounting portion is positioned at a lower height (e.g., the lowest height position within the range of travel). The positioning apparatus 100 also enables positioning of the keyboard tray 112 level with the work surface 118. Conversely, the positioning apparatus 100 enables positioning of the keyboard tray 112 above the level of the work surface 118 when the mounting portion is positioned at a greater height (e.g., the highest position within the range of travel).

Thus, the positioning apparatus enables positioning of the keyboard tray at or below the level of the work surface 118, even though the based 102 of the positioning apparatus sits on the work surface 118. Such adjustability can provide increased comfort for an operator by positioning the keyboard tray 112 (and the keyboard supported on the tray) in a more ergonomic relationship to the position of an attached electronic display and/or an operator sitting in a chair. For example, positioning the keyboard tray 112 at or below the work surface 118 may make it easier for an operator to maintain his or her elbows and forearms level with or slightly above a supported keyboard in a sitting position, thus helping to reduce and/or avoid unnecessary strain on an operator's wrists.

According to some embodiments the keyboard tray 112 is attached to the mounting portion 106 with a tilt mechanism 400 that allows an operator to adjust the tilt of the keyboard tray 112 relative to the base and the work surface. For example, in some cases the tilt mechanism 400 allows the keyboard to be oriented at an angle ranging from about −15 degrees to about +15 degrees with respect to the work surface 118. In some embodiments the mounting portion 106 also or alternatively includes a folding mechanism that allows the keyboard tray 112 to be folded closer to the base 102. The folding mechanism can thus allow an operator to reduce the overall size of the positioning apparatus by folding the keyboard tray away from the operator and toward the support column 104 when not in use. In some embodiments the tilt mechanism includes a hinge with a generally horizontal axis. Such a hinge may be provided with a friction mechanism.

Figure 5:
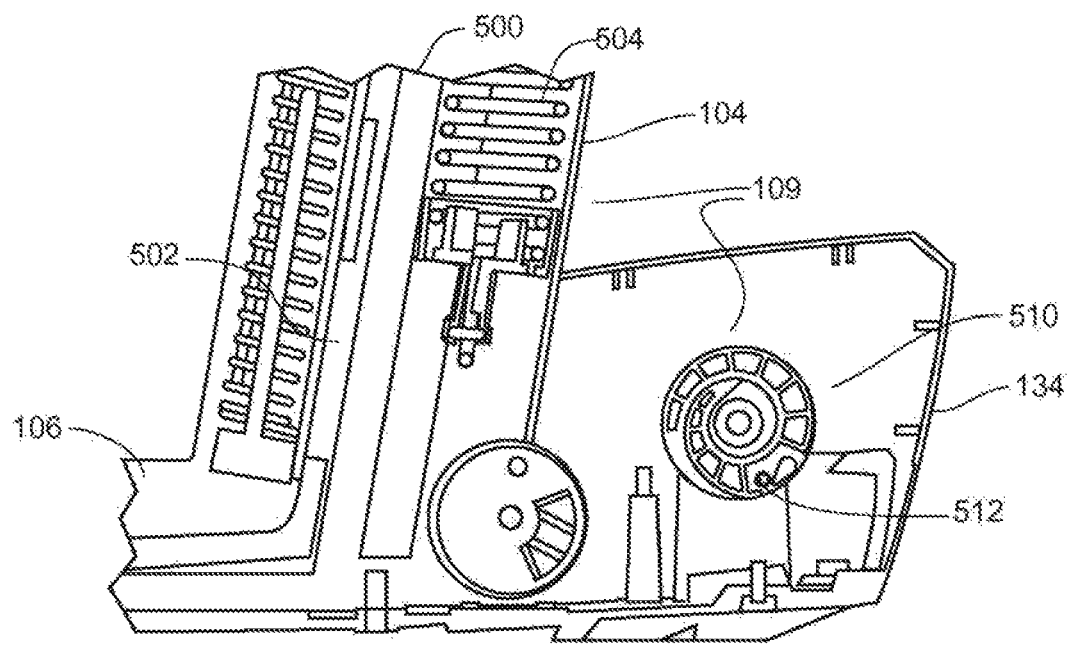
FIG. 5 is an enlarged view of a portion of a lift mechanism shown in FIG. 3.

FIGS. 5, 6 and 7 show enlarged cross-sectional views of the lift mechanism 109 that movably couples the mounting portion 106 to the support column 104. In some embodiments the lift mechanism 109 includes one or more rails 500 attached to the support column 104 and a truck 502 (e.g., movable bracket) having wheels or sliders that engage the rails. In some cases the lift mechanism 109 is located partially within the support column 104 and partially within the base 102 (e.g., within the housing portion 134). The lift mechanism 109 may also be located wholly within the support column 104, attached to an external surface of the support column 104, or otherwise mounted in a useful manner.

According to some embodiments, the lift mechanism 109 can provide an operator with a degree of assistance to move the mounting portion 106 through the range of travel 108. For example, in some embodiments an energy storage member 504 such as an extension spring provides a biasing force that aids an operator in adjusting the height of the mounting portion 106. In some cases an extension spring member is adjustably mounted within the support column 104 using a retainer plug 506 and a weight adjustment screw 508 which can be turned to tighten and loosen the spring. The lift mechanism 109 may provide a discrete number of height positions along the vertical range of travel, or in some cases may provide an infinite number of height positions along a continuous vertical range of adjustability.

According to some embodiments, the lift mechanism 109 includes a balance mechanism 510 incorporating the energy storage member 504 that can counterbalance some or all of the weight of an electronic display and/or other equipment supported by the mounting portion 106. As just one example, the lift mechanism 109 can incorporate a cam (e.g., a rotary cam) 512 that is coupled to the energy storage member 504 and the truck 502 with one or more flexible tension members (e.g., a line, cable, rope, chain, etc., not shown). One example of such a balance mechanism is described in presently co-owned US Patent Application Publication US 2006/0185563 A1, which application was filed Sep. 28, 2005, the entire contents of which is incorporated by reference herein. In some embodiments the lift mechanism 109 includes a balance mechanism having a dual cam as described below with reference to FIGS. 24-36.

While a few examples of possible configurations for a lift mechanism are described herein, it should be appreciated that a wide variety of lift mechanisms can be used to movably couple the mounting portion 106 with the support column 104 to provide the vertical range of travel 108 and that the scope of the invention is not limited to a particular lift configuration. For example, in some cases a lift mechanism includes a telescoping support column. In some cases the lift mechanism includes a rotary cam coupled with an energy storage member such as an extension spring, a compression spring, a torsion spring, or a spiral spring. In some cases the lift mechanism includes a constant force spring and/or a gas spring. According to some embodiments, the lift mechanism may be provided according to embodiments described in one or more of presently co-owned US Patent Application Publication US 2008/0026892 A1, filed Jul. 26, 2007; US Patent Application Publication US 2007/0259554 A1, filed May 4, 2007; U.S. Pat. No. 6,997,422, filed Aug. 20, 2003; U.S. Pat. No. 7,506,853, filed Nov. 3, 2004; and U.S. Pat. No. 6,994,306, filed Nov. 28, 2000. The entire disclosure of each of the above-mentioned patents and patent applications is hereby incorporated by reference herein.

FIG. 7 includes an enlarged cross-sectional view of the secondary lift mechanism 122 first shown in FIG. 3. According to some embodiments the secondary lift mechanism 122 provides an adjustable range of travel 700 that allows the display mount 110 (and an attached electronic display) to be moved vertically relative to the keyboard tray (not shown). For example, the lift mechanism 122 may in some cases provide from about 3 inches to about 8 inches of additional vertical adjustability. The lift mechanism 122 can comprise any suitable design, including any of the examples described immediately above with respect to the lift mechanism 109. For example, the secondary lift mechanism 122 may include a balance mechanism that can counterbalance some or all of the weight of the attached display through the range of travel. In some cases the secondary lift mechanism 122 includes a truck 702 movably coupled with one or more rails providing a second range of vertical travel for the electronic display relative to the keyboard tray. An energy storage member 704 such as an extension spring can provide a biasing force that aids an operator in adjusting the height of the display mount 110. In some cases the tension of the energy storage member 704 can be adjusted with the use of a weight adjustment screw or bolt 706. In addition, the secondary lift mechanism 122 can be coupled with the mounting portion 106 in any suitable manner, such as being attached to an external surface of a frame of the mounting portion, or located within or partially within a columnar portion (e.g., the first portion 111) of the mounting portion 106.

According to some embodiments, the display mount 110 is attached to the mounting portion 106 in one or more other adjustable manners. According to some embodiments, the display mount 110 attachment includes a tilt mechanism 710 and rotation mechanism 712 that allows an attached display to be tilted and/or rotated in a variety of directions with respect to the positioning apparatus. In some embodiments the tilt mechanism may include a counterbalanced spring system (e.g., a torsion spring mechanism), a gravity tilt mechanism, a friction tilt mechanism, or a ball and socket mechanism, among other possibilities. U.S. Pat. No. 6,997,422, filed Aug. 20, 2003; U.S. Pat. No. 7,252,277, filed Jan. 17, 2004; and US Patent Application Publication US 2006/0185563 A1 filed Sep. 28, 2005, provide examples of possible tilt and rotation mechanisms, the entire disclosure of each of which is hereby incorporated herein by reference.

Figure 8A:
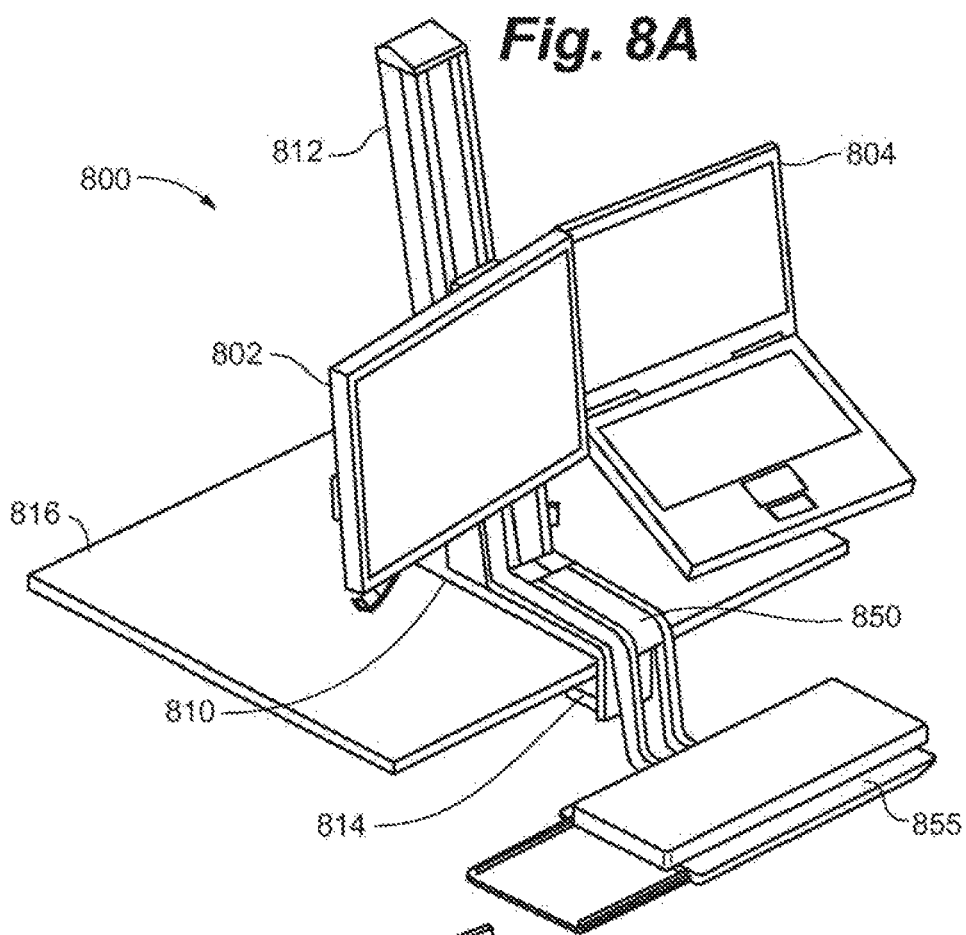
FIGS. 8A-8B are front perspective views of a positioning apparatus in a lowered position and a raised position, respectively, in accordance with an embodiment of the invention.
Figure 8B:
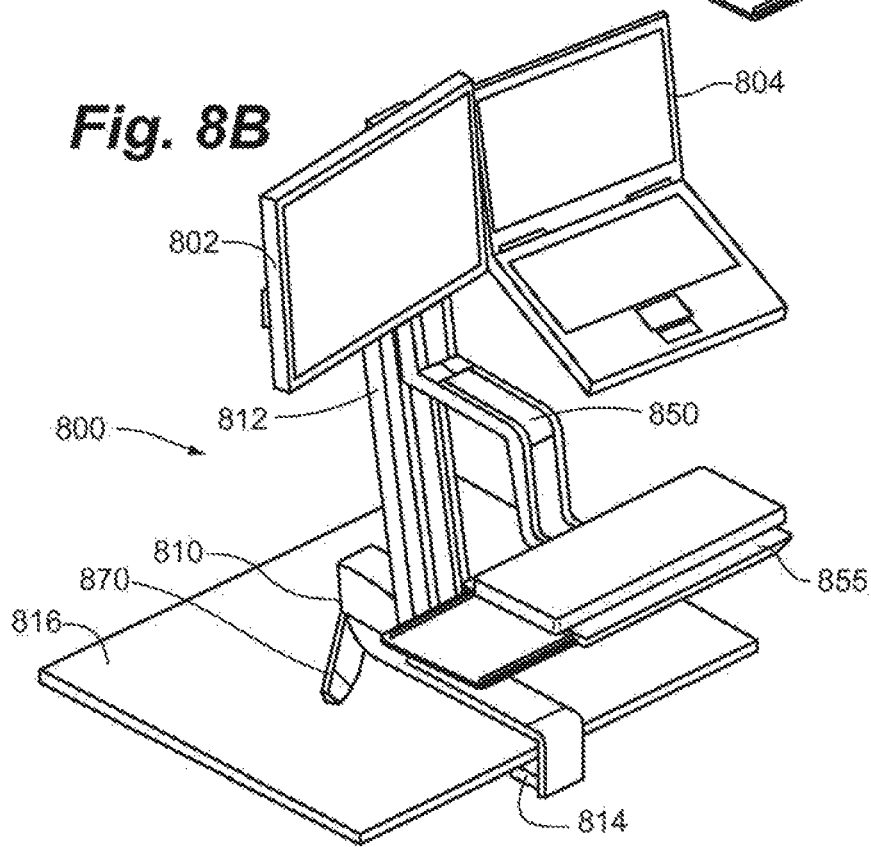

Another example of a positioning apparatus 800 according to one embodiment of the invention will now be described with reference to FIGS. 8A-9B. FIGS. 8A and 8B show the positioning apparatus 800 in a lowered position and a raised position, respectively, from a front perspective. According to some embodiments of the invention, the positioning apparatus 800 is useful in applications in which a single operator may wish to both sit and stand while using the same monitor and/or notebook. For convenience, the positioning apparatus 800 can be described for such uses as a "sit-stand" positioning apparatus. Such sit-stand apparatuses can be useful in situations in which operators desire to perform operations in various postures, which may be required or desired to be performed at the same workstation. For example, one may desire to perform some operations in a seated position and other operations in a standing position. Certain embodiments of the invention provide a unique sit-stand positioning apparatus that is compatible with an existing, independent work surface (e.g., a desk top, table top, counter top, etc.) to form a sit-stand workstation. The positioning apparatus allows an operator to use the workstation at multiple heights if desired without the need for separate work surfaces at multiple heights. Accordingly, an operator does not need to move to a different workstation, but can adjust the height of the sit-stand workstation and continue using the existing workstation at the new height. Further, some embodiments of the invention allow for relatively large ranges of travel while occupying a smaller footprint on a work surface where space is valuable, as discussed above.

Figure 9A:
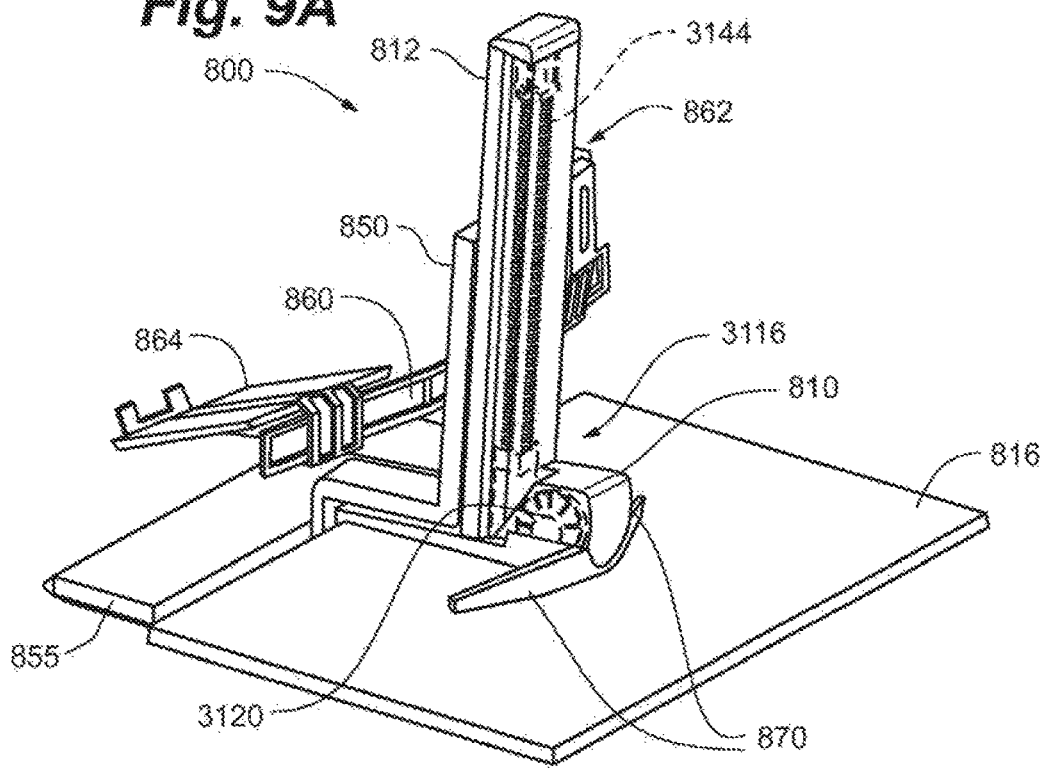
FIGS. 9A-9B are rear perspective views of a positioning apparatus in a lowered position and a raised position, respectively, in accordance with an embodiment of the invention.
Figure 9B:
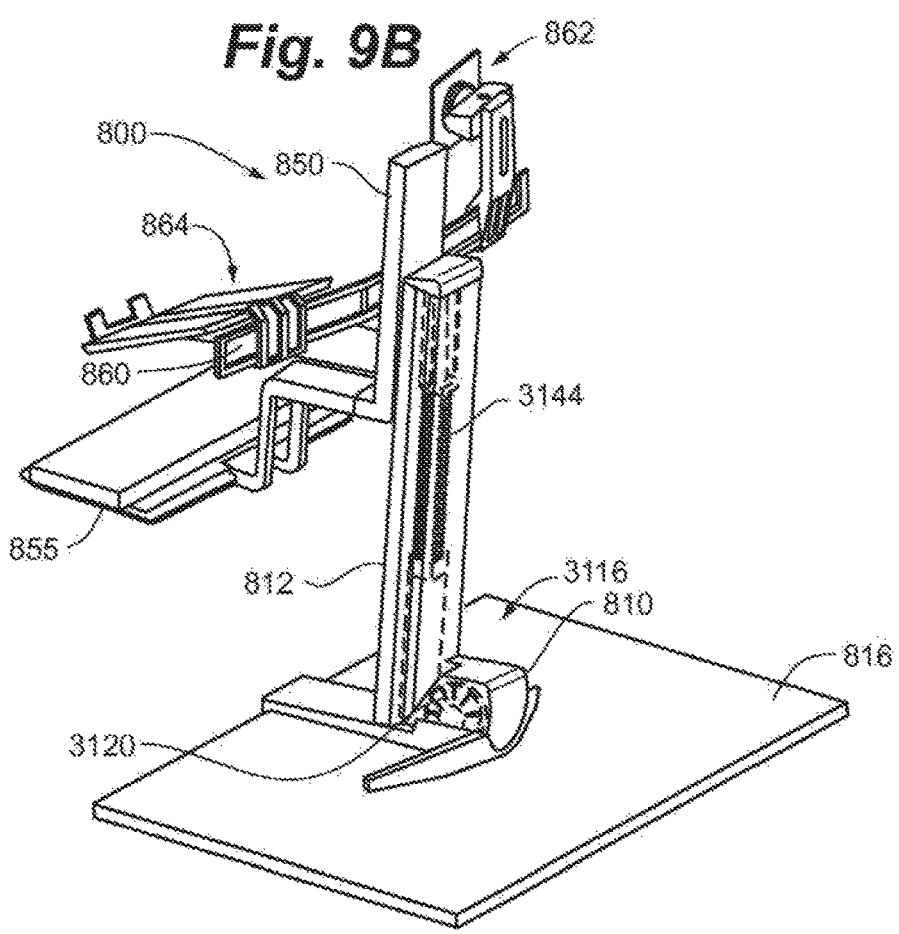

FIGS. 9A and 9B are rear perspective views of the positioning apparatus 800 in a lowered position and a raised position, respectively, without the supported display and notebook. Referring to FIGS. 8A-9B, the positioning apparatus 800 supports an electronic display in the form of a computer monitor 802, in addition to a notebook computer 804 in accordance with an embodiment of the invention. The positioning apparatus 800 includes a base 810 and a generally vertical support column 812 connected to the base 810. A movable mounting portion 850 is movably coupled to the support column 812 and attaches the monitor 802 and notebook 804 to the apparatus. In some cases the mounting portion 850 may also movably couple a keyboard tray 855 and a mouse tray 857 to the support column 812.

Referring to FIGS. 9A and 9B, the apparatus 800 includes a crossbar 860 attached to the mounting portion 850 for mounting various equipment. For example, in some cases a monitor mount 862 (e.g., a standard VESA connector), a notebook tray 864, and/or other equipment mounts are attached to the crossbar 860, allowing the mounting portion 850 to support and move the monitor, notebook, and/or other equipment. It should be appreciated, however, that a wide variety of equipment can be moved by the mounting portion 850 and that the scope of the invention is not limited in this manner. For example, the mounting portion 850 could be configured to support and move a combination of one or more monitors and/or notebooks or other equipment. In some embodiments the mounting portion 850 is configured to support and move a combination of monitors and notebooks (e.g., two monitors and a notebook, three monitors and a notebook). In some embodiments the mounting portion 850 is configured to support and move multiple monitors, such as sets of two, three, or four or more monitors. (See FIGS. 17A-17D for some examples of mounting options.)

As shown in FIGS. 8A, 8B, 9A, and 9B, the positioning apparatus 800 can provide a wide range of travel for the attached monitor and notebook. According to some embodiments, the height of the equipment (and mounting portion 850) can be set to any one of an infinite number of heights within the range of travel. FIGS. 8A and 9A illustrate the positioning apparatus 800 in a low position (e.g., for sitting), while FIGS. 8B and 9B illustrate the positioning apparatus 800 in a high position (e.g., for standing). To provide such adjustability for the monitor 802 and the notebook 804, the positioning apparatus 800 may in some cases include a lift mechanism similar in respects to the lift mechanism 109 described above with reference to FIGS. 1-6, or the lift mechanism 3116 described below with reference to FIGS. 24-36, FIGS. 9A and 9B illustrate the lift mechanism 3116 incorporated into positioning apparatus 800. As can be seen, the wheel 3120, as well as first and second cams 3124, 3126, and pulley system 3 130 (not shown) are positioned within the base 810. The energy storage member 3144, in this case an extension spring, is positioned within the support column 812 and coupled between the support column 812 and the remaining portion of the lift mechanism.

According to some embodiments, the mounting portion 850 can itself provide some degree of adjustability between attached components. For example, as shown in FIGS. 8A, 8B, 9A, and 9B, in some cases a second lift mechanism is incorporated within or attached to the mounting portion 850 as described above with respect to FIG. 7. This can advantageously allow, for example, the crossbar 860 and monitor 802 and the notebook 804 to be height adjusted with respect to the keyboard tray 855 to accommodate different operators.

In the embodiment shown in FIGS. 8A and 8B, the support column 812 is connected to the base 810 at an angle, which is useful for positioning the center of gravity of the monitor 802 and notebook 804 at a desired location with respect to the base 810 to enhance stability. According to some embodiments, the positioning apparatus 800 is advantageously configured to be used with an existing horizontal work surface 816, such as a desk or table. For example, base 810 may include multiple stabilizing legs 870 that hold the apparatus 800 upright on the work surface 816. In some cases the base 810 includes a clamp 814 useful for attaching or securing the positioning apparatus 800 to the horizontal work surface 816.

As discussed above, a positioning apparatus can include a base encompassing any structure that adequately supports the support column and the mounting portion upon a work surface. With continuing reference to FIGS. 8A-9B, according to some embodiments of the invention, the base 810 includes a first end and a second end with an elongated section extending between the first and the second ends. According to some embodiments, portions of the elongated section are formed with a low profile, thus minimizing any obstruction caused by the base and maximizing the range of travel of the mounting portion 850. In some cases the elongated section of the base 810 is generally parallel to the mounting portion 850.

In addition, in some cases the elongated section has a width approximately the same as a width of the mounting portion frame directly above the base and the support column 812. Such a configuration can advantageously reduce the footprint of the base 810 upon the work surface, thus leaving more room for other activities as well as reducing the visual impact of the positioning apparatus. For example, in some embodiments the widths of the elongated section of the base, the frame of the mounting portion, and the support column 812 are equal to or less than about 5 inches. In some cases, the widths of the elongated section, the frame of the mounting portion, and the support column 812 are equal to or less than a width of an electronic display mount (e.g., a VESA mount) attached to the mounting portion.

As discussed with reference to FIGS. 1-4, in some embodiments the base 102 of the positioning apparatus 100 can be removably attached to a work surface with the use of a clamp 120. Many types of clamps can be used to removably attach a positioning apparatus to a work surface according to embodiments of the invention. FIG. 10A is a perspective view of a screw clamp 1000 in accordance with an embodiment of the invention. According to some embodiments, the screw clamp 1000 provides a clamping mechanism having several advantages over traditional clamps, including providing a low profile clamp while still accommodating work surfaces having a wide range of thicknesses with the same clamp. FIGS. 10B, 10C, 10D, and 10E are top, front, bottom, and side views of the screw clamp 1000, respectively. The screw clamp 1000 includes two clamping elements 1002, 1004 (e.g., U-shaped bent wires) that include upper portions 1012, 1014 and lower portions 1022, 1024 that fit about the edge of a work surface 1030 and can be adjusted to clamp to the work surface 1030 by pressing together the bottom and top surfaces of the work surface 1030. The lower portions 1022, 1024 of the clamping elements are coupled together in a spaced relationship (e.g., with a bracket 1032) such that the upper portions 1012, 1014 are able to pivot around the fixed lower portions to clamp about the edge of the work surface 1030. In some embodiments, the bracket 1032 is attached to or formed as part of the base of a positioning apparatus, thus allowing the clamp 1000 to attach the positioning apparatus to the work surface 1030.

According to some embodiments, an adjustable screw 1040 is threadedly coupled to the upper portions of the first and the second clamping elements. Turning the screw 1040 loosens and tightens the clamp 1000 by pulling and pushing the upper portions of the clamping elements together and apart. In some embodiments a threaded insert 1042 is rotatably coupled to the upper portion of each clamping element through a slip fit hole 1044. The insert 1042 includes a threaded hole 1046, oriented perpendicular to the slip fit hole, that receives an end of the screw 1040. In some cases an adjustment nut 1050 is attached (e.g., welded or machined) to the screw 1040 to facilitate rotation of the screw 1040. Turning the nut 1050 and the screw 1040 in a first direction moves the upper portions 1012, 1014 of the clamping elements apart to decrease the space between the upper and lower portions of the clamping elements 1002, 1004 and thus tighten the clamp 1000 about the edge of the work surface 1030. Turning the nut 1050 and the screw 1040 in an opposite, second direction moves the upper portions 1012, 1014 of the clamping elements together to increase the space between the upper and lower portions of the clamping elements 1002, 1004 and thus loosen the clamp 1000 about the edge of the work surface 1030.

FIGS. 11A-11E are various views of another type of screw clamp 1100 that can be useful for removably coupling a positioning apparatus about the edge of a work surface according to some embodiments of the invention. The screw clamp 1100 includes two clamping elements 1102, 1104 (e.g., U-shaped bent wires) that include upper portions 1112, 1114 and lower portions 1122, 1124 that fit about the edge of a work surface 1130 and can be adjusted to clamp to the work surface 1130. The upper portions 1112, 1114 of the clamping elements are coupled together in a spaced relationship (e.g., with a bracket 1132) such that the lower portions 1122, 1124 are able to pivot around the fixed upper portions to clamp about the edge of the work surface 1130. In some embodiments, the bracket 1132 is attached to or formed as part of the base of a positioning apparatus, thus allowing the clamp 1100 to attach the positioning apparatus to the work surface 1130.

According to some embodiments, an adjustable screw 1140 is threadedly coupled to the lower portions of the first and the second clamping elements. Turning the screw 1140 loosens and tightens the clamp 1100 by pulling and pushing the lower portions of the clamping elements together and apart. In some embodiments a threaded insert 1142 is rotatably coupled to the lower portion of each clamping element. The insert 1142 includes a threaded hole 1146, oriented perpendicular to the lower portion, that receives an end of the screw 1140. In some cases an adjustment nut 1150 is attached (e.g., welded or machined) to the screw 1140 to facilitate rotation of the screw 1140. In addition, in some cases an extrusion 1160 is slidingly mounted to the threaded inserts 1142 and provides a flat surface above the adjustable screw for engaging the bottom of the work surface. For example, each threaded insert 1142 may have a "T" shaped extension 1162 that fits within a slot 1164 of the extension 1160. Turning the nut 1150 and the screw 1140 in a first direction moves the lower portions 1122, 1124 of the clamping elements apart to decrease the space between the upper and lower portions of the clamping elements 1102, 1104 and thus tighten the extrusion 1160 against the bottom of the work surface 1130. Turning the nut 1150 and the screw 1140 in an opposite, second direction moves the lower portions 1122, 1124 of the clamping elements together to increase the space between the upper and lower portions of the clamping elements 1102, 1104 and thus loosen the clamp 1100 about the edge of the work surface 1130.

In addition to providing a relatively low profile above the work surface 1130, the screw clamp 1100 shown in FIGS. 11A-11E also occupies a minimum area at the side of the work surface 1130 since the adjustable screw 1140 and the extrusion 1160 are positioned below the work surface 1130.

Figure 12:
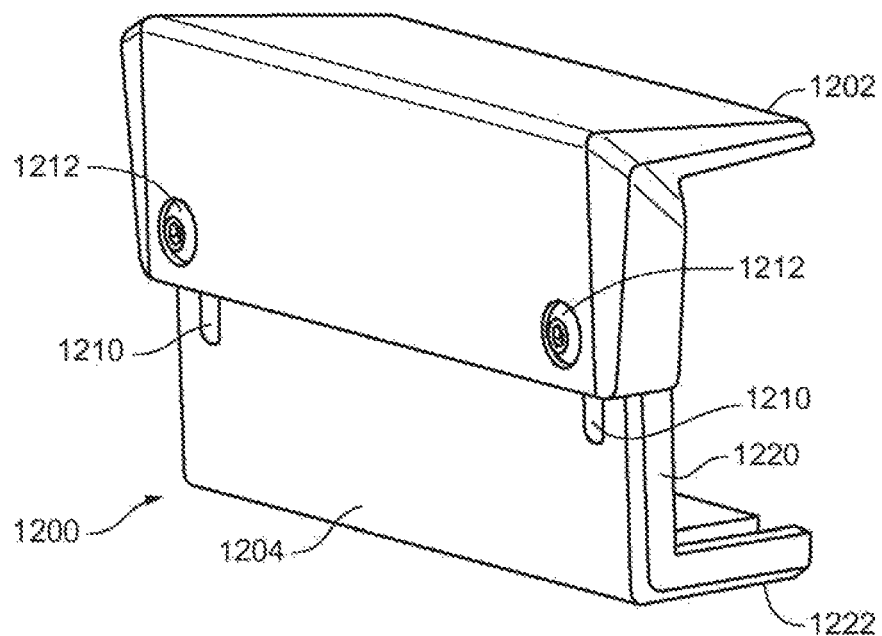
FIG. 12 is a perspective view of a c-clamp in accordance with an embodiment of the invention.
Figure 13A:
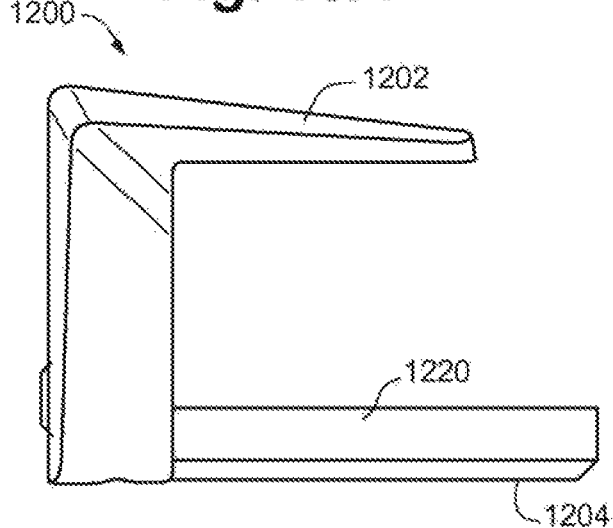
FIG. 13A is a side view of the c-clamp shown in FIG. 12 in a first configuration in accordance with an embodiment of the invention.
Figure 13B:
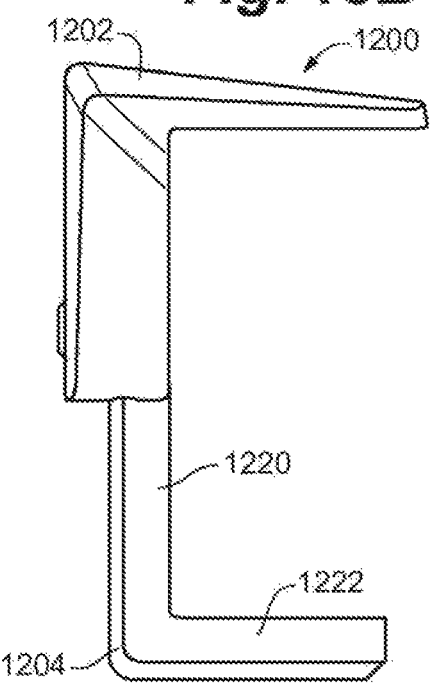
FIG. 13B is a side view of the c-clamp shown in FIG. 12 in a second configuration in accordance with an embodiment of the invention.
Figure 14:
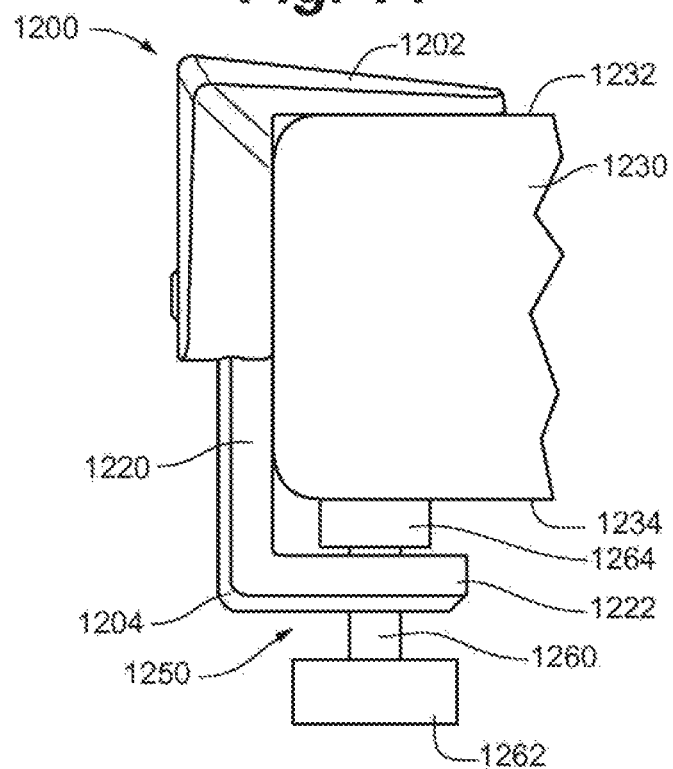
FIG. 14 is a side view of a c-clamp attached to a support surface in accordance with an embodiment of the invention.

FIGS. 12-14 are various views of a c-clamp 1200 that can removably attach a positioning apparatus about the edge of a work surface according to some embodiments of the invention. The c-clamp 1200 includes an upper bracket 1202 coupled to a lower bracket 1204. In certain embodiments the upper and lower brackets each have two legs formed at a right angle, which allows the brackets to clamp about the edge of a work surface 1230 by pressing on the top surface 1232 and the bottom surfaces 1234 of the work surface 1230. In addition, the lower bracket 1204 (or alternatively the upper bracket) may include mounting slots 1210 that provide an adjustable sliding engagement with the upper bracket such that the clamp 1200 can be adjusted to attach to work surfaces of different thicknesses. For example, screws/bolts 1212 can be inserted into the slots and paired with nuts to tighten together the upper and lower brackets. In some embodiments, upper leg 1202 can be formed as part of the base of a positioning apparatus. In such embodiments, the base extends forward and bends downward at the edge of the work surface to form the upper leg 1202.

In certain embodiments, the lower bracket 1204 can be coupled with the upper bracket 1202 in more than one configuration in order to accommodate work surfaces with a greater range of thicknesses. Referring to FIG. 12, in some embodiments the lower bracket 1204 includes a first leg 1220 and a second leg 1222, and the length of the first leg 1220 is longer than the length of the second leg 1222, Turning to FIG. 13A, the short second leg 1222 can be coupled with the upper bracket in some cases to clamp about work surfaces having a relatively small thickness. In certain cases the long first leg 1220 can be coupled with the upper bracket as shown in FIG. 13B in order to clamp about work surfaces having a greater thickness. Accordingly, the c-clamp 1200 can be adjusted to attach a positioning apparatus to a wide variety of pre-existing work surfaces.

Turning to FIG. 14, in some embodiments an adjustable pressure mechanism 1250 can further enhance the operation of the C-clamp 1200 by providing a tighter clamp about an edge of the work surface 1230. For example, in some cases each of the first and the second legs of the lower bracket 1204 is configured to threadedly receive a threaded rod 1260 of a screw knob 1262. The screw knob also includes a washer 1264 or other engaging member that presses into the bottom surface 1234 of the work surface 1230 as the screw knob 1262 is turned. According to this embodiment, it is possible to use the same C-clamp 1200 on a wide range of work surface thicknesses without using a screw knob having an extremely long threaded rod. Instead a screw knob having a shorter threaded rod can be used with additional adjustability provided by the various configurations of the upper and lower brackets 1202, 1204 and the adjustable coupling between the brackets. Accordingly, some embodiments provide a small profile clamp 1200 in which the screw knob 1262 sticks out a smaller amount when the clamp is mounted on a thinner desk surface.

Figure 15:
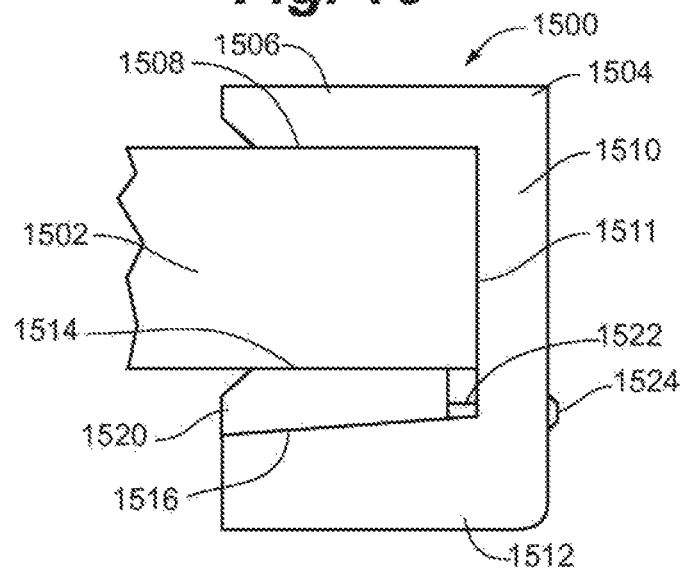
FIG. 15 is a side view of a wedge clamp attached to a support surface in accordance with an embodiment of the invention.

FIG. 15 is a side view of another clamp 1500 that can removably attach a positioning apparatus about the edge of a work surface 1502 according to some embodiments of the invention. The clamp 1500 includes a c-shaped bracket 1504 having an upper leg 1506 positioned on a top surface 1508 of the work surface, a middle leg 1510 abutting an edge 1511 of the work surface, and a lower leg 1512 positioned under a bottom surface 1514 of the work surface. In some embodiments, upper leg 1506 can be attached to or formed as part of the base of a positioning apparatus. The lower leg 1512 includes an inclined upper face 1516 that angles toward the upper leg 1506 at it extends toward the middle leg 1510. The clamp 1500 also includes a wedge 1520 adjacent the upper face 1516 of the lower leg 1512. The wedge 1520 is between the lower leg of the c-shaped bracket 1504 and the bottom surface 1514 of the work surface 1502. The c-shaped bracket 1504 and wedge 1520 can be formed from any material exhibiting suitable strength characteristics (e.g., a metal, metal alloy, plastic, etc.).

In certain embodiments the wedge includes a threaded nut (not shown) that threadingly engages a screw 1522 extending through the c-shaped bracket 1504 (e.g., through the middle leg 1510). Turning the screw 1522 in a first direction pulls the wedge along the inclined upper face 1516 toward the middle leg 1510. This movement applies an increasing amount of pressure between the lower leg 1512 and the bottom surface 1514 of the work surface to clamp the c-shaped bracket 1504 about the edge of the work surface. Turning the screw 1522 in a second direction pushes the wedge back along the inclined face 1516 away from the middle leg 1510, thus decreasing the pressure and allowing removal of the bracket 1504 from about the edge of the work surface 1502. Movement of the wedge 1520 thus allows the clamp 1500 to be removably attached about the edge of the work surface 1502. The movement of the wedge 1520 advantageously occurs within the c-shaped bracket 1504, thus providing the clamp 1500 with a mostly smooth (e.g., except for the head 1524 of the screw 1522) and unobtrusive exterior profile.

As discussed with reference to FIGS. 1-4, in some embodiments the base 102 of the positioning apparatus 100 can be fixedly attached to a work surface with the use of a fastener such as an adhesive and/or a screw/bolt and mounting hole. FIG. 16 illustrates one example in which an attachment plate 1600 is used with a screw or bolt 1602 to attach a positioning apparatus 1604 to a work surface 1606 in accordance with an embodiment of the invention. In this case the work surface 1606 includes a through hole (not shown) that may be preformed, or drilled or cut out during the attachment process. The base of the positioning apparatus includes a threaded nut (not shown) that threadingly engages the screw or bolt 1602 inserted through the through hole. Tightening the screw/bolt 1602 thus fixedly attaches the positioning apparatus 1604 to the work surface 1606. In some embodiments the work surface 1606 may include multiple through holes and the base of the positioning apparatus may include multiple threaded nuts that allow multiple screws/bolts to fix the positioning apparatus to the work surface. In certain embodiments the attachment plate 1600 is optionally used to increase the rigidity/stability of the attachment and/or allow for the use of less screws/bolts by spreading the compressive force of each screw/bolt across a wider area of the bottom surface of the work surface 1606. In some cases a single screw/bolt may be combined with the attachment plate 1600 to adequately secure the positioning apparatus to the work surface.

Returning to FIGS. 1, 2A, 2B, and 3, the positioning apparatus 100 is configured to support and move a single electronic display, a keyboard, and a mouse relative to a work surface that supports the positioning apparatus 100. As discussed above, this is just one of many possible equipment configurations. Other combinations of mounts for displays, keyboards, pointing devices, and other equipment, as well as other combinations of accessories and optional features are also contemplated, some of which will now be discussed.

Turning to FIG. 16, in some cases most of a positioning apparatus (e.g., other than a portion of the base) may have the ability to swivel or rotate with respect to a work surface. FIG. 16 also illustrates an optional turntable 1610 that may be attached to or included as part of the base of the positioning apparatus 1604. The turntable 1610 allows the positioning apparatus to be rotated/swiveled about the axis of the turntable, thus enabling an operator to use the positioning apparatus from multiple sides of the work surface 1606. Use of the turntable 1610 may thus provide enhanced functionality that can be useful for round tables or tables of any shape.

Turning to FIGS. 17A-17D, perspective views are shown of positioning apparatuses with various mounting options. Although some preferred embodiments of the invention are configured to support an electronic display and a keyboard, some positioning apparatuses can be configured with a number of optional and/or alternative mounts and supports for attaching and otherwise supporting other items. For example, in some cases the mounting portion of a positioning apparatus can include at least one of an electronic display mount, a notebook mount, a keyboard tray, a mouse tray, a document holder, a movable work surface, and a telephone holder. In some cases a positioning apparatus includes multiple display mounts for supporting two or more electronic displays such as computer monitors. A positioning apparatus may also optionally include a notebook tray and/or a notebook docking station instead of or in addition to other mounts and supports.

Figure 17A:
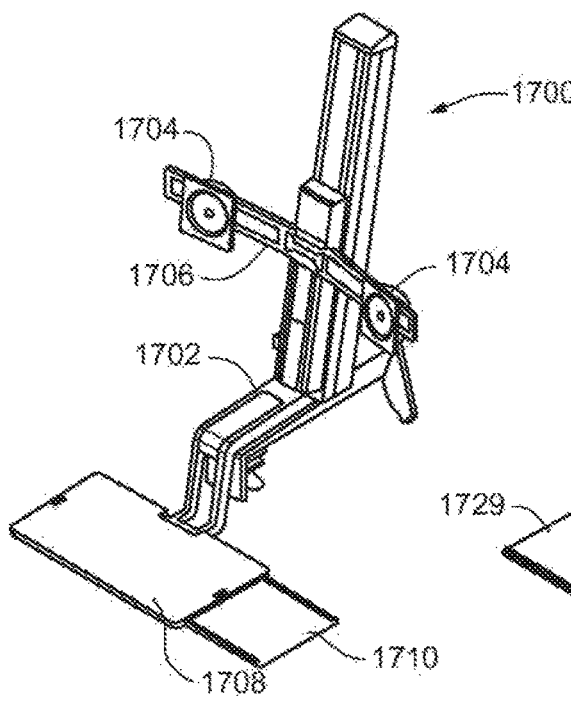
FIGS. 17A-17D are perspective views of positioning apparatuses with different mounting options in accordance with embodiments of the invention.
Figure 17B:
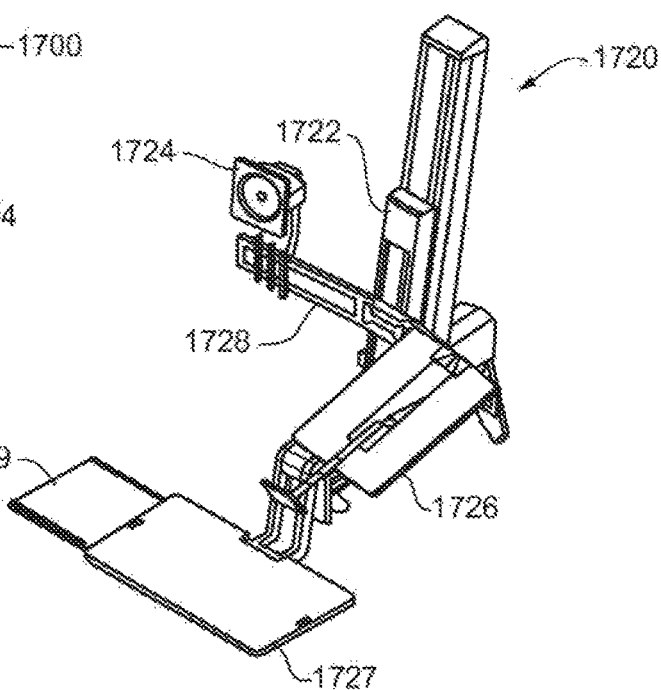
Figure 17C:
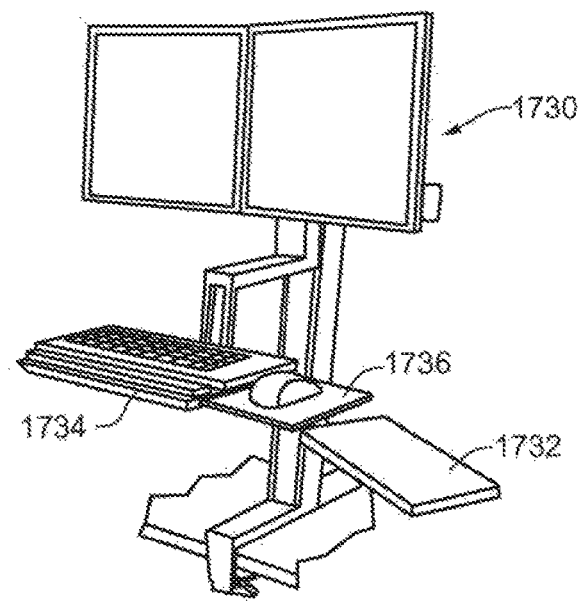
Figure 17D:
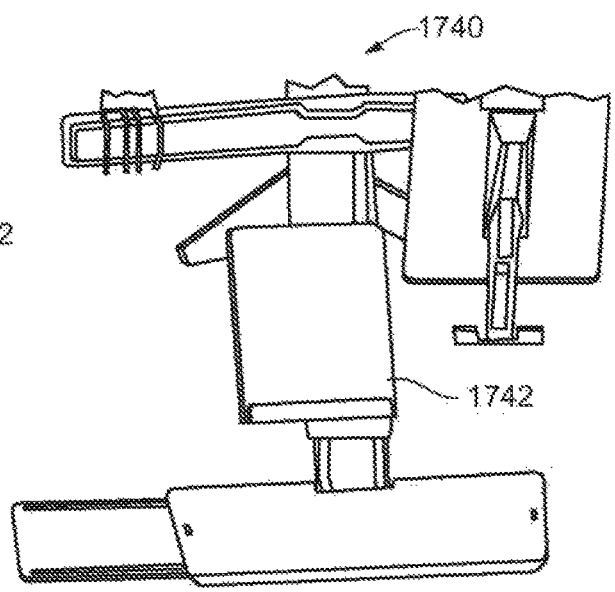

FIGS. 1-3 illustrates an example of a positioning apparatus 100 that includes a mounting portion 106 that has a single display mount 110 and a keyboard tray 112. The mounting portion 106 also supports a mouse tray 119 that is attached to the keyboard tray 112. As shown in FIGS. 17A and 17B, a cross bar can also be attached to a mounting portion for attaching two or more items. FIG. 17A illustrates an example of a positioning apparatus 1700 that includes a mounting portion 1702 that has dual display mounts 1704 mounted to a cross bar 1706. The apparatus 1700 also includes a keyboard tray 1708 and a mouse tray 1710. FIG. 17B illustrates an example of a positioning apparatus 1720 that includes a mounting portion 1722 that has a single display mount 1724 and a notebook tray 1726 mounted to a cross bar 1728. The apparatus 1720 also includes a keyboard tray 1727 and a mouse tray 1729. As shown in FIGS. 17A and 17B, items can be mounted to a cross bar through various configurations, including a center mount (FIG. 17A) and/or a mount above the cross bar (FIG. 17B). Items can additionally or alternatively be mounted below the cross bar. FIG. 17C illustrates a positioning apparatus 1730 similar to the apparatus 1700 shown in FIG. 17A, but also including an additional support surface 1732 attached to the keyboard tray 1734 and mouse tray 1736. The support surface 1732 can be useful for supporting any number of items, including documents, writing utensils, computer components (e.g., speakers, memory devices, etc.), or any other item that an. operator may wish to keep close at hand. In some cases the support surface 1732 may be coupled to the keyboard/mouse tray in a movable manner, thus allowing repositioning of the support surface (e.g., horizontally and/or vertically). FIG. 17D illustrates a positioning apparatus 1740 similar to the apparatus 1720 shown in FIG. 17B. The apparatus 1740 also includes a document holder 1742 that is attached to the mounting portion of the apparatus.

Figure 18:
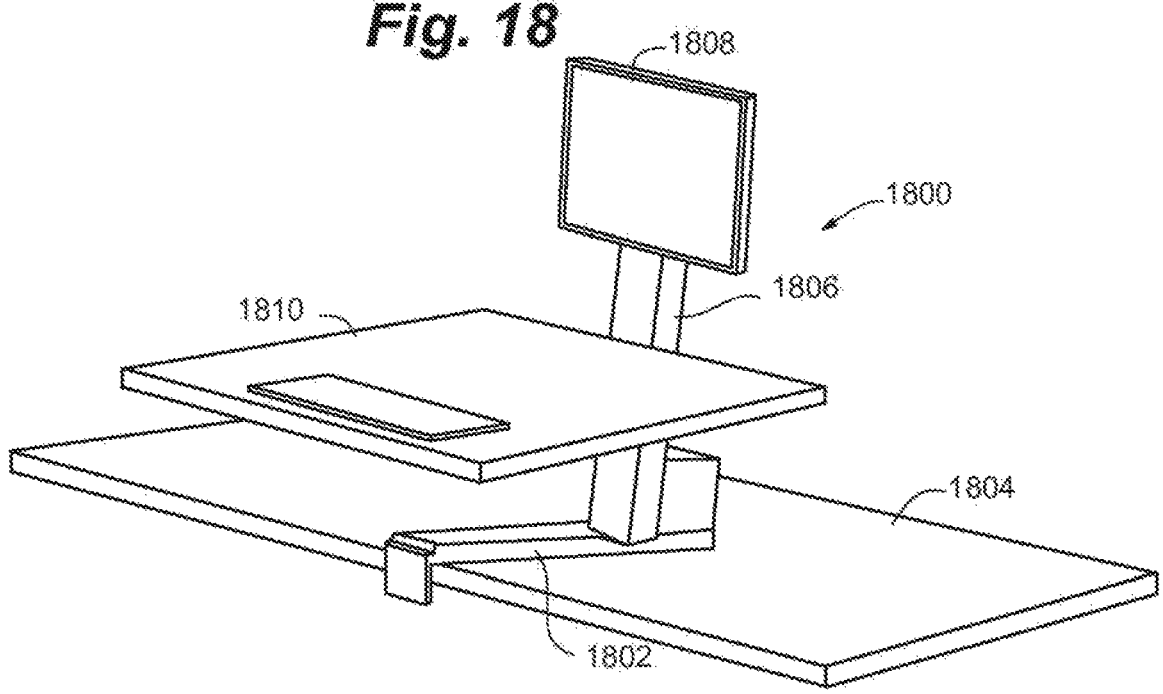
FIG. 18 is a perspective view of a positioning apparatus including a keyboard work surface in accordance with an embodiment of the invention.
Figure 19:
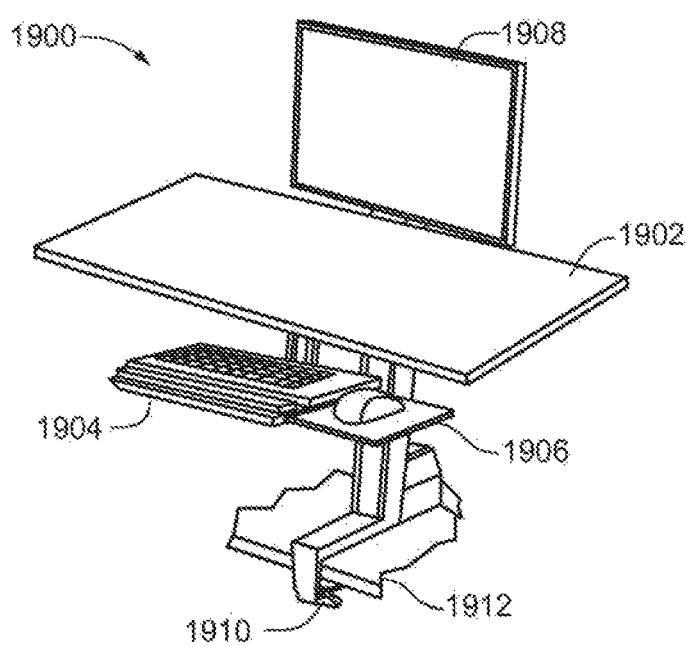
FIG. 19 is a perspective view of a positioning apparatus including a keyboard tray and a work surface in accordance with an embodiment of the invention.

FIGS. 18 and 19 show two additional embodiments of the invention that include a movable work surface attached to a positioning apparatus. FIG. 18 is a schematic illustration of a positioning apparatus 1800 that includes a base 1802 attached to a work surface 1804 at a front end of the base. A support column 1806 is movably coupled to a mounting portion (not shown separately) that supports a display 1808 attached to a display mount. The mounting portion also includes a movable work surface 1810. The work surface 1810 functions as a keyboard tray, but also provides a work area that can be useful to, e.g., read or mark up paper documents, support various items, etc. As discussed above, the attachment between the positioning apparatus (e.g., either removably with a clamp, or fixedly with an adhesive or other fastener) may advantageously provide the apparatus 1800 with an increased degree of stability and/or allow for a base 1802 with a reduced footprint.

FIG. 19 is a perspective view of another positioning apparatus 1900 that includes a movable work surface 1902 attached to the mounting portion of the positioning apparatus. For example, in some cases the work surface can be clamped or fixedly attached (e.g., with screws/bolts) to the generally horizontal second member 113 of the mounting portion 106 shown in FIGS. 1-4. The movable work surface 1902 thus moves simultaneously with the mounting portion and the keyboard tray 1904 and mouse tray 1906, but is separate from the keyboard tray 1904 and mouse tray 1906. In some cases a display mount supporting a display 1908 may be adjustably separately from the work surface 1902 (e.g., as described above with respect to the secondary lift mechanism 122 in FIGS. 1-6). In some embodiments the positioning apparatus 1900 includes a clamp 1910 for removably attaching the apparatus to an existing work surface 1912, which can provide an added amount of stability versus simply resting upon the work surface 1912.

FIGS. 20A and 20B are schematic representations of front perspective views of a positioning apparatus 2000 in a raised position and a lowered position, respectively, in accordance with an embodiment of the invention. The apparatus includes a base 2002 attached to a work surface 2004 at a front end of the base. A support column 2006 is movably coupled to a mounting portion (not shown separately) that supports a display 2008 attached to a display mount. The mounting portion includes a keyboard arm 2010 and a coupled keyboard tray 2012. The mounting portion (again, not separately shown) is configured so that as the mounting portion moves up and down relative to the support column 2006, the keyboard tray 2012 and display 2008 move up and down through a generally vertical range of travel 2014. As shown in FIGS. 20A and 20B, the vertical range of travel of the keyboard tray 2012 is entirely above the work surface 2004 in this embodiment. The apparatus 2000 thus provides a multi-position workstation that allows the keyboard tray 2012 and the display 2008 to be moved between two or more positions (e.g., heights) above the work surface 2004. In some embodiments the positioning apparatus 2000 also includes an attachment mechanism (e.g., a clamp) for removably or fixedly attaching the apparatus to the existing work surface 2004. The attachment mechanism can provide an added amount of stability versus simply resting upon the work surface 2004.

Figure 21A:
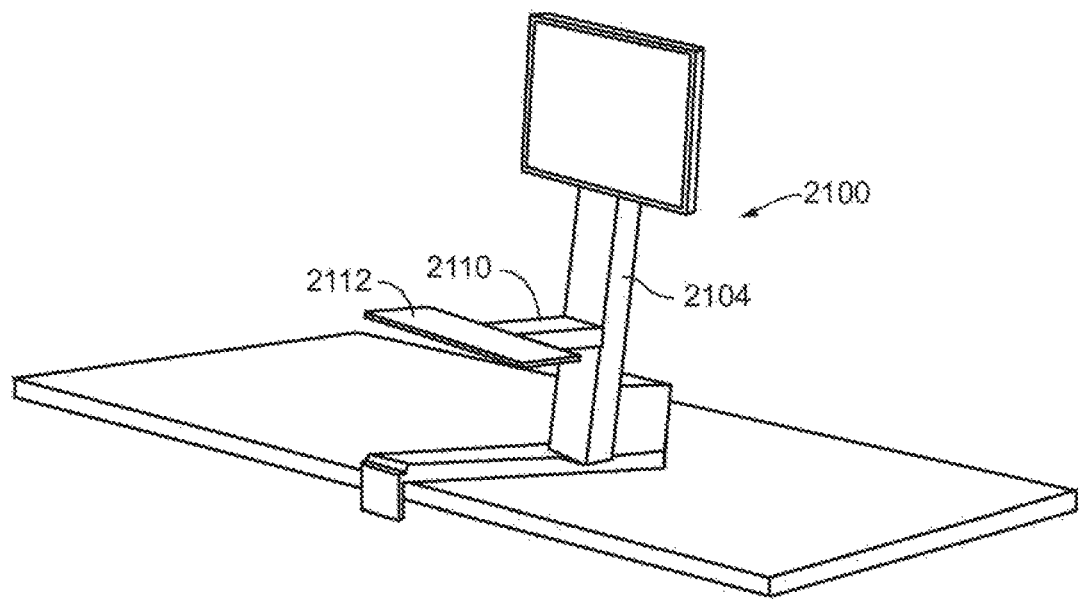
FIGS. 21A-21B are front perspective views of a positioning apparatus with a keyboard tray in a contracted position and an extended position, respectively, in accordance with an embodiment of the invention.
Figure 21B:
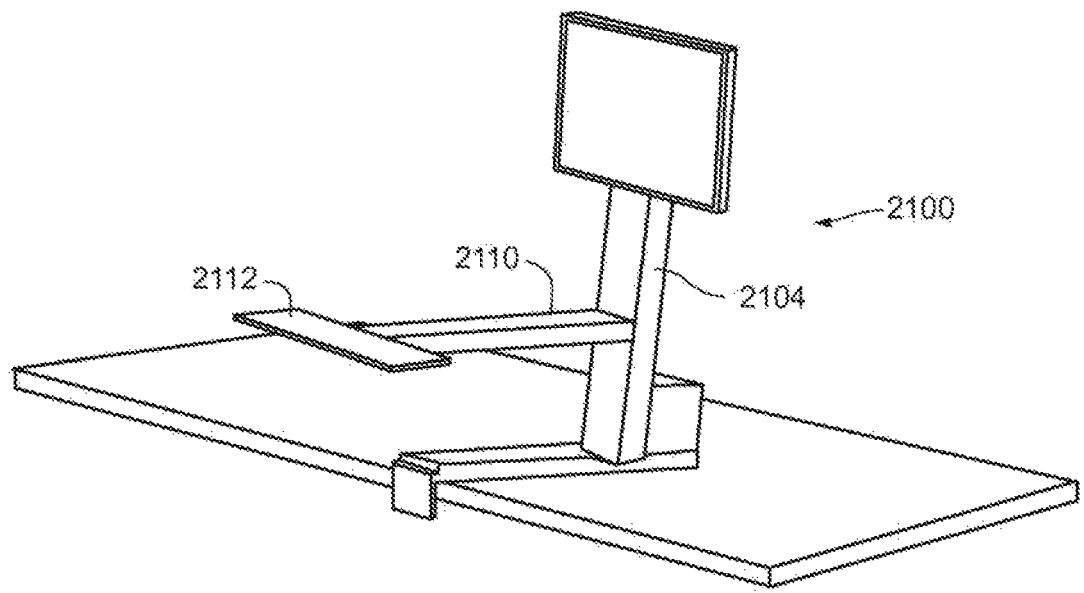

FIGS. 21A and 21B are schematic representations of front perspective views of a positioning apparatus 2100 in a raised position and a lowered position, respectively, in accordance with an embodiment of the invention. The positioning apparatus 2100 is similar to the apparatus 2000 illustrated in FIGS. 20A and 20B. In addition, the positioning apparatus 2100 includes an extendable keyboard arm 2110 that enables an operator to pull the keyboard tray 2112 away from the support column 2104 (toward the operator) or push it toward the support column 2104 (away from the operator). The extendable keyboard arm 2110 can include any suitable extending mechanism, including, for example, slides and/or rollers. In some cases the extendable keyboard arm 2110 may be able to pan horizontally and/or move vertically relative to the positioning apparatus 2100.

FIGS. 22A-22C are front perspective views of a positioning apparatus 2200 with swivel functionality in accordance with an embodiment of the invention. The swivel functionality can be provided in any suitable manner, including with the use of a swivel mechanism or joint to attach a display mount and a display 2202 to the support column 2204. The swiveling capability allows the display 2202 to be panned from side to side to adjust a viewing angle. In some embodiments the positioning apparatus 2200 is attached to the work surface 2206 (e.g., removably and/or fixedly, as described above), thus enabling panning of the display 2202 without a reduced risk of tipping of the apparatus.

Figure 23A:
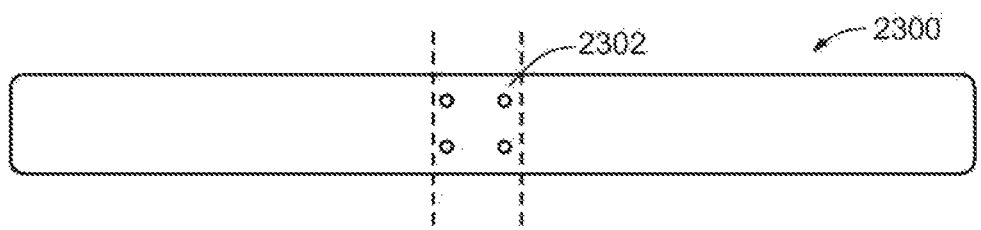
FIGS. 23A-C are elevation views of crossbars in accordance with embodiments of the invention.
Figure 23B:
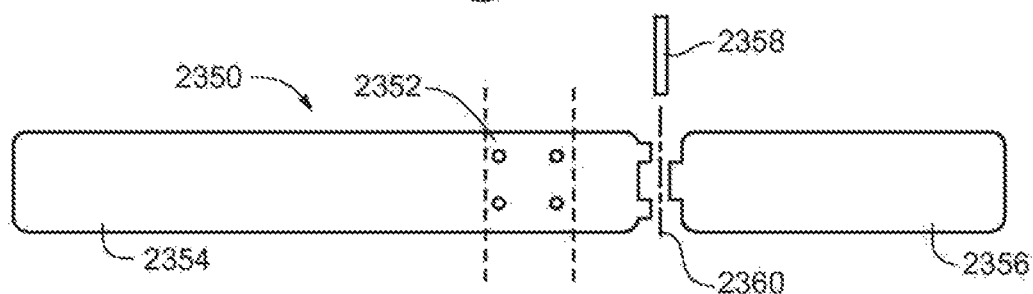
Figure 23C:
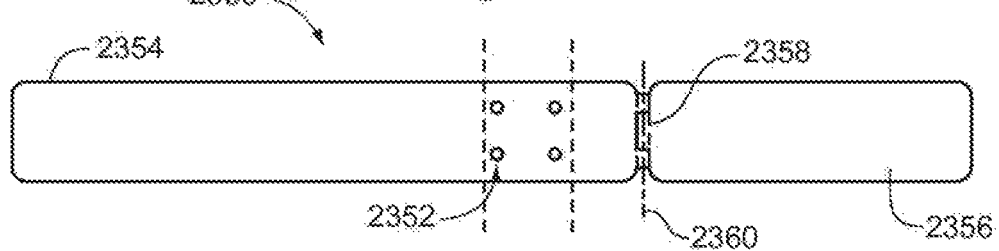

FIGS. 23A-C are elevation views of crossbars in accordance with embodiments of the invention. As discussed elsewhere herein, some embodiments of the invention provide a positioning apparatus with one or more crossbars for mounting multiple pieces of equipment to a support column (e.g., a "riser"). Some examples of a crossbar are discussed, for example, with respect to FIGS. 17A-17D. FIG. 23A is an elevation view of another crossbar 2300 according to an embodiment of the invention. The crossbar 2300 is generally configured as an elongated arm with a support column mounting portion 2302, in this case positioned centrally along the crossbar 2300. One or more displays or other types of equipment may be mounted directly to the crossbar 2300 or indirectly with a suitable coupling mechanism.

FIGS. 23B and 23C are elevation views of another crossbar 2350 that can be used to support one or more pieces of equipment upon a positioning apparatus. The crossbar 2350 is configured as an elongated arm assembly with a support column mounting portion 2352 that includes four bolt holes for mounting the crossbar 2350 to a support column. The arm assembly includes a first stationary portion 2354 that remains stationary with respect to the mounting portion 2352, and a movable portion 2356 that is coupled to the stationary position with a pin 2358. The movable portion 2356 rotates at one end about an axis 2360 located at the pin 2358. Thus a display or other piece of equipment mounted to the movable portion 2356 of the arm assembly can be moved (i.e., panned) with respect to the stationary portion 2354 of the arm assembly. The movable portion can be provided on the left side or the right side of the support column.

Embodiments of the invention also include methods for positioning an electronic display and a keyboard. Referring to FIGS. 8A-9B, one exemplary method involves selecting an existing generally horizontal work surface 816 and providing a positioning apparatus such as the positioning apparatus 800. In some cases the positioning apparatus has a base 810 configured to sit on the work surface 816, a support column 812 extending upward from the base 810, and a mounting portion 850 movably coupled to the support column 812 through a vertical range of travel relative to the work surface 816. The method also includes attaching the positioning apparatus 800 to the work surface 816 and supporting an electronic display 802 and a keyboard with the mounting portion 850 of the apparatus. The method also includes moving the mounting portion 850 between a sitting position (e.g., FIG. 8A) and a standing position (e.g., FIG. 8B) relative to the work surface 816.

According to some embodiments, positioning methods also include moving the electronic display 802 simultaneously with the keyboard (e.g., on the keyboard tray 855). In addition, one exemplary method also includes moving the electronic display 802 with respect to the keyboard. An operator may also adjust an angle of the keyboard and/or the electronic display relative to the work surface 816 by, e.g., manipulating an articulating mount such as a tilt and/or rotation mechanism. In another embodiment, a positioning method includes attaching the positioning apparatus about one of a front edge, a back edge, and a side edge of the work surface 816.

In some embodiments, a method for positioning an electronic display and a keyboard includes attaching a positioning apparatus (e.g., one of those discussed herein) to a work surface, supporting the electronic display with the mounting portion, supporting the keyboard with the mounting portion, and moving the mounting portion through a vertical range of travel to simultaneously move the electronic display and the keyboard relative to the support column and the work surface. The method may also include rigidly attaching the base of the positioning apparatus to the work surface. For example, the base can be rigidly attached by inserting a fastener through the work surface. In some cases the method includes removably attaching the base of the positioning apparatus to the work surface. In some cases removable attachment can be achieved by clamping the base to the work surface. Embodiments further include moving the mounting portion within the vertical range of travel so that the keyboard moves from below the work surface to above the work surface. In some cases the mounting portion can also or instead be moved within the vertical range of travel so that the keyboard and the electronic display move between a sitting position and a standing position relative to the work surface. According to some embodiments, an exemplary method further includes moving the mounting portion so that the electronic display moves independently from the keyboard. In some cases an angle of the keyboard can also be adjusted with respect to the work surface.

As will be appreciated, multi-position workstations (one example being a sit-stand positioning apparatus) may be subjected to more frequent adjustment (e.g., several times in a work day) than more traditional, stationary monitor mounts. Some embodiments of the invention provide a lift mechanism that can increase the cycle life of the apparatus as it encounters increased articulation. An example of one such lift mechanism including a multi-cam balance mechanism is discussed in co-pending U.S. patent application Ser. No. 13/191,182, titled Cam Balance Systems and Methods, and filed concurrently herewith. The entire content of the 5983.040US1 application is hereby incorporated by reference herein in its entirety. Of course, many other types of lift mechanisms can be used as noted above. Referring now to FIGS. 24-36, an exemplary embodiment including a lift/balance mechanism 3116 incorporating a dual surface cam is described.

Figure 24:
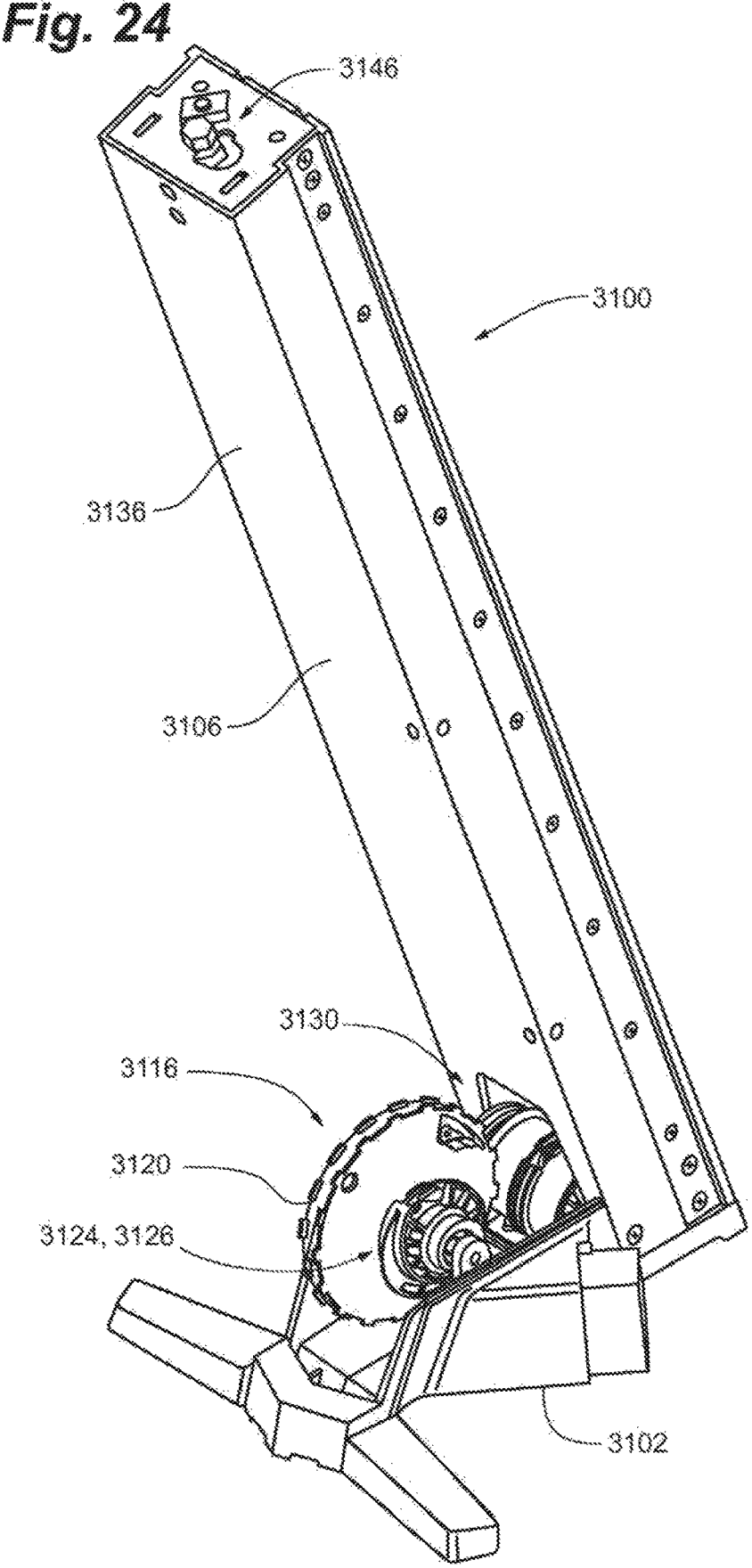
FIG. 24 is a perspective view of an apparatus in accordance with an embodiment of the invention.

FIG. 24 is an elevation view of an apparatus 3100 in accordance with an exemplary embodiment. Apparatus 3100 of FIG. 24 comprises a base 3102 and a generally vertical support column 3106 connected to the base 3102, similar to embodiments described above with respect to FIGS. 1-22C. The base may include any structure for supporting the apparatus. In some embodiments, the base may include a relatively flat horizontal surface useful for placement on a horizontal work surface. In other embodiments, the base includes a clamp to clamp the apparatus to a horizontal surface or a wall bracket to attach the apparatus to a vertical wall. The support can be connected to the base by any suitable method. In some embodiments, the support is pivotably connected to the base such that the support can pivot with respect to the base. In the embodiment shown in FIG. 24, the support is connected to the base at an angle. The angle is useful for positioning the center of gravity of the monitor or other equipment carried by the support at a desired position with respect to the base to enhance stability.

Portions of a balance mechanism 3116 can also be seen in FIG. 24. As will be described in more detail herein, the portions of the balance mechanism shown in FIG. 24 include a wheel 3120, a first cam 3124 and a second cam 3126, and a pulley system 3130.

Figure 25:
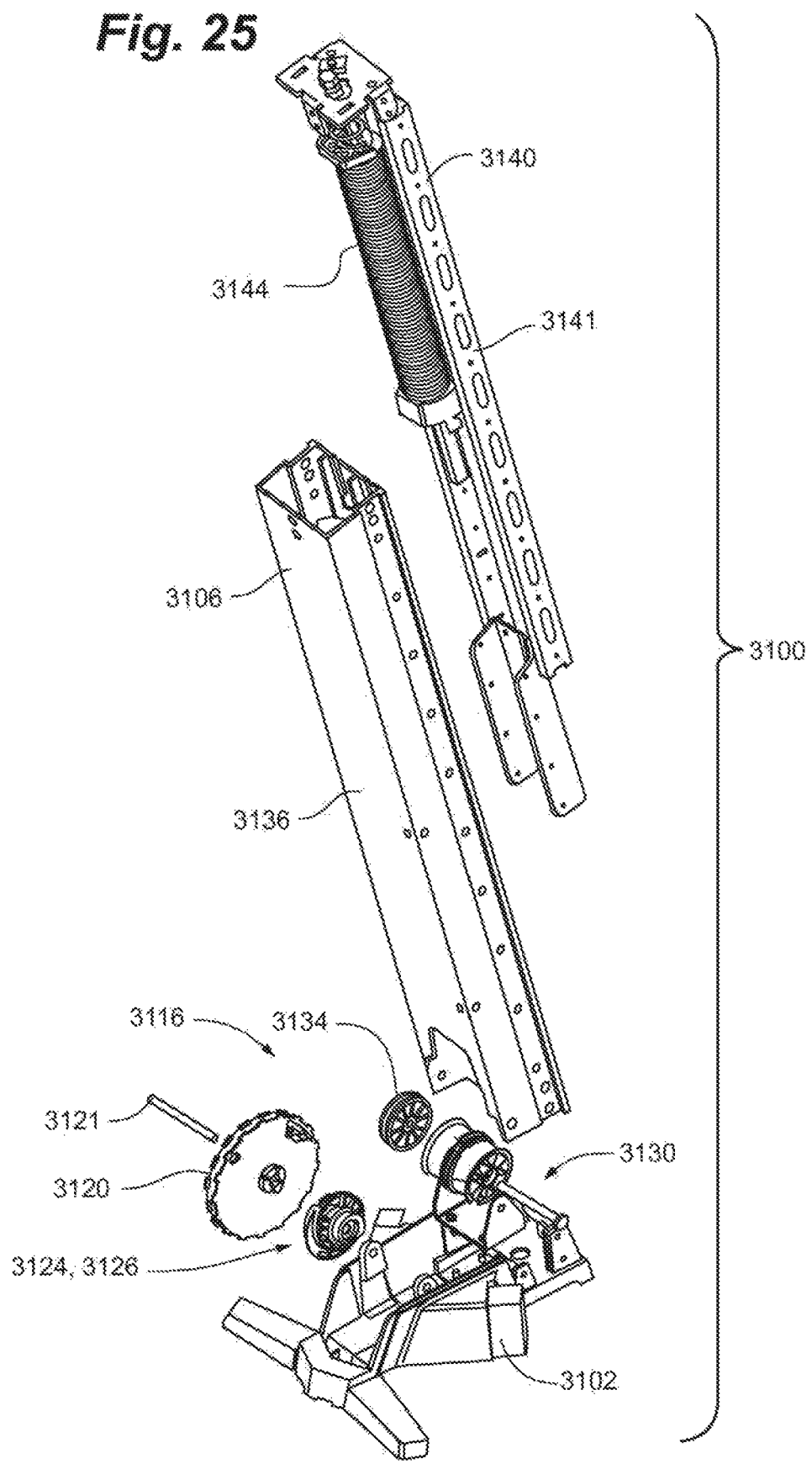
FIG. 25 is a partially exploded view of the apparatus of FIG. 24.

FIG. 25 is a partially exploded version of FIG. 24. In FIG. 25, it can be seen that the generally vertical support column 3106 includes a first portion 3136 and a second portion 3140. As shown in FIG. 27, once fully assembled, a mounting portion 3150 (e.g., sometimes referred to as a "truck") is coupled to the second portion 3140. Mounting portion 3150 and second portion 3140 are disposed in sliding engagement with one another such that the mounting portion can translate with respect to second portion 3140. For example, second portion 3140 may include rails 3141 and the mounting portion 3150 may include wheels that roll along the rails. In general, first portion 3136 and second portion 3140 are connected to base 3102, and the mounting portion 3150 is connected to one or more monitors and/or other computing equipment that translate along with the mounting portion 3150 with respect to first and second portions 3136, 3140. For example, the mounting portion 3150 may be coupled to or integrally include a mounting portion as discussed above with respect to FIGS. 1-6. As shown in FIG. 25, an energy storage member 3144 is coupled to second portion 3140. The energy storage member 3144 may include any device useful for storing potential energy, such as a spring (e.g., an extension spring, compression spring, torsion spring, etc). The energy storage member may be adjustable by an energy storage member adjustment mechanism 3146 (e.g., a threaded bolt with a bracket that changes the effective at rest length of the energy storage member when actuated).

The balance mechanism 3116 provides a balancing force between the first and second portions of the support column and the mounting portion 3150, such that an operator can position equipment attached to the mounting portion at any desired height along the range of travel having only to overcome the friction of the system. Further, because of the balancing force provided by the balance mechanism, the mounting portion will hold its set position without the operator having to engage any locks.

Figure 29A:
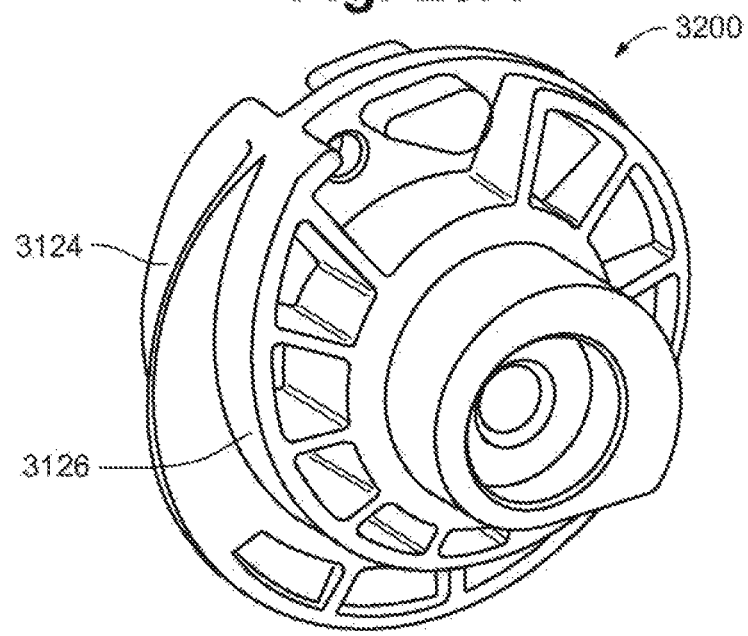
FIGS. 29A and 29B are perspective views of a cam member including a first cam and a second cam in accordance with an embodiment of the invention.
Figure 29B:
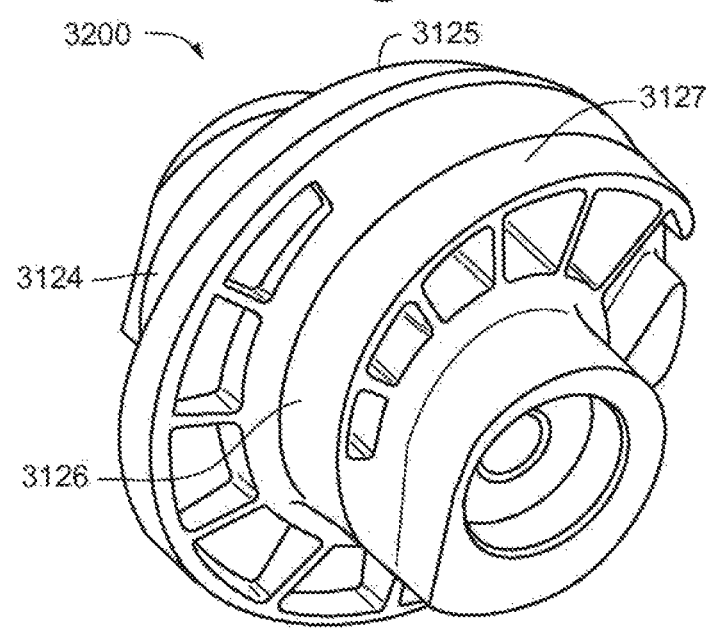
Figure 31:
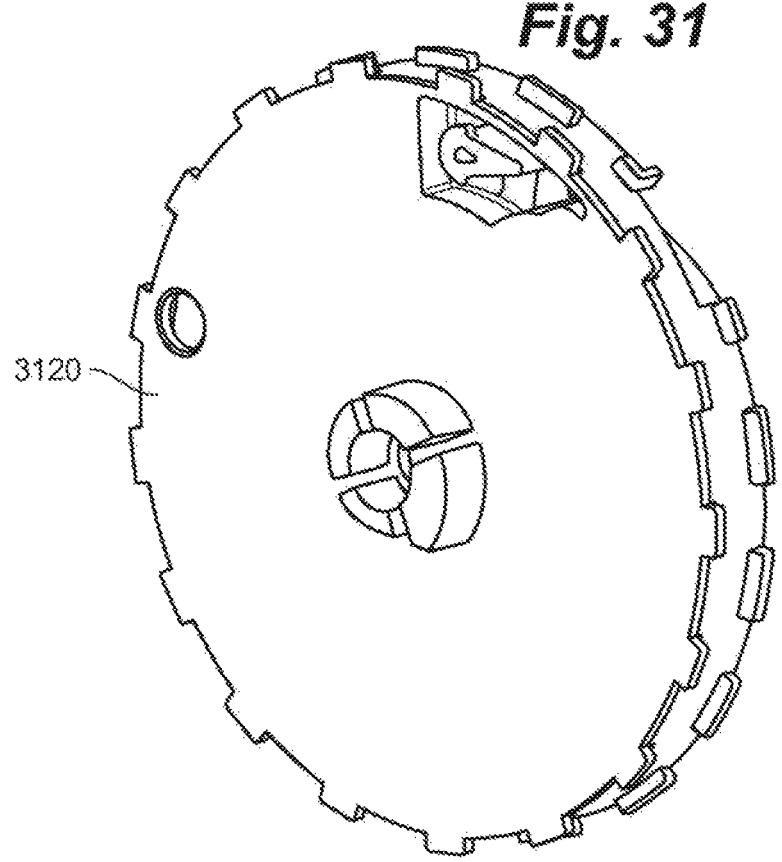
FIG. 31 is a perspective view of a wheel.
Figure 32:
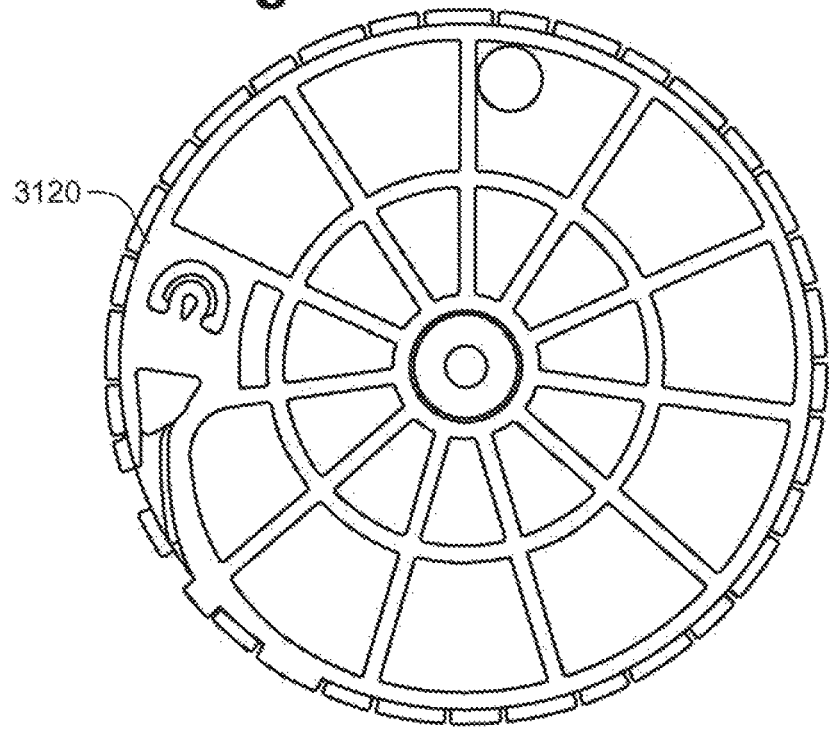
FIG. 32 is a side plan view of the wheel of FIG. 31.

In the embodiment of FIGS. 24 and 25, the wheel 3120 is coupled to first cam 3124 and second cam 3126, which rotate along with rotation of the wheel. As shown, first cam 3124 and second cam 3126 can be provided as a single integral cam member. In addition, the wheel and cam member may be provided as different pieces connected directly together through axle 3121. In other embodiments, they may be integrally formed or separated by a distance when installed. In some embodiments the first and the second cams 3124, 3126 are formed using a die cast or molded polymer, such as ABS plastic or nylon. In certain embodiments the cams can be formed from machined aluminum. FIGS. 29A, 29B, and 30 provide perspective and side elevation views of a cam member including both first and second cams 3124, 3126 in accordance with an embodiment. FIGS. 31 and 32 provide perspective and side elevation views of wheel 3120 in accordance with some embodiments.

Figure 26A:
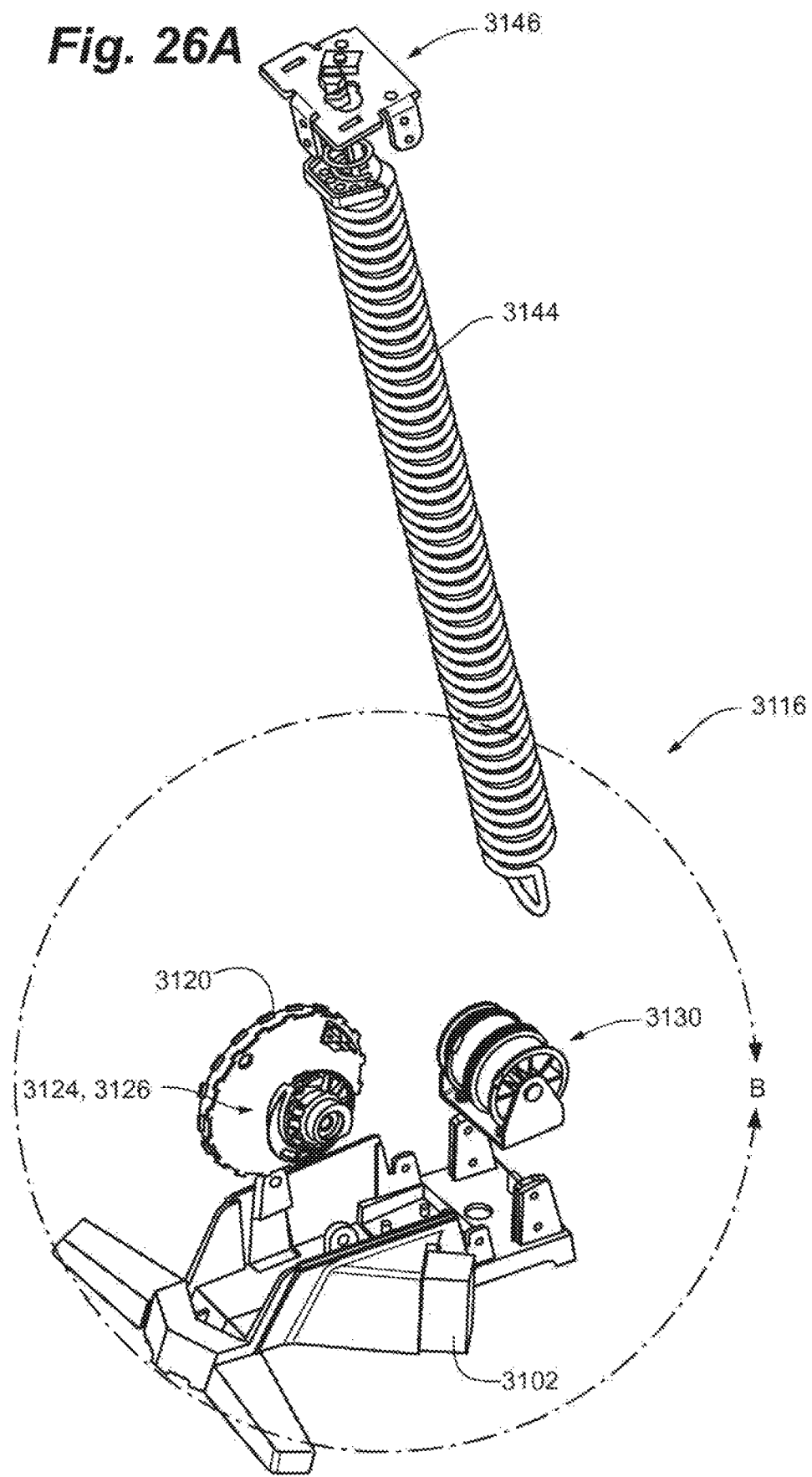
Figure 33:
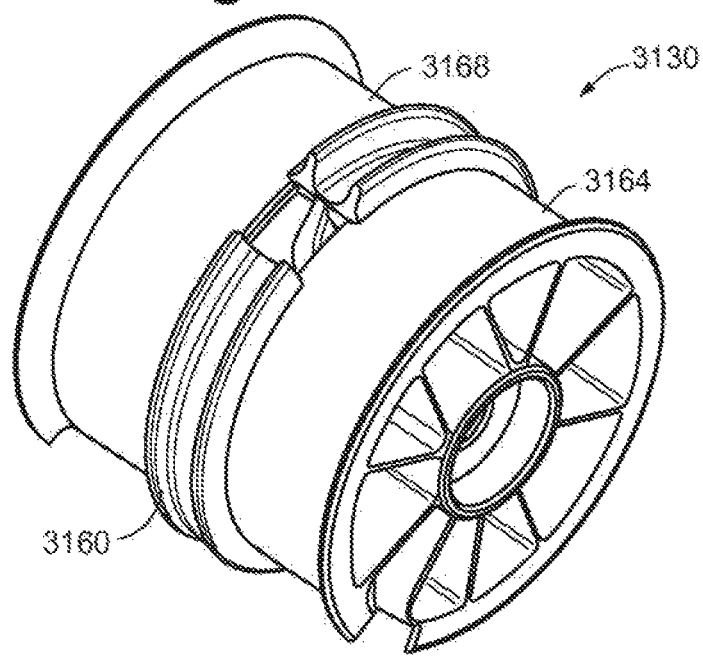
FIG. 33 is a perspective view of a pulley system in accordance with an embodiment of the invention.
Figure 34:
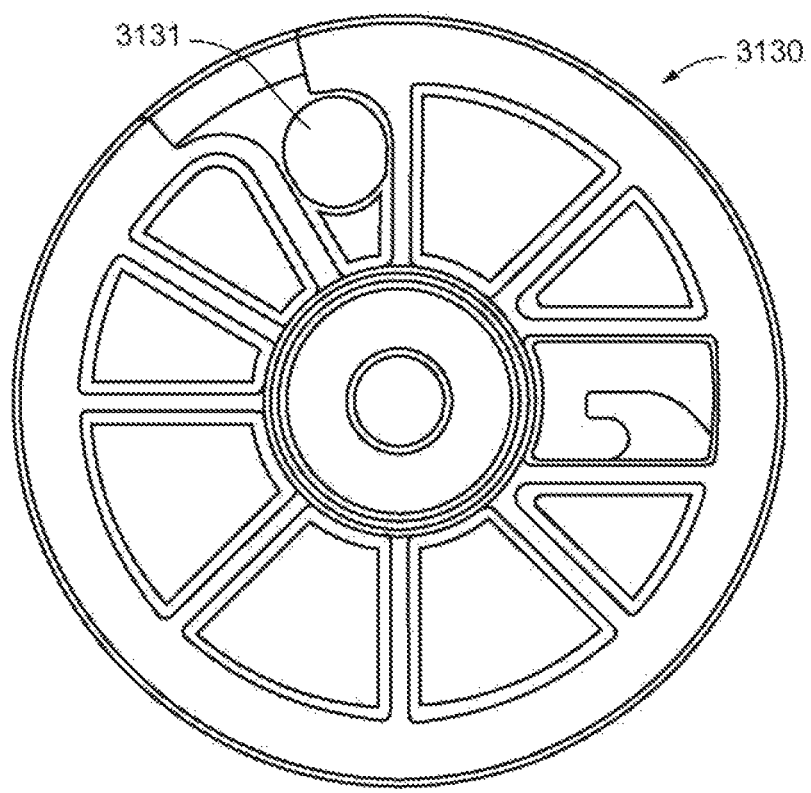
FIG. 34 is a side plan view of the pulley system of FIG. 33.

FIGS. 26A and 26B provide other perspective views of the balance mechanism 3116, illustrating an arrangement of wheel 3120, first and second cams 3124, 3126, a pulley system 3130, and energy storage member 3144 in accordance with an embodiment. In some embodiments, first and second cams 3124, 3126 are directly coupled to the energy storage member 3144 via one or more flexible elements (sometimes referred to as a tension or tensile member) that are routed around pulley system 3130. The flexible element can be a rope or cable and can include any material useful for transmitting force, such as a tensile polymer. Referring to FIG. 26B, in some cases first cam 3124 and second cam 3126 are coupled indirectly to the energy storage member 3144 via the pulley system 3130. FIGS. 33 and 34 illustrate one embodiment of pulley system 3130, which includes cam pulleys 3164, 3168, and an energy storage member pulley 3160 coupled to the cam pulleys. As shown, in some embodiments the energy storage member pulley and the cam pulleys are provided in a single piece construction.

In some cases each of the first and second cams 3124, 3126 are coupled to one of the cam pulleys 3164, 3168 with an independent, separate flexible element, while energy storage member pulley 3160 is coupled to the energy storage member 3144 via a separate flexible element. Referring to FIG. 24, in some cases the pulley system 3130 includes a through hole 3131, through which a single flexible element 3132 can be threaded and then coupled to the cams 3124, 3126, one at each end. Such an arrangement is illustrated in FIG. 26B. As the cams rotate and pull (or loosen) flexible element 3132, the flexible element 3132 engages with the cam pulleys, and is unwound from (or wound around, respectively) each of the cam pulleys.

According to a preferred embodiment, wheel 3120 is coupled to the mounting portion 3150 of the support with another flexible element 3135 such that wheel 3120 rotates with respect to the base 3102 as the mounting portion 3150 moves with respect to the support. As shown in FIGS. 25 and 26B, an additional direction changing pulley 3134 can direct the flexible element 3135 between the wheel 3120 and the mounting portion 3150. Turning to FIG. 27, the direction of flexible element 3135 is again changed by upper pulley 3138 and flexible element 3135 is coupled to the mounting portion 3150 using a hook 3139 or another similar device known in the art.

FIG. 28 is a partial perspective view of a bottom portion of the apparatus 3100, depicting the balance mechanism 3116 according to some embodiments. As discussed above, energy storage member pulley 3160 is coupled to the energy storage member 3144 via a separate flexible element 3161. In some cases the energy storage member 3144 includes a hook 3162 that allows for easily coupling the flexible element 3161 to member 3144. Member 3144 is positioned within support column 3106 such that hook 3162 is generally aligned with the outer edge of pulley system 3130, and specifically with energy storage member pulley 3160. In the example shown, as energy storage member pulley 3160 rotates, it winds or unwinds the flexible element 3161, allowing energy storage member 3144 to contract and extend. Accordingly, the force or weight of mounting portion 3150 of the support, as well as any equipment coupled thereto, can be offset and balanced by the energy storage member, through the transmission and redirection of force through the flexible elements, pulleys, and cams to energy storage member 3144.

FIGS. 29A and 29B provide perspective views, and FIG. 29C is a side view of a cam member 3200 incorporating first and second cams 3124, 3126 according to some embodiments. As shown, first cam 3124 and second cam 3126 can be incorporated into the single integral cam member 3200 in some cases, though this is not a requirement and the invention is not intended to be limited to this example. In some useful embodiments of the invention, the first and the second cams are cooperatively shaped and positioned to balance a force exerted on wheel 3120 by the mounting portion 3 150 with forces exerted by the energy storage member 3144 on the cams 3124, 3126. For example, the cams may be shaped and positioned so that a varying torque applied to the cams by flexible element 3132 (via the varying linear force that the energy storage member exerts) is converted to a substantially constant torque applied to wheel 3120. The wheel 3120 then relays the constant torque to the flexible element 3135, creating a constant linear force for lifting the mounting portion 3150 relative to the support column 3106. The opposite effect takes place as the mounting portion 3150 is lowered, with the balance mechanism 3116 creating a substantially constant resistance against downward movement of the mounting portion.

Also in some useful embodiments, the effective radius of each cam member may vary as a function of the displacement of an energy storage member of the balance mechanism. In some cases the two cams 3124, 3126 are mirror images of each other, and have the same profile of radius variation as a function of rotation. As shown in FIG. 29B, the cams 3124, 3126 each include a caroming surface 3125, 3127 upon which the flexible elements wind. In some embodiments cams 3124, 3126 are each designed to balance half of the weight of the mounting portion 3150 and any attached equipment, which can decrease stress and fatigue on the flexible elements and increase the life of the apparatus as will be discussed further herein.

In use, when an operator desires to change the position of a monitor or other device supported by a positioning apparatus, the operator can apply a force to the monitor and/or notebook. Movement of the monitor causes the mounting portion of the support, to which it is attached, to also move relative to the support column of the apparatus. FIG. 35 is a perspective view of a portion of the balance mechanism 3116 in a state corresponding to the low position of the mounting portion 3150, while FIG. 36 is a perspective view of a portion of balance mechanism 3116 in a state corresponding to the high position of mounting portion 3150. As is shown, the mounting portion 3150 is attached to the wheel 3120 via flexible element 3135, so that movement of the monitor/notebook causes the wheel 3120 to turn about its axis. The first and second cams 3124, 3126, which are attached to the wheel 3120, also rotate and cause the cam pulleys 3164, 3168 and energy storage member pulley 3160 to rotate about their respective axes (which in this case are the same axis). Rotation of the energy storage member pulley member 3160 pulls or loosens flexible element 3161, causing the energy storage member 3144 to contract or allowing the member to expand in length. Since the shape of the cams 3124, 3126 are designed to accommodate a changing energy storage member force (e.g., based on spring length), the operator only need apply a relatively constant force to overcome friction to move the monitor to any desired position, and the monitor will stay in the desired position without having to lock it into that position.

Positioning apparatuses employing a multi-surface cam (e.g., dual cam) provide for surprising advantages over balance mechanisms that use a single cam. For example, balance mechanisms using multiple cams are more robust and reliable than single cam mechanisms. Applicants have surprisingly found that embodiments using a dual cam can withstand a substantially greater number of cycles of adjustment compared to analogous single cam balance mechanisms. As just one example, Applicants have surprisingly found that increasing the number of cams within the balance mechanism by a factor of N can in some cases increase the load life of the mechanism by more than a factor of N. In some cases Applicants have found the load life to increase by a factor of 1.5N. In one case, Applicants surprisingly found that utilizing a balance mechanism including a dual cam as described herein increased the cycle life to 28,000 cycles from a cycle life of 10,000 cycles for a single cam mechanism under substantially similar conditions. Such an improved cycle life can increase the usefulness of practically any positioning apparatus, and provides an especially applicable and unexpected improvement for positioning apparatuses such as sit/stand positioning apparatuses that are subjected to a greater number of articulations than stands that are not able to accommodate a single operator in both sitting and standing postures.

Positioning apparatuses employing a multi-surface cam (e.g., dual cam) also allow for heavier loads to be translated over a larger distance with a smaller cam housing size than analogous single cam balance mechanisms. This feature is particularly useful in positioning apparatuses that are designed to sit on top of a horizontal work surface and to accommodate an operator in both sitting and standing positions as they allow for relatively large ranges of travel while occupying a smaller footprint on a work surface where space is valuable. As one example, a positioning apparatus according to one embodiment includes a housing that accommodates a dual cam (e.g., first and second cams in FIGS. 35 and 25) that provides counterbalanced movement for an approximately 90 lbs. load over a distance of about 20 inches. In some cases this housing has an approximate size of 180 mm×125 mm×95 mm. In contrast, a housing for a single cam mechanism configured for a substantially similar load and distance can require a housing that is approximately 228 mm×203 mm×90 mm. Accordingly, such embodiments are useful for work surface top stands where space conservation is important. Of course the housing size may be smaller or larger, depending upon the particular weight and distance requirements for a particular apparatus. Some embodiments can be scaled to accommodate weights between about 3 Lbs. and about 250 lbs. or more, and ranges of travel between about 2-3 inches up to 40 inches or more.

Without being bound by theory, Applicants believe that embodiments including a multi-surface cam (e.g., dual cam) provide advantages over single cam balance mechanisms because dividing the force of the attached equipment among two or more cams allows for a smaller force, and thus less stress, on each cam and associated flexible element, leading to an increased useful product life. In addition, each individual cam can be made smaller due to the smaller amount of load on each cam, while the full load can be carried by a single flexible element that wraps around the larger diameter of energy storage member pulley.

The following examples are presented to further illustrate embodiments of the multi-surface cam (e.g., dual cam) described herein, and are not intended to limit the scope of the invention.

Example 1: Comparable Example of Cycle Failure

Testing was carried out on a number of single cam balance mechanisms using an air cylinder with a 20" stroke. The single cam balance mechanisms each included a molded cam and other manufactured components including an extension spring and rope made according to specification to balance the desired weight over the desired range. The balance mechanisms were adjusted to a maximum weight to be balanced in order to apply the most stress to the rope. The air cylinder was connected to the moving component of the engine, and was cycled through its travel range at a rate of 6 cycles per minute. A targeted cycle life of 1 0,000 cycles under maximum loading was expected. In most cases, failure of the rope occurred at slightly more than 10,000 cycles but less than 12,500 cycles.

Example 2: Cycle Failure of an Exemplary Dual Cam

Testing was carried out on a dual cam balance mechanism. Test set up, loading, cycle rate, rope material, weight range, and travel range were all identical to those in the testing of single cam mechanisms described in Example 1. Design differences included differences in cam design, spring design, and rope routing to accommodate the dual cam design. In at least one test of this configuration, the mechanism exceeded 28,000 cycles.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. An apparatus for positioning first and second electronic displays and a keyboard relative to a work surface, the apparatus comprising a base including a bottom surface for supporting the base upon the work surface;
   a support column extending upward from the base;
   a mounting portion having an upwardly extending portion;
   a lift mechanism configured to movably couple the mounting portion and the support column so that the mounting portion is translatable with respect to the support column, thereby providing the mounting portion with an ascending and descending range of travel relative to the work surface, the lift mechanism configured to bias the mounting portion in a raised position;
   a crossbar assembly configured to directly couple to the upwardly extending portion of the mounting portion, the crossbar assembly including first and second display mounts configured to support the first and second electronic displays.

2. The apparatus of claim 1, wherein the crossbar assembly includes a stationary portion and a movable portion hingedly coupled to the stationary portion,
  wherein the first display mount is configured to be coupled to the stationary portion of the crossbar assembly and the second display mount is configured to be coupled to the movable portion of the crossbar assembly, and
  wherein the movable portion is configured to be moved with respect to the stationary portion and the stationary portion is configured to be stationary with respect to the mounting portion.

3. The apparatus of claim 2, wherein the crossbar assembly is configured to position the movable portion on a right side of the support column.

4. The apparatus of claim 2, wherein the crossbar assembly is configured to position the movable portion on a left side of the support column.

5. The apparatus of claim 2, wherein the crossbar assembly includes a pin to hingedly couple the movable portion to the stationary portion.

6. The apparatus of claim 5, wherein the movable portion has an end and the movable portion is configured to rotate at the end about an axis located at the pin.

7. The apparatus of claim 1, wherein the support column extends upward from the base at an angle of 90 degrees relative to the bottom surface of the base.

8. The apparatus of claim 1, wherein the support column extends upward from the base at an angle of greater than 90 degrees relative to the bottom surface of the base.

9. The apparatus of claim 1, wherein the support column extends upward from the base at an angle of less than 90 degrees relative to the bottom surface of the base.

10. The apparatus of claim 1, wherein the base is configured to attach to an edge of the work surface.

11. An apparatus for positioning first and second electronic displays and a keyboard relative to a work surface, the apparatus comprising:
  a base including a bottom surface for supporting the base upon the work surface;
  a support column extending upward from the base;
  a mounting portion having an upwardly extending portion;
  a lift mechanism configured to movably couple the mounting portion and the support column so that the mounting portion is translatable with respect to the support column, thereby providing the mounting portion with an ascending and descending range of travel relative to the work surface, the lift mechanism configured to bias the mounting portion in a raised position;
  a crossbar assembly including a stationary portion and a movable portion hingedly coupled to the stationary portion, the crossbar assembly configured to directly couple to the upwardly extending portion of the mounting portion, the crossbar assembly including first and second display mounts configured to support the first and second electronic displays, wherein each of the first and second display mounts is configured to be coupled to the crossbar.

12. The apparatus of claim 11, wherein the crossbar assembly includes a pin to hingedly couple the movable portion to the stationary portion.

13. The apparatus of claim 12, wherein the movable portion has an end and the movable portion is configured to rotate at the end about an axis located at the pin.

14. The apparatus claim 11, wherein the base is configured to attach to an edge of the work surface.

15. An apparatus for positioning first and second electronic displays and a keyboard relative to a work surface, the apparatus comprising:
  a base including a bottom surface for supporting the base upon the work surface, the based configured to attached to an edge of the work surface;
  a support column extending upward from the base;
  a mounting portion having an upwardly extending portion;
  a lift mechanism configured to movably couple the mounting portion and the support column so that the mounting portion is translatable with respect to the support column, thereby providing the mounting portion with an ascending and descending range of travel relative to the work surface, the lift mechanism configured to bias the mounting portion in a raised position;
  a crossbar assembly including a stationary portion and a movable portion hingedly coupled to the stationary portion, the crossbar assembly configured to directly couple to the upwardly extending portion of the mounting portion, the crossbar assembly including first and second display mounts configured to support the first and second electronic displays.

16. The apparatus of claim 15, wherein the support column extends upward from the base at an angle of 90 degrees relative to the bottom surface of the base.

17. The apparatus of claim 15, wherein the support column extends upward from the base at an angle of greater than 90 degrees relative to the bottom surface of the base.

18. The apparatus of claim 15, wherein the support column extends upward from the base at an angle of less than 90 degrees relative to the bottom surface of the base.

19. The apparatus of claim 15, wherein the crossbar assembly includes a pin to hingedly couple the movable portion to the stationary portion.

20. The apparatus of claim 15, wherein the movable portion has an end and the movable portion is configured to rotate at the end about an axis located at the pin.

* * * * *

UNITED STATES PATENT AND TRADEMARK OFFICE
CERTIFICATE OF CORRECTION

PATENT NO. : 10,667,602 B2
APPLICATION NO. : 16/198533
DATED : June 2, 2020
INVENTOR(S) : Hazzard et al.

It is certified that error appears in the above-identified patent and that said Letters Patent is hereby corrected as shown below:

On the Title Page

On page 5, in Column 1, under "Other Publications", Line 33, delete "Respnse" and insert --Response-- therefor In the Specification In Column 5, Line 9, delete "invention," and insert --invention.-- therefor In Column 12, Line 43, after "A1", insert --,--

In Column 13, Line 58, delete "24-36," and insert --24-36.-- therefor

In Column 13, Line 61, delete "3 130" and insert --3130-- therefor

In Column 16, Line 44, delete "1222," and insert --1222.-- therefor

In Column 24, Line 21, delete "3 150" and insert --3150-- therefor

In Column 24, Line 41, delete "caroming" and insert --camming-- therefor

In the Claims

In Column 26, Line 50, in Claim 1, delete "comprising" and insert --comprising:¶-- therefor In Column 28, Line 13, in Claim 14, after "apparatus", insert --of--

Signed and Sealed this
Twenty-ninth Day of December, 2020

Andrei Iancu
*Director of the United States Patent and Trademark Office*